(12) United States Patent
Ishimoto et al.

(10) Patent No.: US 7,925,705 B2
(45) Date of Patent: Apr. 12, 2011

(54) TERMINAL DEVICE

(75) Inventors: Kan Ishimoto, Nagoya (JP); Tomomi Wakazono, Ogaki (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1016 days.

(21) Appl. No.: 11/377,556

(22) Filed: Mar. 17, 2006

(65) Prior Publication Data

US 2006/0221863 A1   Oct. 5, 2006

(30) Foreign Application Priority Data

Mar. 31, 2005   (JP) ................. 2005-105521

(51) Int. Cl.
   *G06F 15/16* (2006.01)
   *G06F 15/177* (2006.01)
   *G06F 15/173* (2006.01)
(52) U.S. Cl. ........ 709/206; 709/220; 709/223; 709/224; 709/225
(58) Field of Classification Search ............ 709/220, 709/223–225, 206
   See application file for complete search history.

(56) References Cited

U.S. PATENT DOCUMENTS

| | | | | |
|---|---|---|---|---|
| 5,727,135 | A * | 3/1998 | Webb et al. ............... | 358/1.14 |
| 6,430,711 | B1 * | 8/2002 | Sekizawa .................. | 714/47 |
| 6,618,163 | B1 * | 9/2003 | Roosen et al. ........... | 358/1.15 |
| 2002/0054169 | A1 * | 5/2002 | Richardson .............. | 345/854 |
| 2002/0062364 | A1 * | 5/2002 | Watanabe ................ | 709/223 |
| 2002/0091822 | A1 * | 7/2002 | Tsuchitoi ................. | 709/224 |
| 2004/0252329 | A1 * | 12/2004 | Sorenson ................. | 358/1.15 |
| 2005/0044200 | A1 * | 2/2005 | Aritomi ................... | 709/223 |
| 2005/0055641 | A1 * | 3/2005 | Machida .................. | 715/734 |

FOREIGN PATENT DOCUMENTS

| | | |
|---|---|---|
| JP | 62-028194 | 2/1987 |
| JP | 9006559 | 1/1997 |
| JP | 2002-290414 | 10/2002 |
| JP | 2002-296981 | 10/2002 |

OTHER PUBLICATIONS

Office Action for Japanese Application No. 2005-105521 mailed Jun. 3, 2008.

* cited by examiner

*Primary Examiner* — Wing F Chan
*Assistant Examiner* — Benjamin M Thieu
(74) *Attorney, Agent, or Firm* — Banner & Witcoff, Ltd.

(57) ABSTRACT

A terminal device, which is to be connected to the network together with other terminal devices and a host device to operate the terminal device, includes an output device that outputs perceptually recognized information, a self-pattern storing system that stores information on an expression pattern for the terminal device, a configuring system that configures the information into the self-pattern storing system, an output executing system that makes the output device output the expression pattern, based upon the written information, an obtaining system that obtains information on expression patterns for the other terminal devices, and a setting system that defines an expression pattern different from any of the expression patterns for the other terminal devices as the expression pattern for the terminal device, based upon the obtained information, and sets information on the defined expression pattern as the information to be written.

26 Claims, 19 Drawing Sheets

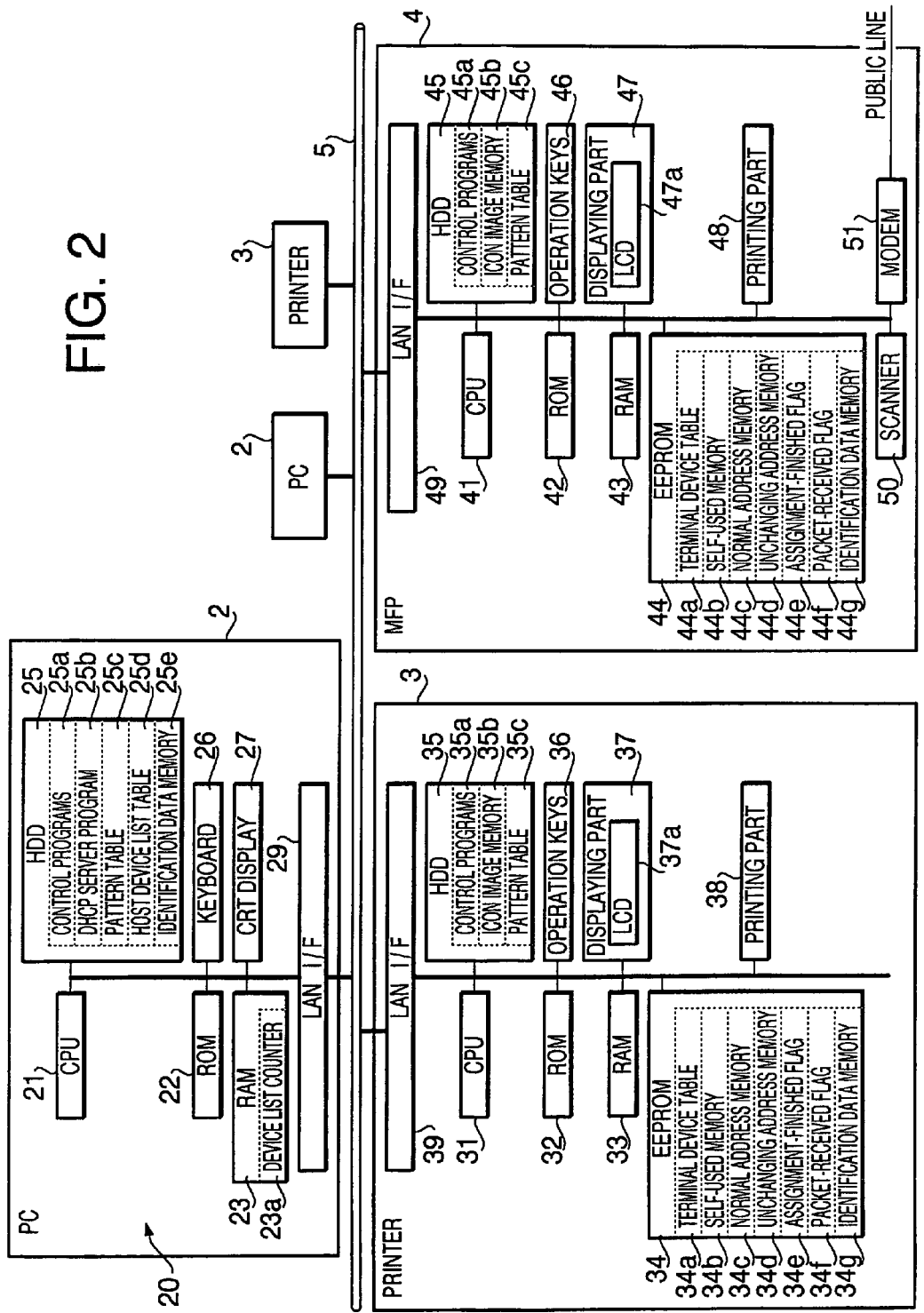

| LIGHTING PATTERN (P) | PATTERN (M) | COLOR (C) | PATTERN CODE | LIGHTING PATTERN (P) | PATTERN (M) | COLOR (C) | PATTERN CODE (25c,35c,45c) |
|---|---|---|---|---|---|---|---|
| NO BLINKING | PLAIN | RED | 0 | BLINKING | PLAIN | RED | 48 |
| | | BLUE | 1 | | | BLUE | 49 |
| | | YELLOW | 2 | | | YELLOW | 50 |
| | | GREEN | 3 | | | GREEN | 51 |
| | | WHITE | 4 | | | WHITE | 52 |
| | | PINK | 5 | | | PINK | 53 |
| | | ORANGE | 6 | | | ORANGE | 54 |
| | | BLACK | 7 | | | BLACK | 55 |
| | | GRAY | 8 | | | GRAY | 56 |
| | | BROWN | 9 | | | BROWN | 57 |
| | | LIGHT BLUE | 10 | | | LIGHT BLUE | 58 |
| | | PURPLE | 11 | | | PURPLE | 59 |
| | VERTICAL STRIPE | RED | 12 | | VERTICAL STRIPE | RED | 60 |
| | | BLUE | 13 | | | BLUE | 61 |
| | | YELLOW | 14 | | | YELLOW | 62 |
| | | GREEN | 15 | | | GREEN | 63 |
| | | WHITE | 16 | | | WHITE | 64 |
| | | PINK | 17 | | | PINK | 65 |
| | | ORANGE | 18 | | | ORANGE | 66 |
| | | BLACK | 19 | | | BLACK | 67 |
| | | GRAY | 20 | | | GRAY | 68 |
| | | BROWN | 21 | | | BROWN | 69 |
| | | LIGHT BLUE | 22 | | | LIGHT BLUE | 70 |
| | | PURPLE | 23 | | | PURPLE | 71 |
| | TILE | RED | 24 | | TILE | RED | 72 |
| | | BLUE | 25 | | | BLUE | 73 |
| | | YELLOW | 26 | | | YELLOW | 74 |
| | | GREEN | 27 | | | GREEN | 75 |
| | | WHITE | 28 | | | WHITE | 76 |
| | | PINK | 29 | | | PINK | 77 |
| | | ORANGE | 30 | | | ORANGE | 78 |
| | | BLACK | 31 | | | BLACK | 79 |
| | | GRAY | 32 | | | GRAY | 80 |
| | | BROWN | 33 | | | BROWN | 81 |
| | | LIGHT BLUE | 34 | | | LIGHT BLUE | 82 |
| | | PURPLE | 35 | | | PURPLE | 83 |
| | DIAGONAL LATTICE | RED | 36 | | DIAGONAL LATTICE | RED | 84 |
| | | BLUE | 37 | | | BLUE | 85 |
| | | YELLOW | 38 | | | YELLOW | 86 |
| | | GREEN | 39 | | | GREEN | 87 |
| | | WHITE | 40 | | | WHITE | 88 |
| | | PINK | 41 | | | PINK | 89 |
| | | ORANGE | 42 | | | ORANGE | 90 |
| | | BLACK | 43 | | | BLACK | 91 |
| | | GRAY | 44 | | | GRAY | 92 |
| | | BROWN | 45 | | | BROWN | 93 |
| | | LIGHT BLUE | 46 | | | LIGHT BLUE | 94 |
| | | PURPLE | 47 | | | PURPLE | 95 |

FIG. 3

| IP Address | Model Name | Serial Number | Subnet Mask | Default Gateway | Pattern Code | Status |
|---|---|---|---|---|---|---|
| 192.168.0.3 | LPR001 | ABC1234 | 255.255.0.0 | 192.168.0.1 | 4 | Sleep |
| 192.168.0.8 | LPR001 | ABC1238 | 255.255.0.0 | 192.168.0.1 | 5 | Connection Error |
| 192.168.0.9 | MFC001 | ABC2001 | 255.255.0.0 | 192.168.0.1 | 6 | Sleep |

FIG. 4

TERMINAL DEVICE

CROSS-REFERENCE TO RELATED APPLICATION

This application claims priority under 35 U.S.C. §119 from Japanese Patent Application No. 2005-105521, filed on Mar. 31, 2005. The entire subject matter of the application is incorporated herein by reference.

BACKGROUND

1. Technical Field

The following description relates to one or more techniques that allows a user to individually identify a plurality of terminal devices interconnected via a network with different expressions given by the plurality of terminal devices from each other.

2. Related Art

Image formation devices, such as printers and MFPs (Multi Function Peripherals), are generally provided with a display screen for displaying an operation procedure etc. in order to improve operability thereof. Some of the image formation devices can arbitrarily change a color of an image displayed on the display screen depending on the kind of the image. Each of such image formation devices is configured such that a colored image can be displayed on the display screen and the color thereof is changed depending on an operating state of the image formation device. For example, in the case of a shortage of sheets or a paper jam, a different background color from a normal display color is displayed on the display screen to inform a user of the above operating state of the image formation device in the case. Such a technique is disclosed, for instance, in Japanese Patent Provisional Publication No. P2002-296981A (hereinafter, referred to as '981 publication).

In addition, recently, in an environment where computers such as personal computers (hereinafter, simply referred to as "PCs") are used, a network system is installed, and image formation devices are connected to the network to establish a printing system. In this printing system, output data is transmitted to the image formation device from the PC via the network, and is outputted from the image formation device. Since the network can have a connection with a plurality of image formation devices, a user can execute a data output operation (printing-out operation) using any one of the plurality of image formation devices connected to the network.

Some of the image formation devices connectable to the network provide information for operating them to the PCs connected to the image formation devices via the network. There is displayed on a display device of the PC, for example, section names and/or floor numbers where the image formation devices are located based upon the information provided from the image formation devices. Further, a graphic image of the network is displayed such that locations of the image formation devices can be identified on the graphic image.

In addition, in a general printing system, settings for an image formation device are configured such that a user browses the settings on a PC and/or the image formation device. There are cited as examples of the settings for the image formation devices network function settings, printing settings, time settings, remote settings for immediately rebooting the image formation device from a test printing. The network function settings, which are necessary for the image formation device executing a network operation, include settings of an IP address and addresses of a sub net mask and a default gateway. When the PC makes the image formation device execute the printing-out operation via the network, it is difficult to impossible to execute the printing-out operation in the case where a destination to which print data is to be sent is not assigned. Therefore, it is better to configure the settings for the addresses (such as the IP address) of the image formation device. Since the IP address, a serial number, and a node name are information that serves as an index for specifying one image formation device, the user can identify the image formation device as an operation target based upon the information.

Meanwhile, for example, when a plurality of image formation devices is installed in an office, the same type of image formation devices are deployed to minimize support for different devices, but rather permitting the support for one type of device. In addition, even though the plurality of image formation devices is not the same type, there are many devices with similar appearances. In such a case, it is often hard to individually identify the devices from remote places.

In the image formation device described in '981 publication, by visually recognizing the display screen thereof, the user can judge whether the image formation device is under an error condition. However, there is a problem that it is difficult to judge at a glance whether an image formation device is a device that the user himself has assigned to the destination to which the print data is to be sent (i.e., the operation target).

In addition, in the printing system disclosed in '559 publication, such an image formation device that detailed data on its location is required to be previously inputted to a printer location database by a user, or such an image formation device that its location has to be confirmed based upon a floor map prepared with its location being shown thereon together with its IP address and/or serial number, there is required not only trouble of preparing necessary materials and configuring necessary settings, but also a lot of trouble of maintenance, since the materials and settings have to be changed every time the installation location thereof is changed. Moreover, when it is needed to walk around individually confirming the IP addresses and serial numbers of the image formation devices, the image formation devices are required to be individually operated to make each of the image formation devices display its IP address. In this case, since the IP address or serial number is represented as only arrangement of characters, even though such kind of information is displayed, it is hard to confirm at a glance the location of the image formation device. Consequently, the user has to confirm the location of the image formation device based upon a status thereof which is individually changed to be displayed. In this case, since the user has to operate the image formation device with coming and going between the PC and the image formation device, the user is forced to perform troublesome operations. There is a further problem that the user has to break the use of the image formation device during the operation for confirming the location thereof, accompanied by operating the image formation device.

For this reason, as shown in FIG. 20, although an image formation device B is actually an operation target, a user of a PC is likely to misunderstand that an image formation device A is the operation target. FIG. 20 is an illustration showing an example of problems in the aforementioned conventional technologies.

SUMMARY

Aspects of the present invention are advantageous in that one or more techniques that allow a user to individually identify a plurality of terminal devices interconnected via a network with different expressions given by the plurality of terminal devices form each other can be provided.

BRIEF DESCRIPTION OF THE ACCOMPANYING DRAWINGS

FIG. 1 schematically shows a network system in accordance with one or more illustrative embodiments according to the present invention.

FIG. 2 is a block diagram showing an electrical configuration of a PC, and a printer and MFP connected to the PC in accordance with one or more aspects of the present invention.

FIG. 3 schematically shows an example of configurations of pattern tables in accordance with one or more aspects of the present invention.

FIG. 4 schematically shows a configuration of a host device list table in accordance with one or more aspects of the present invention.

FIGS. 7A, 7B, 7C, and 7D show four icon images of "Network Not Available", "Wired Network Available", "Mail Function Available", and "Wireless Network Available" stored in an icon image memory, respectively in accordance with one or more aspects of the present invention.

Figure 8:
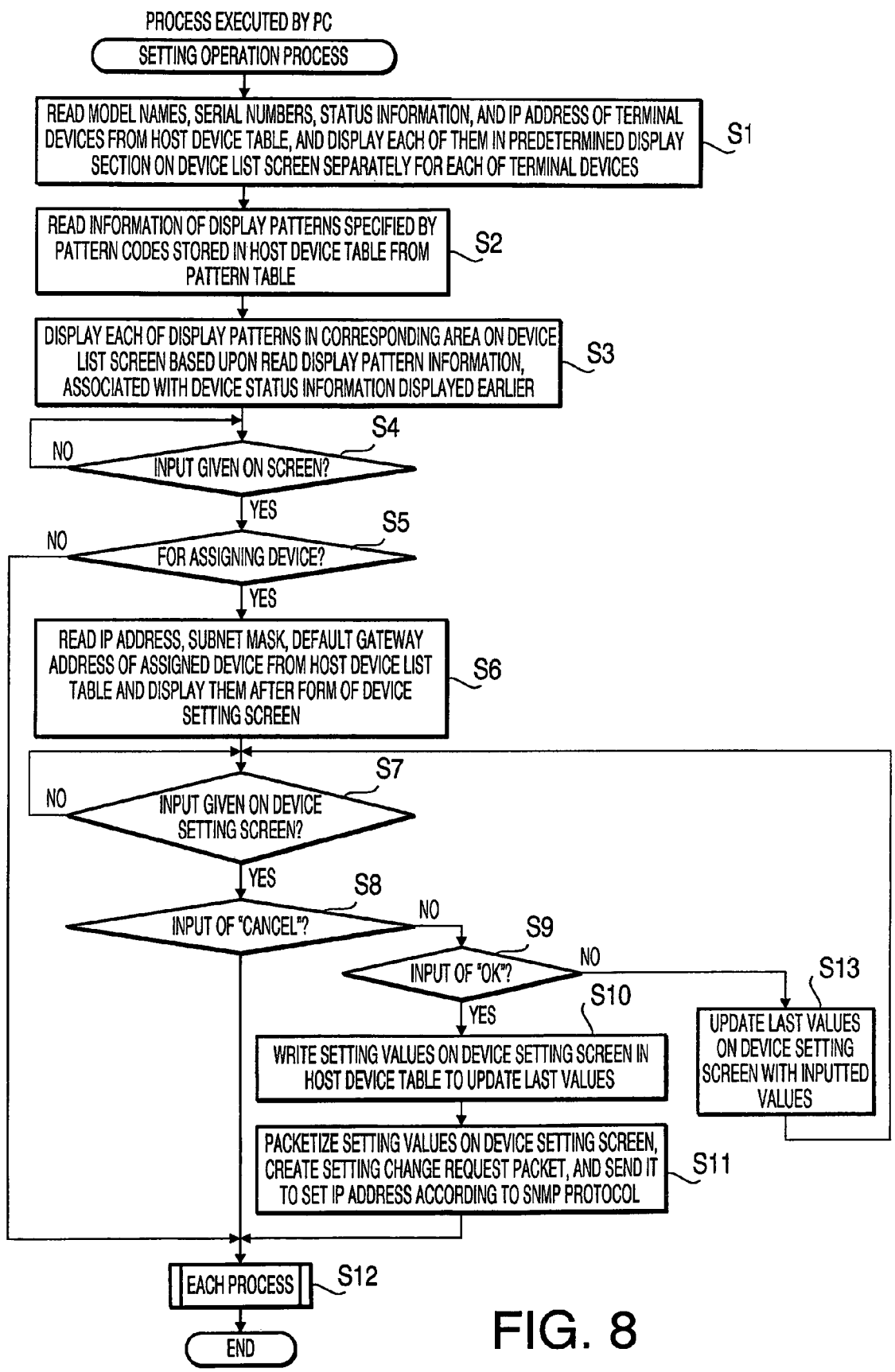

FIG. 8 is a flowchart of a setting operation process executed by the PC in accordance with one or more aspects of the present invention.

Figure 9:
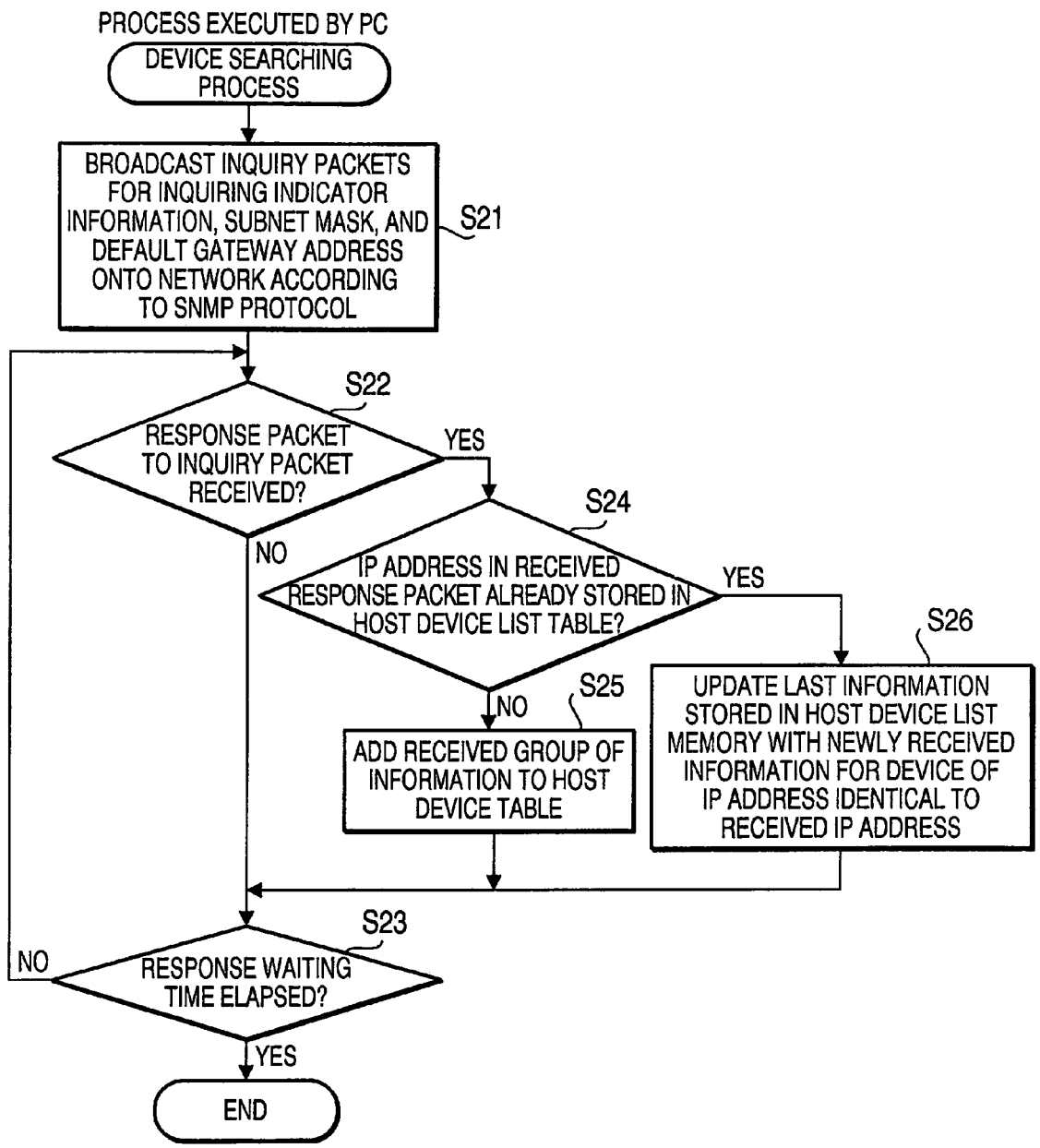

FIG. 9 is a flowchart of a device searching process executed by the PC in accordance with one or more aspects of the present invention.

Figure 10:
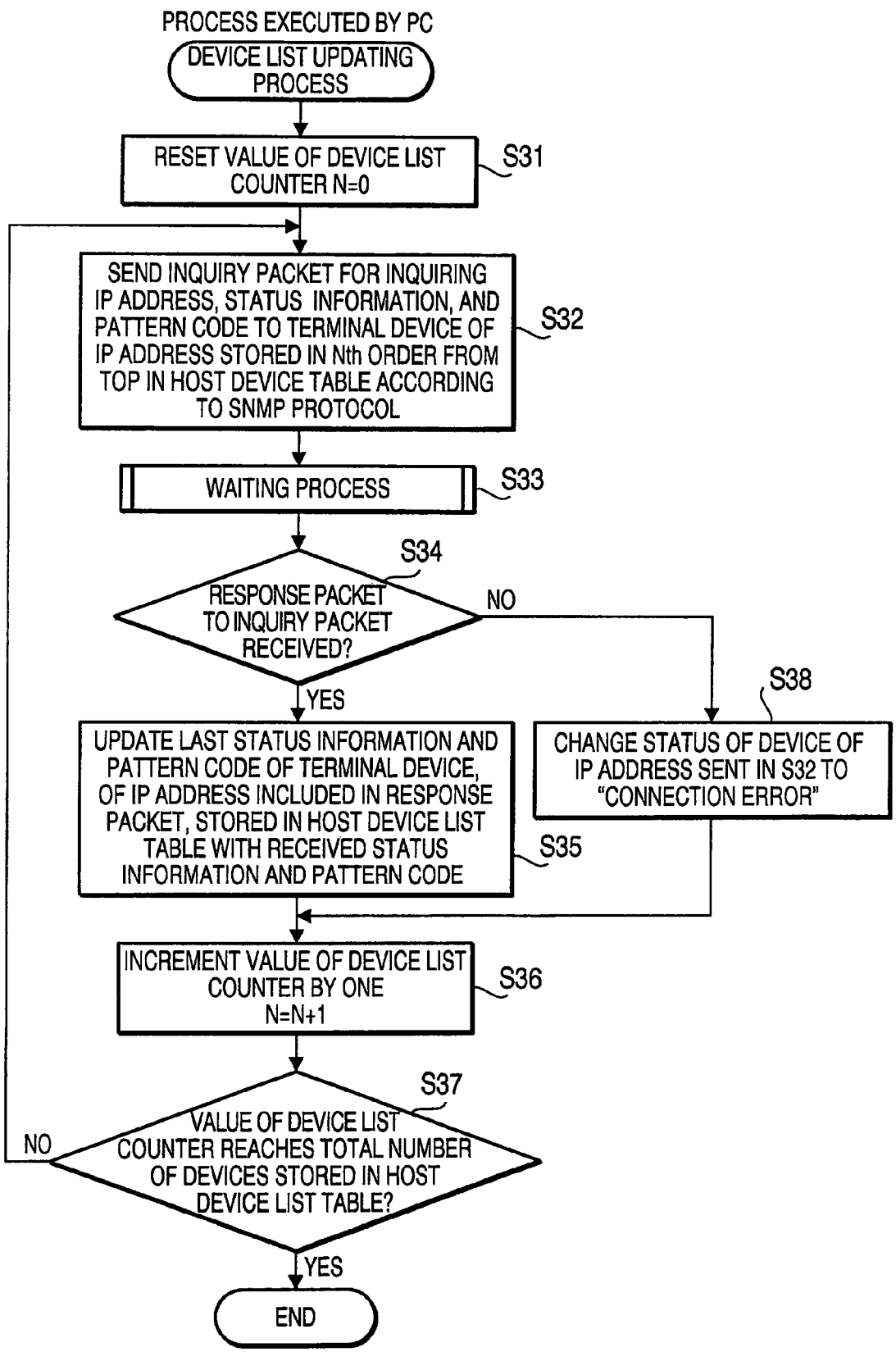

FIG. 10 is a flowchart of a device list updating process executed by the PC in accordance with one or more aspects of the present invention.

Figure 11:
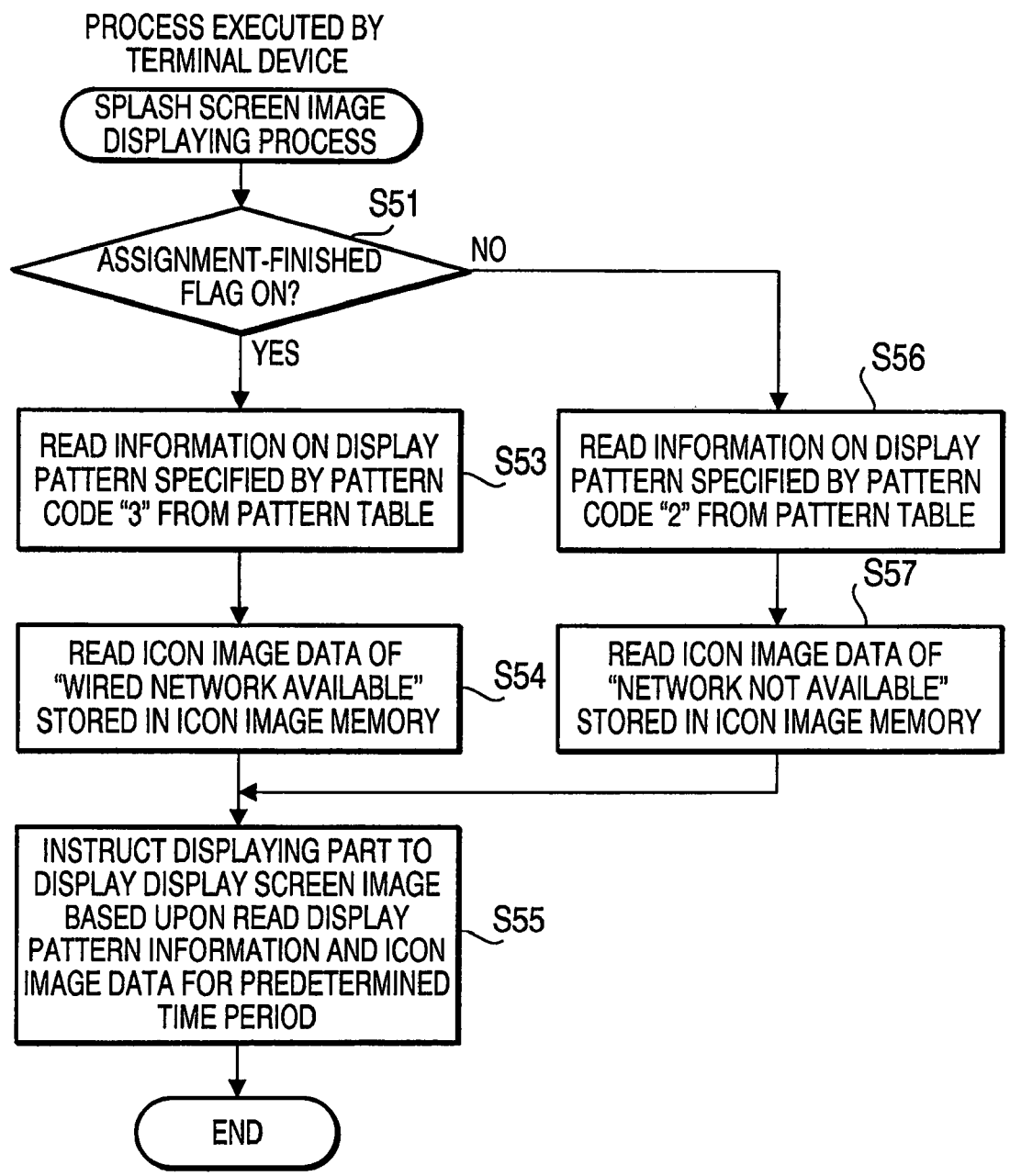

FIG. 11 is a flowchart of a splash screen image displaying process executed by the terminal device when the terminal device is powered ON in accordance with one or more aspects of the present invention.

Figure 12:
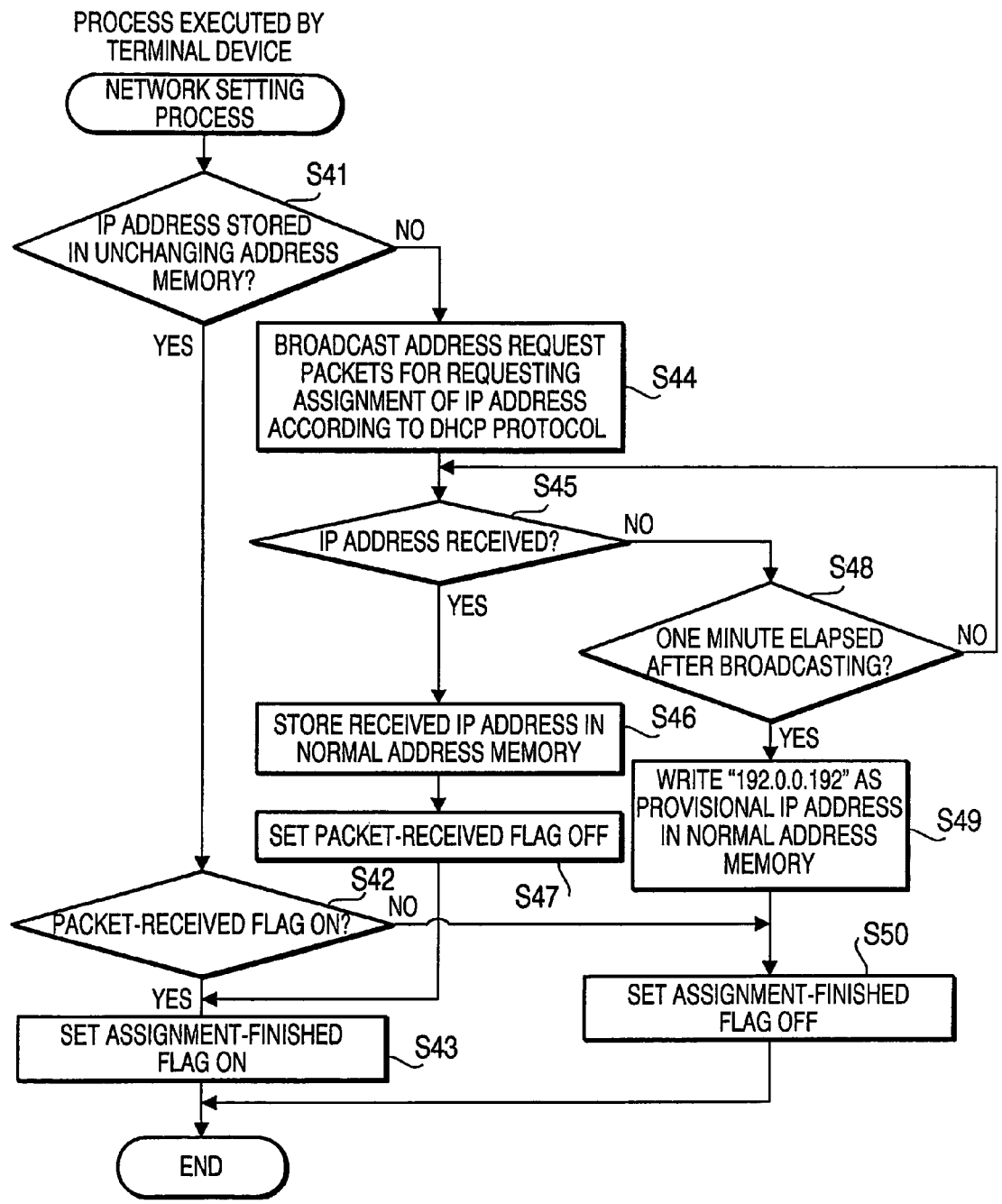

FIG. 12 is a flowchart of a network setting process executed by the terminal device in accordance with one or more aspects of the present invention.

Figure 13:
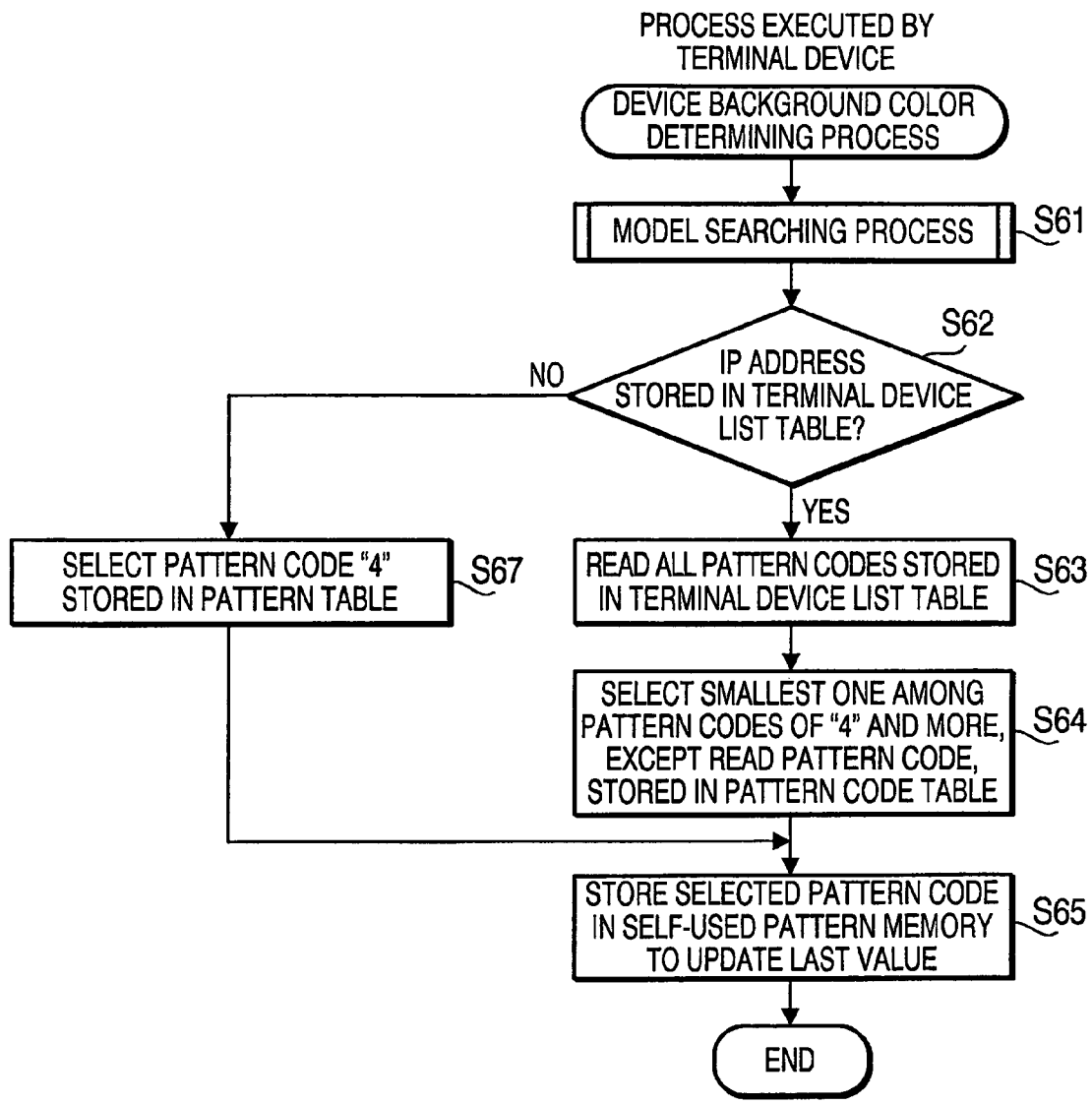

FIG. 13 is a flowchart of a device background color determining process executed by the terminal device in accordance with one or more aspects of the present invention.

Figure 14:
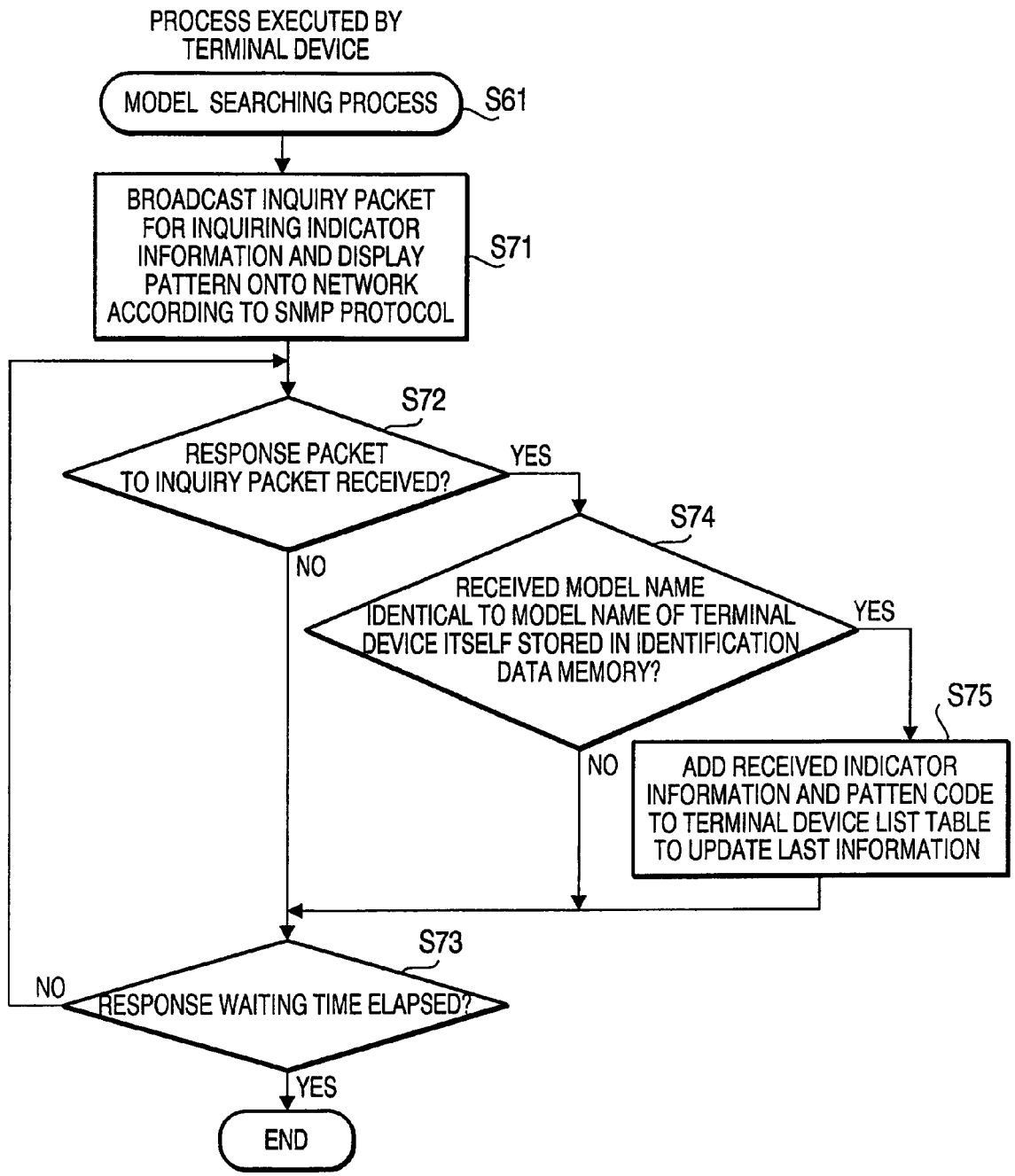

FIG. 14 is a flowchart of a model searching process executed in the device background color determining process shown in FIG. 13 in accordance with one or more aspects of the present invention.

Figure 15:
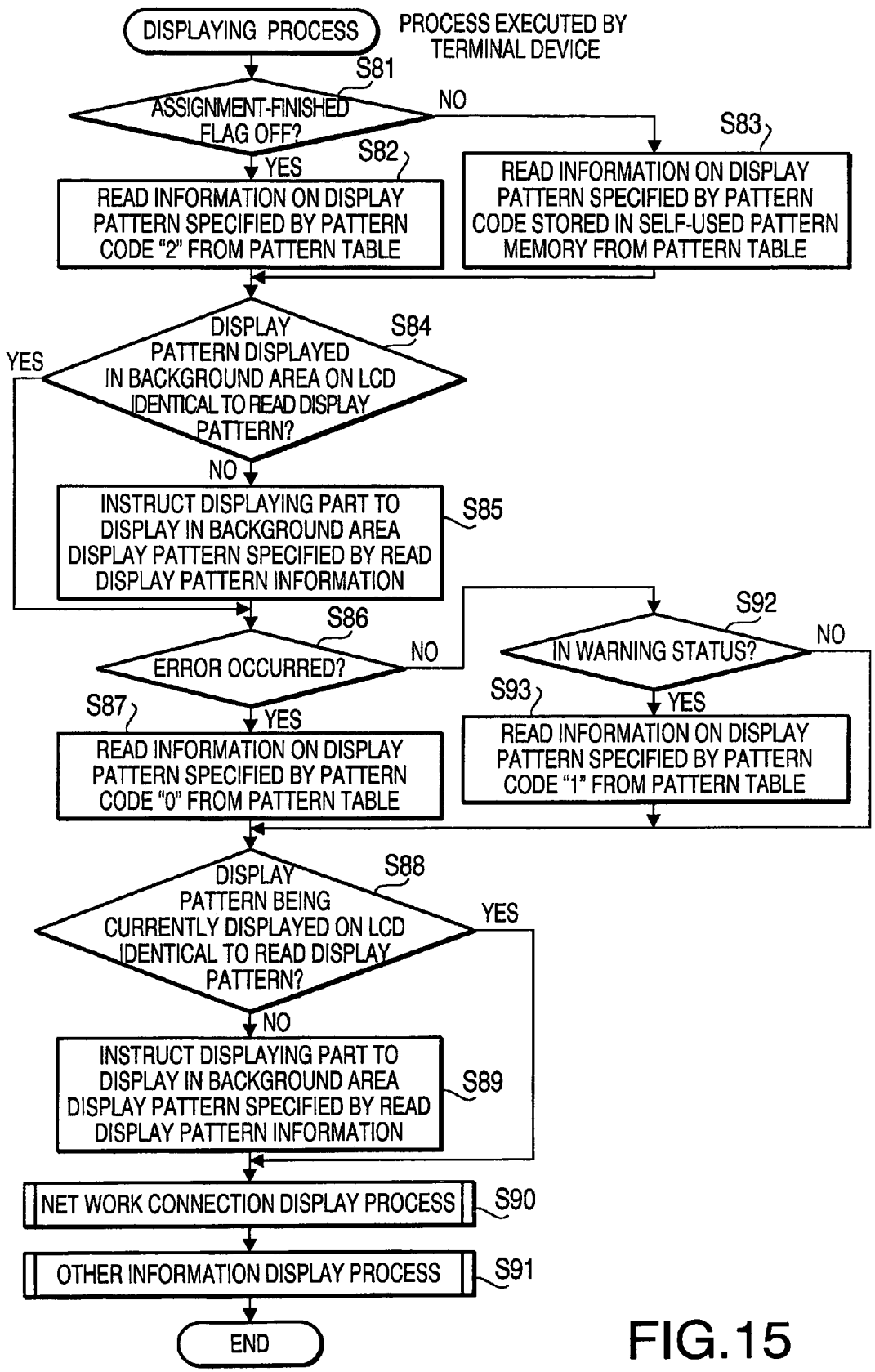

FIG. 15 is a flowchart of a displaying process executed by the terminal device in accordance with one or more aspects of the present invention.

Figure 16:
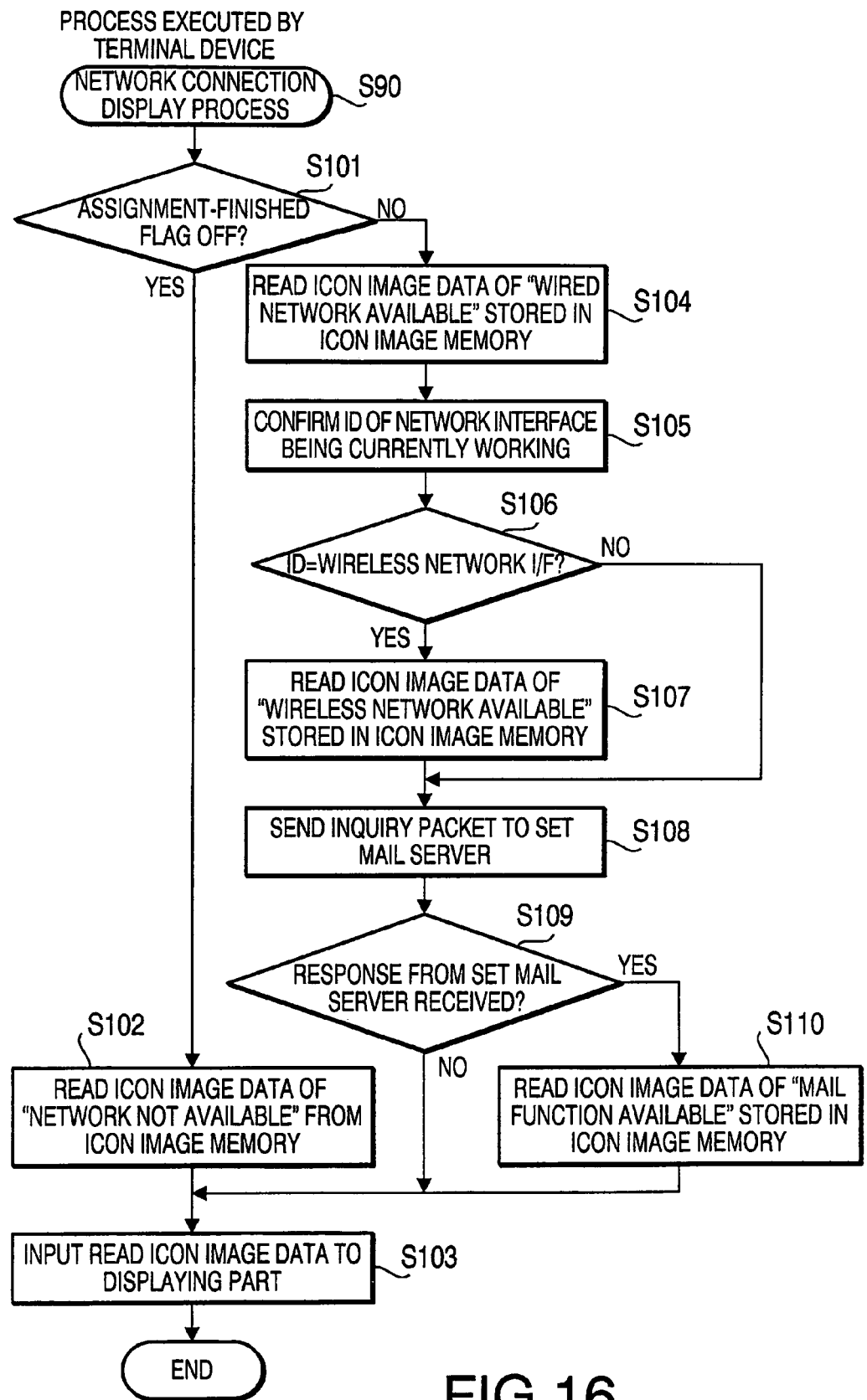

FIG. 16 is a flowchart of a network connection display process executed in the displaying process shown in FIG. 15 in accordance with one or more aspects of the present invention.

Figure 17:
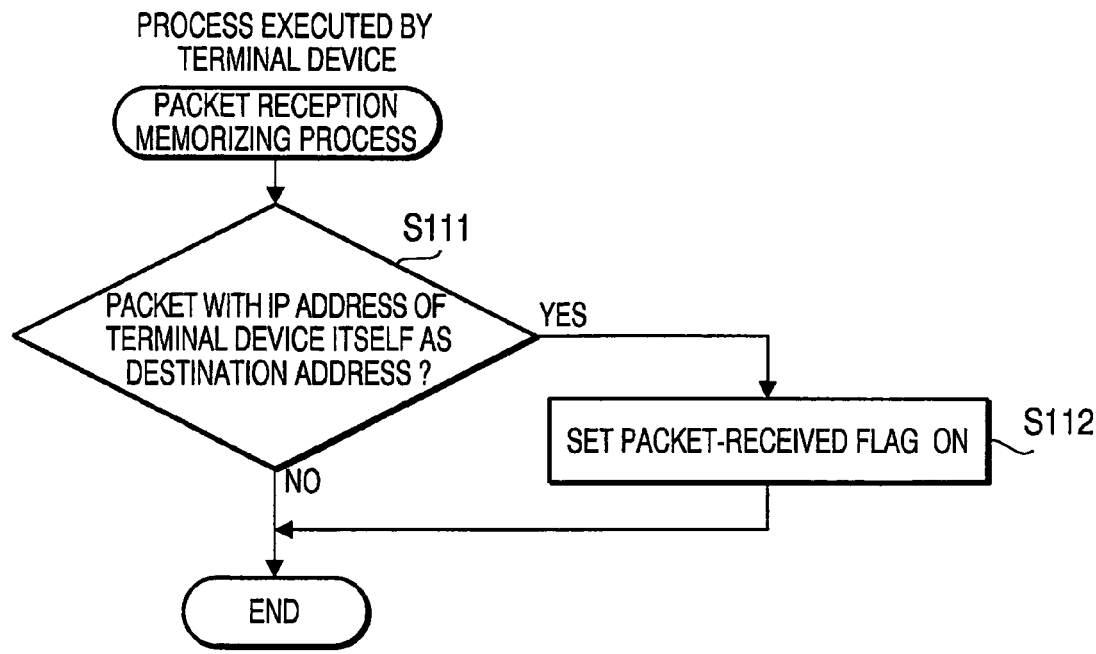

FIG. 17 is a flowchart of a packet reception memorizing process executed by the terminal device in accordance with one or more aspects of the present invention.

Figure 18:
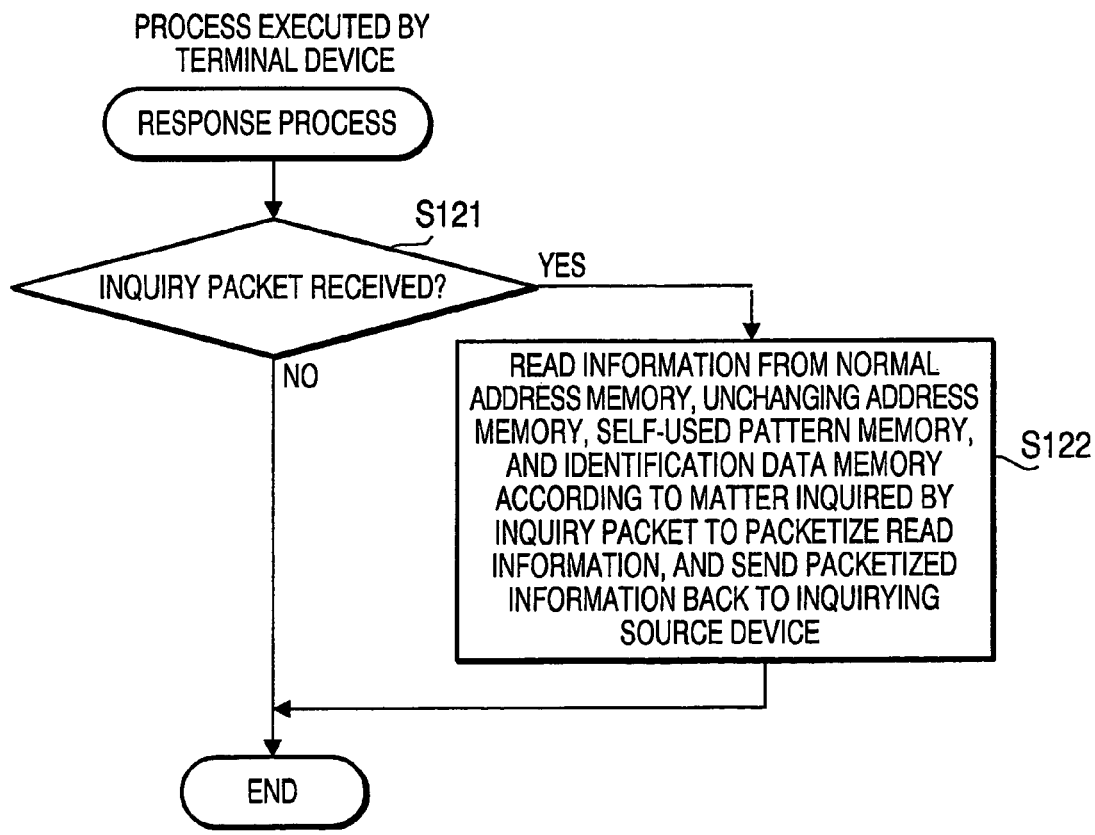

FIG. 18 is a flowchart of a response process executed by the terminal device in accordance with one or more aspects of the present invention.

Figure 19:
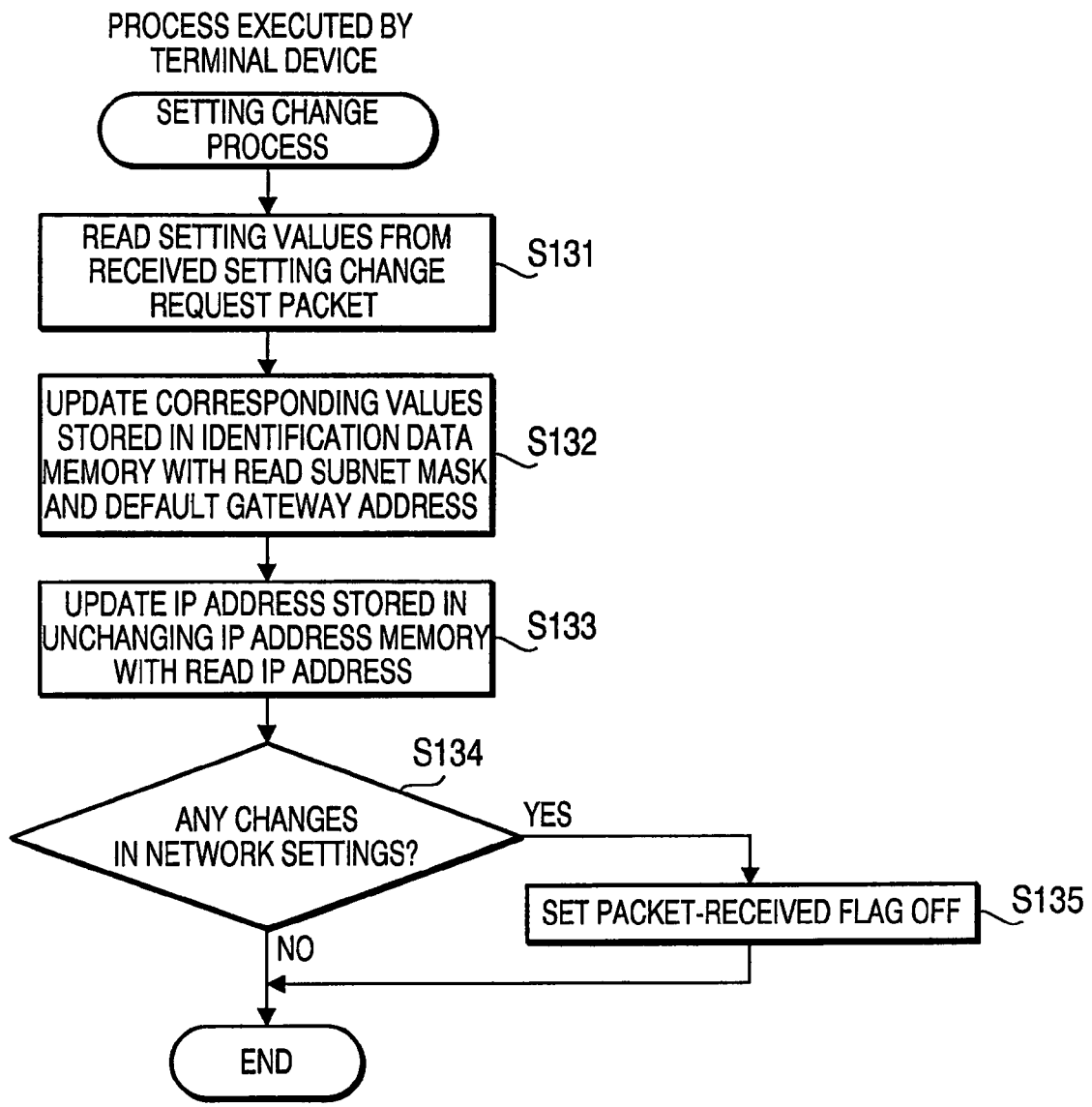

FIG. 19 is a flowchart of a setting change process executed by the terminal device in accordance with one or more aspects of the present invention.

Figure 20:
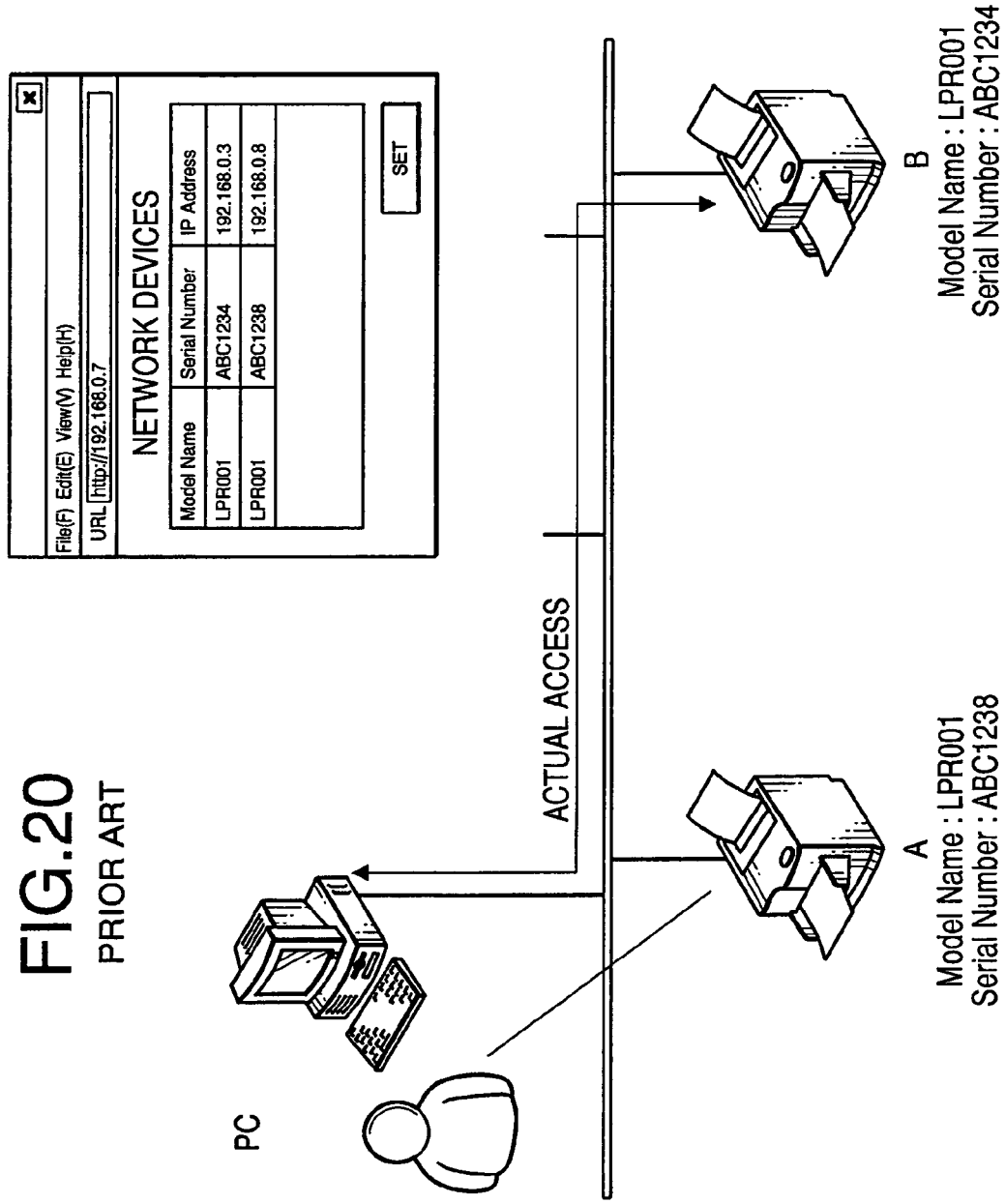

FIG. 20 is an illustration showing an example of problems in conventional technologies.

DETAILED DESCRIPTION

It is noted that various connections are set forth between elements in the following description. It is noted that these connections in general and, unless specified otherwise, may be direct or indirect and that this specification is not intended to be limiting in this respect.

General Overview

According to aspects of the present invention, there is provided a terminal device, which includes: an output device configured to output information; a self-pattern storing system configured to store information on an expression pattern for the terminal device therein; a configuring system configured to configure the information on the expression pattern for the terminal device into the self-pattern storing system; an output executing system configured to make the output device output the expression pattern for the terminal device, based upon the information on the expression pattern for the terminal device; an obtaining system configured to obtain information on expression patterns for the other terminal devices connected to the network; and a setting system configured to define an expression pattern different from any of the expression patterns for the other terminal devices as the expression pattern for the terminal device, based upon the information obtained by the obtaining system, the setting system being configured to set information on the defined expression pattern as the information on the expression pattern for the terminal device. The output device is configured to output based upon the information set by the setting system as the information on the expression pattern for the terminal device.

In aspects of the above terminal device, the information on the expression patterns for the other terminal devices connected to the network are obtained by the obtaining system. By the setting system, based upon the information on the expression patterns for the other terminal devices that is obtained by the obtaining system, the expression pattern different from any of the expression patterns for the other terminal devices is defined as the expression pattern for the terminal device itself. Then, the defined information on the expression pattern for the terminal device itself is set as the information to be configured by the configuring system. The set information is configured into the self-pattern storing system by the configuring system. Based upon the information on the expression pattern for the terminal device itself that is written into the self-pattern storing system, the expression pattern for the terminal device itself is outputted from the output device by the output executing system. Therefore, by the expression pattern outputted from the output device, the expression differentiated from that of each of the other terminal devices connected to the network is provided, so that the terminal device can be discriminated from the other terminal devices. Accordingly, even though a plurality of terminal devices with appearances or functions similar to the appearance or function of the terminal device itself is connected to the network, by the expression pattern outputted from the terminal device itself, the user can discriminate the terminal device itself from the other terminal devices. Thereby, in an easy way to visually recognize the terminal device, the user can specify the terminal device. For this reason, it is not required for the user to carry out troublesome operations such as checking out the IP address and/or serial number to specify the terminal device. Consequently, it is possible to save necessary efforts of the user for specifying the terminal device. Also, it can be simplified for the user who is unaccustomed to the troublesome operations to specify the terminal device to be operated on the network.

In addition, since the expression pattern is simpler information than the IP address or serial number expressed as an arrangement of numerical characters, the user can easily memorize the expression pattern as the information for specifying the terminal device. Therefore, when another new terminal device is connected to the network, an expression pattern different from any of the expression patterns of the other terminal devices already connected to the network is outputted from the new terminal device. Thereby, the user can simply grasp the existence of the new terminal device on the network.

It is noted that there are cited as the obtaining system systems configured to obtain the expression patterns for the other terminal devices with input operations to the terminal device itself or communication operations between the terminal device itself and the other terminal devices, such as a system configured to obtain the information on the expression patterns for the other terminal devices with input operations by the user, a system configured to obtain the information, which is registered by another device (e.g., a server and host device) on the network, on the expression pattern of each of the other terminal devices with the registered information being delivered from the another device, and a system configured to obtain the information on the expression pattern for each of the other terminal devices with the information being transmitted from each of the other terminal devices.

As aforementioned, when the obtaining system is configured as a system configured to obtain the information, which is registered by another device on the network, on the expression pattern of each of the other terminal devices with the registered information being delivered from the another device, or a system configured to obtain the information on the expression pattern for each of the other terminal devices with the information being transmitted from each of the other terminal devices, it is possible to save the input operations by the user and prevent the user from providing wrong inputs. Further, when the obtaining system is configured as a system configured to obtain the information on the expression pattern for each of the other terminal devices with the information being transmitted from each of the other terminal devices, it is possible to obtain the information on the expression patterns without the server or the host device being provided on the network. In addition, since the existing server or host device is not required to have a function of delivering the information on the expression patterns to the terminal device, it is possible to reduce the load of the existing server or host device.

Optionally, the terminal device may further include a sending system configured to send the information, stored in the self-pattern storing system, on the expression pattern for the terminal device outside, in response to another terminal device requesting the terminal device to send the information on the expression pattern for the terminal device. Optionally, the obtaining system may include a transmission request system configured to request to send the information on the expression patterns for the other terminal devices connected to the network, a pattern information receiving system configured to receive the information, which is sent from the other terminal devices responsive to the transmission request by the transmission request system, and an other-pattern storing system configured to store the information received by the pattern information receiving system therein. Optionally, the setting system may be configured to define an expression pattern different from any of the expression patterns for the other terminal devices as the expression pattern for the terminal device, based upon the information stored in the other-pattern storing system, the setting system being configured to set information on the defined expression pattern as the information on the expression pattern for the terminal device.

In some aspects, in response to that another terminal device requests the terminal device to send the information on the expression pattern for the terminal device, the sending system sends the information on the expression pattern for the terminal device outside based upon the information stored in the self-pattern storing system. Meanwhile, the transmission request system requests to send the information on the expression patterns for the other terminal devices connected to the network. In addition, the information on the expression patterns for the other terminal devices sent from the sending systems of the other terminal devices is received by the pattern information receiving system. Based upon the information received by the pattern information receiving system, the information on the expression patterns for the other terminal devices is stored in the other-pattern storing system. Then, based upon the information on the expression patterns stored in the other-pattern storing system, the expression pattern different from any of the expression patterns for the other terminal devices is defined as the expression pattern for the terminal device by the setting system. The information on the defined expression pattern is set as the information on the expression pattern for the terminal device to be configured by the configuring system.

Accordingly, it is possible to obtain the information on the expression pattern for the other terminal devices other than the terminal device itself through communication of sending the information on the expression pattern for the terminal device outside and receiving the information on the expression patterns for the other terminal devices sent therefrom. In addition, it is possible to make the other terminal devices obtain the information on the expression pattern for the terminal device. That is, when setting the expression pattern for the terminal device, it is allowed to save an input operation carried out by the user to input the information on the expression patterns for the other terminal devices. Thereby, trouble of the user can be reduced. Further, thereby, since the setting of the expression pattern for the terminal device is not dependent on the input operation by the user, it is possible to exactly set the expression pattern for the terminal device without the user forgetting the setting. Also, it is possible to avoid a wrong setting of the expression pattern due to a wrong operation by the user (e.g., a setting of the same expression pattern as any one of the other terminal devices).

Still optionally, the transmission request system may be configured to request the other terminal devices to send the information on the expression patterns for the other terminal devices. Optionally, the sending system may be configured to send the information on the expression pattern for the terminal device to the other terminal devices that are source devices giving the transmission requests.

In some aspects, the transmission request system requests the other terminal devices to send the information on the expression patterns for the other terminal devices. Further, the sending system sends the information on the expression pattern for the terminal device to the other terminal devices that are source devices giving the transmission requests. Therefore, it is possible to set the information on the expression pattern for the terminal device by directly obtaining the information on the expression pattern from each of the other terminal devices. In other words, it is unnecessary to provide a device (a device other than the terminal devices) that carries out the operations for registering and sending the information on the expression pattern for the terminal device. Hence, it is allowed to set the unique expression pattern for the terminal device only by connecting to the existing network. Such a terminal device is easy to operate. Further, thereby, since the device other than the terminal devices is not required, it is possible to set the expression pattern for each of the terminal devices at low cost.

Optionally, the terminal device may further includes a set pattern storing system configured to store information on a plurality of predetermined expression patterns therein. Optionally, the setting system may be configured to select information on at least one expression pattern other than the expression patterns for the other terminal devices from the information on the plurality of predetermined expression patterns, based upon the information stored in the other-pattern storing system, and set the selected information on the at least one expression pattern as the information on the expression pattern for the terminal device.

In some aspects of the above terminal device, the information on the plurality of predetermined expression patterns is stored in the set pattern storing system. The setting system selects the information on the at least one expression pattern other than the expression patterns for the other terminal devices from the information on the plurality of predetermined expression patterns, based upon the information stored in the other-pattern storing system, and set the selected information on the at least one expression pattern as the information on the expression pattern for the terminal device.

For this reason, the expression pattern for the terminal device is selected among the limited expression patterns stored in the set pattern storing system. Therefore, it is possible to set the expression pattern for the terminal device by a easy process, compared with the case of processing an expression pattern for one of the other terminal devices stored in the other-pattern storing system to obtain the expression pattern for the terminal device (adding a predetermined expression pattern to the expression pattern for one of the other terminal devices, or removing or synthesizing a part of the expression pattern stored in the other-pattern storing system). Accordingly, it is allowed to prevent an algorithm for setting the expression pattern from having a redundant structure, and simplify designs of control system devices.

In addition, since the information on the expression patterns stored in the setting pattern storing system can be previously set, it is possible to store in the setting pattern storing system such expression patterns as not to be similar to each other. Therefore, the outputted expression pattern can clearly be discriminated from the expression patterns for the other terminal devices. Hence, even when a plurality of terminal devices is connected to the network, the expression patterns are not similar to each other, and this can makes the user easily recognize an intended terminal device to be operated.

Further optionally, the information on the plurality of predetermined expression patterns stored in the set pattern storing system may include information on specific expression patterns, each of which represents that the terminal device is in a corresponding one of predetermined specific statuses, in addition to the information on the expression patterns for the terminal device. Optionally, the terminal device may further include a specific status judging system configured to judge whether the terminal device is in one of the predetermined specific statuses corresponding to the specific expression patterns, and a specific pattern output executing system configured to make the output device output the specific expression pattern corresponding to the specific status in which the specific status judging system has judged that the terminal device is.

In some aspects, when the specific status judging system judges that the terminal device is in one of the predetermined specific statuses corresponding to the specific expression patterns, the specific pattern output executing system makes the output device output the specific expression pattern corresponding to the specific status in which the specific status judging system has judged that the terminal device is. Accordingly, the terminal device can make the user easily recognize the status thereof. Further, the information on the specific expression patterns stored in the setting pattern storing system is information other than the information on the expression pattern for discriminating the terminal device from the other terminal devices. Therefore, the user can avoid wrongly recognizing that the specific expression pattern representing the terminal device being in the corresponding specific status is the normal expression pattern (the expression pattern for discriminating the terminal device from the other terminal devices). Namely, the user can adequately recognize that the terminal device is in the corresponding specific status.

It is noted that there are cited as the specific statuses a non-revertible error status, a status where a consumable part is to be exchanged, and a status where an operation by the user is required.

Optionally, the expression patterns may include color tone patterns that are visually recognized and discriminated based upon difference of color tone. In this case, the output device may include a color generating system configured to generate at least one of chromatic colors and achromatic colors, and an expression pattern displaying device configured to display visual information with at least one of chromatic colors and achromatic colors generated by the color generating system. Optionally, the output executing system may be configured to make the expression pattern displaying device output a color tone pattern for the terminal device based upon the information on the color tone patterns stored in the self-pattern storing system.

In some aspects, the color generating system provided in the output device generates at least one of chromatic colors and achromatic colors, and the expression pattern displaying device displays visual information with at least one of chromatic colors and achromatic colors generated by the color generating system. The expression patterns include the color tone patterns that are visually recognized and discriminated based upon difference of color tone. The output executing system makes the expression pattern displaying device output the color tone pattern for the terminal device based upon the information on the color tone patterns stored in the self-pattern storing system.

Thereby, the user can simply clearly discriminate the terminal device from the other terminal devices with the color tone (the color tone pattern) corresponding to the terminal device. In addition, the color tone pattern formed with color tones is simpler than information configured with arrangement of characters and/or numerical characters, so as to be easily memorized by the user. Therefore, even when a plurality of terminal devices is connected to the network, the user can easily memorize each of the plurality of terminal devices, associated with each of the color tone patterns. Further, when using the terminal device, the user can easily recognize the location of the intended terminal device to be operated with the color tone pattern as an indicator.

Moreover, in general, when the terminal device is connected to the network, the terminal device can be remote-controlled via the network. For this reason, the terminal device is often located away from the user. In this case, if the outputted expression pattern is a color tone pattern, compared with the expression pattern formed with a character string or symbol string, the user can easily recognize the expression pattern even from a remote place. Namely, such a terminal device can make the user adequately recognize itself (the intended terminal device to be operated by the user).

Alternatively or optionally, the expression patterns may include graphic patterns that are visually recognized and discriminated based upon difference of graphic. Optionally, the output device may include an expression pattern displaying device configured to display visual information. Optionally, the output executing system may be configured to make the expression pattern displaying device output a graphic pattern for the terminal device based upon the information on the graphic patterns stored in the self-pattern storing system.

In some aspects, the expression patterns include the graphic patterns that are visually recognized and discriminated based upon difference of graphic. The output executing system makes the expression pattern displaying device output a graphic pattern for the terminal device based upon the information on the graphic patterns stored in the self-pattern storing system.

Accordingly, with the graphic form (graphic pattern), the user can simply easily discriminate the terminal device from the other terminal device. That is, if the expression pattern is the graphic pattern, compared with the case of the expression pattern being formed with the character string or the symbol string, the user can sensuously recognize the expression pattern. Therefore, the user can promptly judge only at a glance which terminal device the expression pattern corresponds to without interpreting the character string or symbol string. In addition, the graphic pattern that is simple information is easy to be memorized by the user. Hence, even when a plurality of terminal devices is connected to the network, the user can easily memorize each of the terminal devices associated with a corresponding one of the graphic patterns, and easily recognize the location of the intended terminal device to be operated with the graphic pattern as an indicator, when using the terminal device.

Alternatively or optionally, the expression patterns may include light emitting patterns that are visually recognized and discriminated based upon difference of light emitting condition. In this case, the output device may include an expression pattern displaying device configured to display visual information, and a light emitting condition changing system configured to change the light emitting condition of light to be emitted from the expression pattern displaying device. Optionally, the output executing system may be configured to make the expression pattern displaying device output a light emitting pattern for the terminal device by making the light emitting condition changing system change the light emitting condition of the light to be emitted from the expression pattern displaying device based upon the information on the light emitting patterns stored in the self-pattern storing system.

In some aspects, the expression patterns include light emitting patterns that are visually recognized and discriminated based upon difference of light emitting condition. The output executing system makes the expression pattern displaying device output a light emitting pattern for the terminal device by making the light emitting condition changing system change the light emitting condition of the light to be emitted from the expression pattern displaying device based upon the information on the light emitting patterns stored in the self-pattern storing system.

Accordingly, the light emitting pattern can make the user simply clearly discriminate the terminal device from the other terminal devices. In addition, since the light emitting pattern is formed by changing the light emitting condition, the expression pattern displaying device, for example, can be configured with one light emitting member or one luminous body. Therefore, compared with the expression pattern displaying device outputting the color tone pattern or graphic pattern, such an expression pattern displaying device can be manufactured with a simple structure at low cost.

Optionally, the terminal device may further include a terminal indicator information storing system configured to store therein indicator information, for indicating the terminal device, including at least one of a name and location data on the network that are given to the terminal device. Optionally, the output device may include an indicator information displaying device configured to display the indicator information stored in the terminal indicator information storing system.

In some aspects, the terminal indicator information storing system stores therein indicator information, for indicating the terminal device, including at least one of a name and location data on the network that are given to the terminal device. The indicator information displaying device displays the indicator information stored in the terminal indicator information storing system. Accordingly, it is possible to make the user recognize the terminal device with not only the expression pattern but also the indicator information.

In addition, in many cases, when the terminal device is connected to the terminal device, various settings have to be configured using the indicator information given to the terminal device. In general, the indicator information is set (stored) inside the terminal device, and is read out of the inside of the terminal device by a predetermined operation such that the user can recognize the indicator information. For example, the indicator information is read out by directly giving the predetermined operation to the terminal device, or accessing the terminal device from an external device connected with the network. However, in many cases, the reading of the indicator information requires a troublesome advanced operation. For this reason, when the user is not accustomed to the operation, the reading of the indicator information is difficult to be carried out. On the contrary, in this terminal device, since the indicator information is displayed on the indicator information displaying device, the difficult reading operation is unnecessary.

Further optionally, the output device may include a displaying device having a plurality of display areas, the displaying device including the indicator information displaying device and the expression pattern displaying device. Optionally, the output executing system may be configured to make the displaying device display the expression pattern for the terminal device in one display area, different from the area in which the indicator information is displayed, of the plurality of display areas, in the case where the expression pattern for the terminal device is set as the expression pattern visually recognized.

In some aspects, the output executing system makes the displaying device display the expression pattern for the terminal device in one display area, different from the area in which the indicator information is displayed, of the plurality of display areas, in the case where the expression pattern for the terminal device is set as the expression pattern visually recognized. Accordingly, both of the indicator information and expression pattern are displayed on the same displaying device, and the visibility of the indicator information is prevented from being reduced.

The user can effectively obtain the information on both of the indicator information and expression pattern displayed on the displaying device by visually recognizing the displaying device. On the other hand, since the indicator information is generally shown using characters and/or symbols, the visibility of the indicator information greatly depends on a color employed to show the indicator information or the contrast between the employed color and the background color. However, even though the indicator information and expression pattern are outputted on the same displaying device, each of both of the indicator information and expression pattern is displayed in the different area. Therefore, the indicator information and expression pattern are not displayed with one of the indicator information and expression pattern overlapping the other, and the visibility of the indicator information is prevented from being reduced affected by the expression pattern. In other words, by displaying the indicator information in the area different from the area in which the expression pattern is displayed, the effect of the expression pattern on the indicator information can be reduced. Consequently, even though the display condition of the indicator information is set without considering the effect of the display condition (the color and/or pattern) of the expression pattern, the visibility of the indicator information is not seriously reduced due to the effect of the expression pattern.

Optionally, the terminal device may further include an image data storing system configured to store data on images representing conditions of connection with the network therein, a detecting system configured to detect the condition of connection with the network, an image displaying device configured to display the image based upon the image data stored in the image data storing system thereon, and a connection condition displaying system configured to select the data on the image representing the condition, detected by the detecting system, of the connection with the network from the image data stored in the image data storing system, and display the image representing the detected condition of the connection with the network based upon the selected data on the image displaying device.

In some aspects, when the detecting system detects the condition of the connection with the network, the connection condition displaying system displays the image representing the detected condition of the connection with the network based upon the data selected among the image information stored in the image data storing system on the image displaying device. Accordingly, the user can easily recognize the condition of the connection with the network from the displayed image information. For example, when the condition of the connection with the network is informed of with a simple configuration of the light emitting member being powered ON/OFF, the user cannot understand what kind of information is informed of with the light emitting member being powered ON/OFF unless the user previously knows that. However, since the image information can represent various kinds of information, the image information can embody and show a matter to be conveyed to the user. Therefore, the image information can make the user sensuously understand what kind of information is informed of by the image information, even though the user does not previously know that. Thereby, the user can adequately recognize the information.

In addition, since the image information representing the detected connection condition is displayed on the image displaying device by the connection condition displaying system, the image information can inform the user of not only whether the terminal device is connected to the network, but also which connection condition the terminal device is in, in the case where the terminal device is configured to be connected to the network in a plurality of connection conditions. Therefore, the user can adequately understand which connection condition among the plurality of connection conditions the terminal device is connected to the network in.

Yet optionally, the detecting system may include a wired destination storing system configured to store wired destination assigning information for assigning a destination device with which the terminal device is to have a wired connection via the network, and a wired connection detecting system configured to detect whether the wired connection is established based upon the wired destination assigning information stored in the wired destination storing system. Optionally, the image data storing system may be configured to store therein at least data on a wired connection image representing that the wired connection is established based upon the wired destination assigning information stored in the wired destination storing system. Optionally, the connection condition displaying system may be configured to display the wired connection image on the image displaying device in the case where the wired connection detecting system detects the wired connection being established based upon the wired destination assigning information.

In some aspects, when the wired connection detecting system detects whether the wired connection is established based upon the wired destination assigning information stored in the wired destination storing system, the connection condition displaying system displays the wired connection image representing the wired connection being established stored in the image information storing system on the image displaying device. Accordingly, the wired connection image can easily inform the user of that the wired connection is established.

Alternatively or optionally, the detecting system may include a wireless destination storing system configured to store wireless destination assigning information for assigning a destination device with which the terminal device is to have a wireless connection via the network, and a wireless connection detecting system configured to detect whether the wireless connection is established based upon the wireless destination assigning information stored in the wireless destination storing system. Optionally, the image data storing system may be configured to store therein at least data on a wireless connection image representing that the wireless connection is established based upon the wireless destination assigning information stored in the wireless destination storing system. Optionally, the connection condition displaying system may be configured to display the wireless connection image on the image displaying device in the case where the wireless connection detecting system detects the wireless connection being established based upon the wireless destination assigning information.

In some aspects, when the wireless connection detecting system detects whether the wireless connection is established based upon the wireless destination assigning information stored in the wireless destination storing system, the connection condition displaying system displays the wireless connection image representing the wireless connection being established stored in the image information storing system on the image displaying device. Accordingly, the wireless connection image can easily inform the user of that the wireless connection is established.

Still optionally, the detecting system may include a mail server storing system configured to store mail server assigning information for assigning a mail server with which the terminal device is to have a connection via the network, and a mail server detecting system configured to detect whether the connection with the mail server is established based upon the mail server assigning information stored in the mail server storing system. Optionally, the image data storing system may be configured to store therein at least data on a mail server image representing that the connection with the mail server is established based upon the wireless destination assigning information stored in the wireless destination storing system. Optionally, the connection condition displaying system may be configured to display the mail server image on the image displaying device in the case where the mail server detecting system detects the connection with the mail server being established based upon the mail server assigning information.

In some aspects, when the mail server detecting system detects whether the connection with the mail server is established based upon the mail server assigning information stored in the mail server storing system, the connection condition displaying system displays the mail server image representing the connection with the mail server being established stored in the image information storing system on the image displaying device. Accordingly, the mail server image can easily inform the user of that the connection with the mail server is established.

Optionally, the output device may include a lighting indicator device having at least one light emitting member, the light indicator device being configured to represent the different expression patterns, which are set as expression patterns visually recognized, by changing a lighting condition of the light indicator device.

In some aspects, the output device includes the lighting indicator device having the at least one light emitting member, the expression pattern visually recognized is outputted by the lighting condition of the light indicator device. The light indicator device can be manufactured at lower cost than an advanced display device such as a liquid crystal display device, CRT display, and organic EL (organic electroluminescent) display device. Therefore, a function of outputting the expression pattern is realized at low cost.

It is noted that there are cited as the light emitting member a light emitting device such as a light-emitting diode (LED), and a lamp. When the light emitting device is employed as the light emitting member, electrical power consumption can be saved compared with the liquid crystal display device or the CRT display being employed. Thereby, the running cost of the lighting indicator device can be reduced. Further, since the light emitting device is a semiconductor device, it can be operated with the same voltage (e.g., substantially 5V) as that of a control system for controlling the terminal device. Therefore, since a configuration to generate the voltage for the control system can generate the operating voltage, a configuration to generate the voltage for operating the output device is not required to be purposely provided. Thereby, the cost of manufacturing can be reduced.

Optionally, the terminal device may further include a start-up connection judging system configured to judge whether the terminal device is connected with the network at timing when the terminal device is powered ON, a judgment result displaying device configured to display a judgment result by the start-up connection judging system, and an initial display output system configured to output initial displays of different display patterns on the judgment result displaying device for a predetermined time period depending on whether the terminal device is judged to be connected with the network by the start-up connection judging system.

In some aspects, the start-up connection judging system judges whether the terminal device is connected with the network at timing when the terminal device is powered ON. Then, the initial display output system outputs the initial displays of different display patterns on the judgment result displaying device for the predetermined time period depending on whether the terminal device is judged to be connected with the network by the start-up connection judging system.

Accordingly, at the timing when the terminal device is powered ON, it is possible to show whether the terminal device is connected with the network as the initial display. Thereby, the user can know the condition of the connection between the terminal device and the network immediately on start-up.

According to another aspect of the present invention, there is provided a terminal device, which includes: a self-pattern storing system; a configuring system configured to configure information on an expression pattern into the self-pattern storing system, an obtaining system configured to obtain the information on the expression patterns for the other terminal devices connected to the network; a setting system configured to define an expression pattern different from any of the expression patterns for the other terminal devices as the expression pattern for the terminal device, based upon the information on the expression patterns for the other terminal devices obtained by the obtaining system, the setting system being configured to set information on the defined expression pattern as the information on the expression pattern for the terminal device; an output device configured to output perceptual information; and an output executing system configured to make the output device output the expression pattern for the terminal device, based upon the information on the expression pattern that is configured into the self-pattern storing system by the configuring system.

In aspects of the aforementioned terminal device, the information on the expression patterns for the other terminal devices connected to the network are obtained by the obtaining system. By the setting system, based upon the information on the expression patterns for the other terminal devices that is obtained by the obtaining system, the expression pattern different from any of the expression patterns for the other terminal devices is defined as the expression pattern for the terminal device itself. Then, the defined information on the expression pattern for the terminal device is set as the information to be configured by the configuring system. The set information is configured into the self-pattern storing system by the configuring system. Based upon the information on the expression pattern for the terminal device itself that is written into the self-pattern storing system, the expression pattern for the terminal device itself is outputted from the output device by the output executing system. Therefore, by the expression pattern outputted from the output device, the expression differentiated from that of each of the other terminal devices connected to the network is provided, so that the terminal device can be discriminated from the other terminal devices. Accordingly, even though a plurality of terminal devices with appearances or functions similar to the appearance or function of the terminal device itself is connected to the network, by the expression pattern outputted from the terminal device itself, the user can discriminate the terminal device itself from the other terminal devices. Thereby, in an easy way to visually recognize the terminal device, the user can specify the terminal device. For this reason, it is not required for the user to carry out troublesome operations such as checking out the IP address and/or serial number to specify the terminal device. Consequently, it is possible to save necessary efforts of the user for specifying the terminal device. Also, it can be simplified for the user who is unaccustomed to the troublesome operations to specify the terminal device to be operated on the network.

In addition, since the expression pattern is simpler information than the IP address or serial number expressed as an arrangement of numerical characters, the user can easily memorize the expression pattern as the information for specifying the terminal device. Therefore, when another new terminal device is connected to the network, an expression pattern different from any of the expression patterns of the other terminal devices already connected to the network is outputted from the new terminal device. Thereby, the user can simply grasp the existence of the new terminal device on the network.

It is noted that there are cited as the obtaining system systems configured to obtain the expression patterns for the other terminal devices with input operations to the terminal device itself or communication operations between the terminal device itself and the other terminal devices, such as a system configured to obtain the information on the expression patterns for the other terminal devices with input operations by the user, a system configured to obtain the information, which is registered by another device (e.g., a server and host device) on the network, on the expression pattern of each of the other terminal devices with the registered information being delivered from the another device, and a system configured to obtain the information on the expression pattern for each of the other terminal devices with the information being transmitted from each of the other terminal devices.

As aforementioned, when the obtaining system is configured as a system configured to obtain the information, which is registered by another device on the network, on the expression pattern of each of the other terminal devices with the registered information being delivered from the another device, or a system configured to obtain the information on the expression pattern for each of the other terminal devices with the information being transmitted from each of the other terminal devices, it is possible to save the input operations by the user and prevent the user from providing wrong inputs. Further, when the obtaining system is configured as a system configured to obtain the information on the expression pattern for each of the other terminal devices with the information being transmitted from each of the other terminal devices, it is possible to obtain the information on the expression patterns without the server or the host device being provided on the network. In addition, since the existing server or host device is not required to have a function of delivering the information on the expression patterns to the terminal device, it is possible to reduce the load of the existing server or host device.

According to a further aspect of the present invention, there is provided a terminal device configured to be operated by a host device connected to a network, the terminal device being to be connected to the network together with other terminal devices, each of which has at least one of an appearance and function similar to those of the terminal device, the terminal device. The terminal device includes: an output device configured to output information; a self-pattern storing system configured to store information on an expression pattern for the terminal device; and an output executing system configured to make the output device output the expression pattern for the terminal device, based upon the information on the expression pattern stored in the self-pattern storing system.

In aspects of the aforementioned terminal device, the output executing system makes the output device output the expression pattern for the terminal device, based upon the information on the expression pattern for the terminal device, which is unique to the terminal device and different from any of expression patterns for the other terminal devices, stored in the self-pattern storing system. Accordingly, even though a plurality of terminal devices with appearances or functions similar to the appearance or function of the terminal device itself is connected to the network, by the expression pattern outputted from the terminal device itself, the user can discriminate the terminal device itself from the other terminal devices. Thereby, in an easy way to visually recognize the terminal device, the user can specify the terminal device. For this reason, it is not required for the user to carry out troublesome operations such as checking out the IP address and/or serial number to specify the terminal device. Consequently, it is possible to save necessary efforts of the user for specifying the terminal device. Also, it can be simplified for the user who is unaccustomed to the troublesome operations to specify the terminal device to be operated on the network.

In addition, since the expression pattern is simpler information than the IP address or serial number expressed as an arrangement of numerical characters, the user can easily memorize the expression pattern as the information for specifying the terminal device. Therefore, when another new terminal device is connected to the network, an expression pattern different from any of the expression patterns of the other terminal devices already connected to the network is outputted from the new terminal device. Thereby, the user can simply grasp the existence of the new terminal device on the network.

According to a further aspect of the present invention, there is provided a network system, which includes: a plurality of terminal devices connected with a network; a host device configured to individually operate the plurality of the terminal devices; an obtaining system configured to obtain information on an expression pattern set as an expression pattern for each of the plurality of terminal devices; and a setting system configured to set the expression pattern for each of the plurality of terminal devices such that the expression pattern of each of the plurality of terminal devices is different from the expression patterns of the other terminal devices, based upon the expression pattern information obtained by the obtaining system. The terminal device includes: an output device configured to output information; a self-pattern storing system configured to store information on the expression pattern for the terminal device therein; a configuring system configured to configure the information on the expression pattern, which is set by the setting system as the expression pattern for the terminal device, into the self-pattern storing system; and an output executing system configured to make the output device output the expression pattern for the terminal device, based upon the information on the expression pattern for the terminal device. The terminal device is configured to be discriminated from the other terminal devices connected to the network with the expression pattern that the output executing system makes the output device output. The host device includes: a host device displaying system configured to display information; a host indicator information storing system configured to store therein indicator information including at least one of a name and location data on the network that are given to each of the terminal devices as information for indicating each of the terminal devices; a host expression pattern storing system configured to store therein the information on the expression pattern for each of the terminal devices, associated with the indicator information stored in the host indicator information storing system; and a display executing system configured to make the host device displaying system display the expression pattern for the terminal device corresponding to the indicator information given to each of the terminal devices, associated with the indicator information, based upon the information on the expression pattern for each of the terminal devices stored in the host expression pattern storing system, in the case where the indicator information stored in the host indicator information storing system is displayed on the host device displaying system.

In aspects of the aforementioned network system, when the terminal device is connected to the network, the information on the expression pattern set as the expression pattern for the terminal device is obtained by the obtaining system. Then, based upon the information on the expression pattern obtained by the obtaining system, the setting system sets the expression pattern for each of the terminal devices such that the expression pattern of each of the terminal devices is different from the expression patterns of the other terminal devices.

In the terminal device, the configuring system configures the information on the expression pattern, which is set by the setting system as the expression pattern for the terminal device, into the self-pattern storing system. Then, the output executing system makes the output device output the expression pattern for the terminal device, based upon the information on the expression pattern for the terminal device. On the other hand, in the host device, there is stored in the host indicator information storing system the indicator information including at least one of the name and location data on the network that are given to each of the terminal devices as information for indicating each of the terminal devices. The information on the expression pattern for each of the terminal devices is stored in the host expression pattern storing system, associated with the indicator information stored in the host indicator information storing system. The display executing system makes the host device displaying system display the expression pattern for the terminal device corresponding to the indicator information given to each of the terminal devices, associated with the indicator information, based upon the information on the expression pattern for each of the terminal devices stored in the host expression pattern storing system, in the case where the indicator information stored in the host indicator information storing system is displayed on the host device displaying system. For this reason, the terminal device can make the user discriminate itself from the other terminal devices connected to the network with the expression pattern for the terminal device itself, which is differentiated from the expression patterns for the other terminal devices, being outputted. Further, the host device can display the indicator information for the terminal device associated with the expression pattern for the terminal device.

Therefore, even though the plurality of terminal devices, which have the similar appearances or functions, is connected to the network, the terminal device can output the expression pattern therefore to make the user discriminate itself from the other terminal devices. In addition, the user can simply accurately confirm which terminal device the indicator information displayed on the host device corresponds to by comparing the expression pattern outputted on the host device displaying system associated with the indicator information with the expression pattern actually outputted from the terminal device. Hence, it is possible to avoid such trouble that the user cannot adequately select an intended terminal device to be operated because of an unclear relationship between the terminal device set as the intended terminal device to be operated on the host device and the terminal device that actually operates, and/or such trouble that the user sets an improper terminal device as the intended terminal device to be operated due to misunderstanding of the user.

It is noted that the obtaining system, which obtains the expression pattern for the terminal device, may be provided in any of the terminal device and the host device. Further, if a server is connected to the network, the obtaining system may be provided in the server. In addition, the obtaining system may be configured to obtain the expression pattern for the terminal device with input operations being given by the user.

The obtaining system may be configured to obtain the expression pattern for the terminal device via network communication between the terminal device and the host device or the server (a device that stores the expression pattern for each of the terminal devices), or between the terminal device and the other terminal devices.

When the obtaining system is configured to obtain the expression pattern for each of the terminal devices via the network communication as aforementioned, the user is not required to give the input operations, and it is possible to avoid an improper input caused by mistaken input operations. Furthermore, when the obtaining system is configured to obtain the expression pattern for each of the terminal devices via the network communication between the terminal device and the other terminal device, the information on the expression pattern can be obtained without a new server or host device being connected to the network in addition to the existing server or host device currently connected to the network. Also, it is possible to avoid increasing the load of the existing server or host device.

Optionally, the terminal device may include a sending system configured to send the information on the expression pattern for the terminal device outside based upon the information stored in the self-pattern storing system, in response to another terminal device requesting the terminal device to send the information on the expression pattern for the terminal device. Optionally, the host device may include an expression pattern request system configured to request the terminal device to transmit the information on the expression pattern for the terminal device, and a pattern configuring system configured to configure the information on the expression pattern for the terminal device into the host expression pattern storing system, based upon the information on the expression pattern sent from the terminal device responsive to the transmission request by the expression pattern request system.

In some aspects, the sending system sends the information on the expression pattern for the terminal device outside based upon the information stored in the self-pattern storing system, in response to another terminal device requesting the terminal device to send the information on the expression pattern for the terminal device. In the host device, the expression pattern request system requests the terminal device to transmit the information on the expression pattern for the terminal device. Then, the pattern configuring system configures the information on the expression pattern for the terminal device into the host expression pattern storing system, based upon the information on the expression pattern sent from the terminal device responsive to the transmission request by the expression pattern request system.

Accordingly, the host device can store therein the expression pattern for each of the terminal devices sent from each of the terminal devices. In other words, the host device can store therein the expression pattern for each of the terminal devices via the network communication with each of the terminal devices. For this reason, input operations by the user for inputting the information on the expression pattern for each of the terminal devices are not required, and it is possible to reduce efforts of the user. Thereby, when the user who is not accustomed to operating the terminal device or the host device operates the terminal device or the host device, the expression pattern for the terminal device is certainly stored in the host device. Further, it is possible to avoid an improper expression pattern being set due to mistaken operations.

Sill optionally, the terminal device may include the obtaining system and the setting system. Optionally, the obtaining system may include a transmission request system configured to request to send the information on the expression patterns for the other terminal devices connected to the network, a pattern information receiving system configured to receive the information, which is sent from the other terminal devices responsive to the transmission request by the transmission request system, and an other-pattern storing system configured to store the information received by the pattern information receiving system therein. Optionally, the setting system may be configured to define an expression pattern different from any of the expression patterns for the other terminal devices as the expression pattern for the terminal device, based upon the information, which is obtained by the obtaining system, the setting system being configured to set information on the defined expression pattern as the information on the expression pattern for the terminal device.

In some aspects, the terminal device includes the obtaining system and the setting system. When another device requests the terminal device to send the expression pattern for the terminal device, the sending system of the terminal device sends the information on the expression pattern for the terminal device outside, based upon the information stored in the self-pattern storing system. Meanwhile, the transmission request system requests to send the information on the expression patterns for the other terminal devices connected to the network. Further, the pattern information receiving system receives the information, which is sent from the other terminal devices responsive to the transmission request by the transmission request system. Then, based upon the information received by the pattern information receiving system, the information on the expression patterns for the other terminal devices is stored in the other-pattern storing system. Thereafter, the setting system defines an expression pattern different from any of the expression patterns for the other terminal devices as the expression pattern for the terminal device, based upon the information obtained by the obtaining system, and sets the information on the defined expression pattern as the information on the expression pattern for the terminal device.

Accordingly, the terminal device can send the information on the expression pattern for itself outside (another device etc.). Moreover, the terminal device can obtain the information on the expression patterns for the other terminal devices via the network communication for receiving the information on the expression patterns for the other terminal devices. In addition, the terminal device can make each of the other terminal devices obtain the information on the expression pattern for the terminal device. Namely, when the terminal device set the expression pattern for itself, it is possible to prevent the user from performing input operations for inputting the information on the expression pattern for each of the other terminal devices, and reduce efforts of the user. Further, in this case, since the expression pattern for the terminal device is not set by the input operations of the user, there is not such trouble that the user forgets setting the expression pattern for the terminal device, and it is possible to certainly set the expression pattern for the terminal device. In addition, it is possible to avoid an improper expression pattern (for example, the same expression pattern as that for one of the other terminal devices) being set due to mistaken input operations by the user.

Optionally, the host device may include a terminal device specifying system configured to specify at least one terminal device in a state where the display executing system makes the host device displaying system display the expression pattern for each of the terminal devices associated with the indicator information given to each of the terminal devices, an operation instructing system configured to give an instruction to the at least one terminal device specified by the terminal device specifying system such that the at least terminal device executes an operation, and an instruction transmitting system configured to transmit the instruction given by the operation instructing system to the at least one terminal device specified by the terminal device specifying system. Optionally, the terminal device may include an instruction receiving system configured to receive the instruction transmitted from the instruction transmitting system, and an operation executing system configured to execute a predetermined operation according to the instruction that is transmitted from the instruction transmitting system to be received by the instruction receiving system.

In some aspects, the terminal device specifying system specifies at least one terminal device in a state where the display executing system makes the host device displaying system display the expression pattern for each of the terminal devices associated with the indicator information given to each of the terminal devices. Then, the operation instructing system gives an instruction to the at least one terminal device specified by the terminal device specifying system such that the at least terminal device executes an operation, and the instruction transmitting system transmits the instruction given by the operation instructing system to the at least one terminal device specified by the terminal device specifying system. In the terminal device, when the instruction receiving system receives the instruction transmitted from the instruction transmitting system, the operation executing system executes a predetermined operation according to the instruction that is transmitted from the instruction transmitting system.

When the user operates the terminal device via the network from the host device, the intended terminal device to be operated has to be specified. In this case, the terminal device specifying system specifies the terminal device in the state where the display executing system makes the host device displaying system display the expression pattern for each of the terminal devices associated with the indicator information given to each of the terminal devices. Accordingly, the user can give an instruction for operating the terminal device to the intended terminal device to be operated from the host device, confirming the intended terminal device with the expression pattern outputted on a display screen of the host device displaying system. Thereby, when the instruction for operating the intended terminal device is transmitted from the host device to the intended terminal device, the expression pattern for the intended terminal device is clearly shown. Therefore, the user can easily confirm the intended terminal device by the expression pattern outputted from the terminal device, and it is possible to prevent the user from specifying an improper terminal device. In addition, the user can adequately specify the intended terminal device to be operated only by confirming the intended terminal device with the expression pattern displayed on the host device being employed as an indicator, without memorizing the expression pattern (the relationship between the indicator information and the expression pattern) for each of the terminal devices to confirm the intended terminal device.

Optionally, the display executing system may be configured to make the host device displaying system display the indicator information, stored in the host indicator information storing system, corresponding to each of the plurality of terminal devices and the expression pattern corresponding to each of the indicator information on one display screen of the host device displaying system according to a form of a list.

In some aspects, the display executing system makes the host device displaying system display the indicator information, stored in the host indicator information storing system, corresponding to each of the plurality of terminal devices and the expression pattern corresponding to each of the indicator information on one display screen of the host device displaying system according to a form of a list. Therefore, since the expression pattern is displayed associated with the indicator information in the methodically organized form, the user can easily understand the relationship between the indicator information and the expression pattern.

According to a further aspect of the present invention, there is provided a computer program product including computer readable instructions for controlling a terminal device to be operated by a host device connected to a network. The terminal device is to be connected to the network together with other terminal devices. Each of the other terminal devices has at least one of an appearance and function similar to those of the terminal device. The computer readable instructions control the terminal device to: obtain information on expression patterns for the other terminal devices connected to the network; define an expression pattern different from any of the expression patterns for the other terminal devices as an expression pattern for the terminal device, based upon the information obtained in said obtaining; set information on the expression pattern defined in said defining as information on the expression pattern for the terminal device; and output the expression pattern for the terminal device based upon the information, set in said setting, on the expression pattern for the terminal device.

In aspects of the aforementioned computer program product, the information on the expression pattern for the other terminal devices connected to the network is obtained is said obtaining. Based upon the information on the expression patterns for the other terminal devices obtained in said obtaining, an expression pattern different from any of the expression patterns for the other terminal devices is defined as the expression pattern for the terminal device in said defining. Then, information on the defined expression pattern is set as the information on the expression pattern for the terminal device in said setting. Then, based upon the information, set in said setting, on the expression pattern for the terminal device, the expression pattern for the terminal device is outputted on the output device in said outputting. Therefore, it is possible to make the terminal device output the expression pattern differentiated from the expression patterns for the other terminal devices connected to the network.

Accordingly, when a plurality of terminal devices, which have similar appearances and/or functions, is connected to the network, it is possible to make the user discriminate the terminal device from the other terminal devices with the expression pattern outputted from the terminal device. Thereby, in an easy way to visually recognize the terminal device, the user can simply clearly discriminate each of the terminal devices. For this reason, troublesome and advanced operations of checking out an IP address and serial number by the user are not required. Consequently, it is possible to reduce efforts of the user necessary for specifying the terminal device. The user who is not accustomed to such troublesome operations can easily specify the intended terminal device to be operated on the network.

According to a further aspect of the present invention, there is provided a computer program product including computer readable instructions for controlling a host device to be connected to a network together with a plurality of terminal devices. Each of the plurality of terminal devices has at least one of an appearance and function similar to those of each of the other terminal devices. The host device is configured to individually operate the plurality of terminal devices. The computer readable instructions control the host device to: store information on an expression pattern for each of the plurality of terminal devices, associated with indicator information, for indicating each of the plurality of terminal devices, including at least one of a name and location data on the network that are given to each of the plurality of terminal devices; display the indicator information; and display the expression pattern for the terminal device corresponding to the indicator information, associated with the indicator information of each of the plurality of terminal devices, based upon the information stored in said storing.

In aspects of the aforementioned computer program product, the information on an expression pattern for each of the plurality of terminal devices is stored in said storing, associated with indicator information, for indicating each of the plurality of terminal devices, including at least one of a name and location data on the network that are given to each of the plurality of terminal devices. Then, the expression pattern for the terminal device corresponding to the indicator information is displayed in said displaying the expression pattern, associated with the indicator information of each of the plurality of terminal devices, based upon the information stored in said storing. Accordingly, in the host device, since the expression pattern for the terminal device is outputted associated with the indicator information, the user can easily adequately confirm which terminal device a terminal device specified by the indicator information in the host device actually corresponds to by comparing the outputted expression pattern with the expression pattern actually outputted from the terminal device. Hence, it is possible to avoid such trouble that the user cannot adequately select an intended terminal device to be operated because of an unclear relationship between the terminal device set as the intended terminal device to be operated on the host device and the terminal device that actually operates, and/or such trouble that the user sets an improper terminal device as the intended terminal device to be operated due to misunderstanding of the user.

According to a further aspect of the present invention, there is provided a computer program product including computer readable instructions for controlling a network system including a plurality of terminal devices connected thereto and a host device configured to individually operate the plurality of terminal devices via the network. Each of the plurality of terminal devices has at least one of an appearance and function similar to those of each of the other terminal devices. The computer readable instructions control the network system to: obtain information on an expression pattern defined as an expression pattern for each of the plurality of terminal devices; set the expression pattern for each of the plurality of terminal devices such that the expression patterns for the plurality of terminal devices differ from each other, based upon the information, obtained in said obtaining; configure into each of the plurality of terminal devices the information on the expression pattern for itself based upon the expression pattern for each of the plurality of terminal devices set in said setting; output from each of the plurality of terminal devices the expression pattern for itself, based upon the information on the expression pattern for itself; store the information on the expression pattern for each of the plurality of terminal devices, associated with indicator information, for indicating each of the plurality of terminal devices, including at least one of a name and location data on the network that are given to each of the plurality of terminal devices; display the indicator information on the host device; and display the expression pattern and the indicator information, associated with one another, according to the expression pattern outputted from each of the plurality of terminal devices in said outputting, based upon the information, stored in said storing, on the expression pattern for each of the plurality of terminal devices, in the case where the indicator information is displayed on the host device in said displaying the indicator information.

In aspects of the aforementioned computer program product, when the terminal device is connected to the network, the information on the expression pattern defined as the expression pattern for each of the plurality of terminal device is obtained in said obtaining. Then, the expression pattern for each of the plurality of terminal devices is set in said setting such that the expression patterns for the plurality of terminal devices differ from each other, based upon the information, obtained in said obtaining. Thereafter, the information on the expression pattern for the terminal device is configured into each of the plurality of terminal devices in said configuring based upon the expression pattern for each of the plurality of terminal devices set in said setting. Then, the expression pattern for the terminal device is outputted from each of the plurality of terminal devices in said outputting, based upon the information on the expression pattern for the terminal device. In addition, the information on the expression pattern for each of the plurality of terminal devices is stored in said storing, associated with indicator information, for indicating each of the plurality of terminal devices, including at least one of a name and location data on the network that are given to each of the plurality of terminal devices. When the indicator information on the host device is displayed in said displaying the indicator information, the expression pattern and the indicator information is displayed, associated with one another, according to the expression pattern outputted from each of the plurality of terminal devices in said outputting, based upon the information, stored in said storing, on the expression pattern for each of the plurality of terminal devices, in the case where the indicator information is displayed on the host device in said displaying the indicator information.

Accordingly, when a plurality of terminal devices, which have similar appearances and/or functions, is connected to the network, it is possible to output the expression pattern for each of the terminal devices from each of the terminal devices. Therefore, it is possible to make the user discriminate each of the terminal devices. Further, in the host device, since the expression pattern for the terminal device is outputted associated with the indicator information, the user can easily adequately confirm which terminal device a terminal device specified by the indicator information in the host device actually corresponds to by comparing the outputted expression pattern with the expression pattern actually outputted from the terminal device. Hence, it is possible to avoid such trouble that the user cannot adequately select an intended terminal device to be operated because of an unclear relationship between the terminal device set as the intended terminal device to be operated on the host device and the terminal device that actually operates, and/or such trouble that the user sets an improper terminal device as the intended terminal device to be operated due to misunderstanding of the user.

Illustrative Aspects

Figure 1:
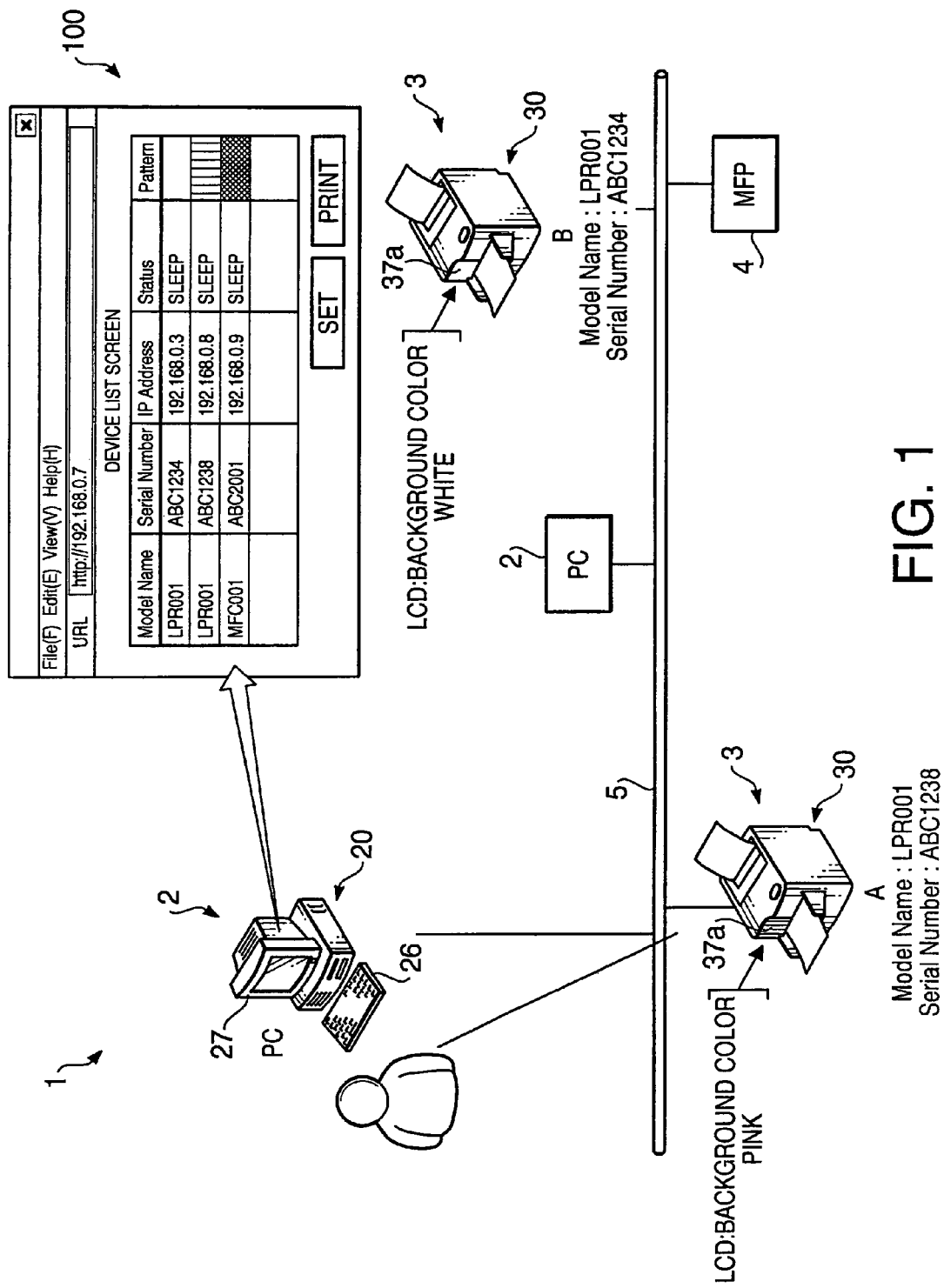

Hereinafter, an illustrative embodiment according to the present invention will be explained with reference to the accompanying drawings. FIG. 1 schematically shows a network system 1 in an illustrative embodiment according to the present invention. The network system 1 includes, as terminal devices, the same type of printers 3, a Multi Function Peripheral (hereinafter, simply referred to as an "MFP") 4 that serves as a printer, scanner, and facsimile machine. The network system 1 also includes as host devices personal computers (hereinafter, simply "red to as "PCs") 2 that operate the printers 3 and MFP 4. Further, in the network system 1, the aforementioned devices are interconnected via a network 5 that is configured with network cables (not shown) and a router (not shown) to which an IP address of "192.168.0.1" is assigned. It is noted that although only the two PCs 2, two printers 3, and one MFP are shown in FIG. 1 for the sake of simple explanation of the illustrative embodiment, the actual network system 1 is configured with a lot of devices, connected to the network 5, such as other PCs of the same type as the PCs 2 or different types, and other terminal devices of the same types as the printers 3 and MFP 4.

The printer 3 is provided with a liquid crystal display (hereinafter, simply referred to as an "LCD") 37a, which can display a colored image, placed at the outside of a housing 30 such that a user can visually recognize the LCD 37a. The LCD 37a is provided with a display screen 200 (see FIG. 6) for displaying data about a status of the printer 3 and/or identification data of the printer 3.

In a similar manner to the printer 3, the MFP 4 is provided with an LCD 47a, which can display a colored image, placed at the outside of a housing such that the user can visually recognize the LCD 47a. The LCD 47a is configured to display data about a status of the MFP 4 and/or identification data of the MFP 4.

In the illustrative embodiment, in each of the printers 3 and the MFP 4, there are stored two kinds of identification data for individually identifying each of them. One of the two kinds of identification data is indicator information shown by a numerical value or a symbol given to label each of the printers 3 and the MFP 4. More specifically, it includes, for example, a model name, serial number (or a node name that the user arbitrarily determines based upon the serial number), and IP address. The other is information on a display pattern, unique to each of the printers 3 and MFP 4, which is set for each of the printer 3 and MFP 4 when each of the printers 3 and MFP 4 is connected to the network 5. The display pattern is a display condition of a background color of the LCD 37a or LCD 47a. In the illustrative embodiment, the display pattern (a combination of a color, pattern, and lighting condition) is configured unique to each of the devices, and the unique display pattern set for each of the devices is stored in the corresponding device. Each of the printer 3 and MFP 4 always outputs the identification data on its own LCD (the LCD 37a or the LCD 38a) such that the user can identify each of the devices at any timing.

It is noted that the above "always outputs" means not only to continuously output the identification data, but also to output the identification data periodically or intermittently.

The PC 2 is configured with a main body 20 connected with a keyboard 26, CRT display 27, mouse (not shown). The PC 2 is a device that makes the terminal devices 3 and 4 operate via the network 5. In other words, when the operation target (the printer 3 or the MFP 4) is assigned with the user giving a predetermined input operation to the PC 2, the PC 2 allows the assigned device to execute a process. Here, in the PC 2 of the illustrative embodiment, there are stored the display pattern that is set for each of the terminal devices 3 and 4 (the printer 3 and the MFP 4) connected to the network 5, and the corresponding indicator information. The PC 2 in the illustrative embodiment is configured such that a device list screen image 100 for displaying the display pattern and indicator information associated with each other is outputted on a CRT display 27.

FIG. 2 is a block diagram showing an electrical configuration of the PC 2, and the printer 3 and MFP 4 connected to the PC 2.

As shown in FIG. 2, the main body 20 of the PC 2 is provided with a CPU (Central Processing Unit) 21 that executes various processes to be executed in PC 2, a ROM (Read Only Memory) 22 that stores a boot processing program (BIOS) to be executed by the CPU 21 on start-up of the PC 2, a RAM (Random Access Memory) 23 that serves as a memory area when the CPU 21 executes the various processes, an HDD (hard disk drive) 25 that stores programs for various processes to be executed by the CPU 21, and a LAN I/F (LAN interface) 29 that is connected to interconnect the CPU 21 and other devices connected to the network 5. In addition, the main body 20 of the PC 2 is provided with an input interface (not shown) for inputting an input signal issued from the keyboard 26 or mouse to the CPU 21, and a video interface for displaying on the CRT display 27 a screen image based upon a command issued from the CPU 21. In the main body 20, the above constituent elements are interconnected.

The RAM 23 includes a device list counter 23a. The device list counter 23a is configured to count the number of the terminal devices 3 and 4 whose identification data has already been updated in a process of updating the identification data, stored in a host device list table 25d (described later), of the terminal devices 3 and 4 (a device list updating process, see FIG. 10). The counted value of the device list counter 23a is reset to be "0" at the start of the device list updating process, and thereafter "1" is added to the value every time the identification data of the terminal devices 3 and 4 is updated. The counted value is repeatedly updated until the counted value reaches the number of the terminal devices 3 and 4 (of the identification data) stored in the host device list table 25d.

The HDD 25 is a rewritable nonvolatile large-capacity storage device provided with control programs 25a, a DHCP server program 25b, a pattern table 25c, a host device list table 25d, and an identification data memory 25e.

The control programs 25a includes an operating system of the PC 2 and programs for various processes to be executed by the CPU 21. A program of flowcharts shown in FIGS. 8 to 10 is stored as a part of the control programs 25a.

The DHCP server program 25b is configured to assign a dynamic IP address to each of the terminal devices 3 and 4 connected to the network 5. In the illustrative embodiment, among the PCs 2 connected to the network 5, one PC 2 is provided as a DHCP server, in which the DHCP server program 25b is installed. When requests to assign IP addresses to the terminal devices 3 and 4 connected to the network 5 are issued from the terminal device 3 and 4, available IP addresses among the IP addresses stored in a predetermined area of the HDD 25 are assigned to the terminal devices 3 and 4 by the DHCP server program 25b, that is, the necessary information (IP addresses) for connecting to the network 5 are sent to the terminal devices 3 and 4 as requesting sources. It is noted that the DHCP server program 25b is not necessarily provided in the PC 2, and the DHCP server program 25b may be provided in the router or a dedicated server. When the DHCP server program 25b is provided in the router or the dedicated server, the function as the DHCP server can be deleted from the PC 2 to save trouble of the PC 2 required for control. Especially, when the router is assigned to be the DHCP server, and the DHCP server program 25b is installed in the router, it is very convenient because the router is generally set always powered ON, i.e., the DHCP server is always powered ON.

The pattern table 25c is configured to store information on predetermined selectable display patterns as display patterns for the terminal devices 3 and 4. In the pattern table 25c, there are stored information on the display pattern to be outputted as the identification data of the terminal devices 3 and 4, and specific display pattern information showing the statuses of the terminal devices 3 and 4. The display patterns as the identification data and the specific display patterns are designed not to have a common pattern.

The specific display pattern stored in the pattern table 25c corresponds to the following two specific statuses. The specific statuses of the terminal devices 3 and 4, in the illustrative embodiment, are defined as an error status where the terminal devices 3 and 4 are under an unrecoverable condition and a warning status where operations of the terminal devices 3 and 4 by the users are necessary. The information on the specific display patterns (error display pattern and warning display pattern) corresponding to the specific statuses is stored in the pattern table 25c. When the terminal devices 3 and 4 are under the specific statuses, the corresponding specific display patterns are outputted from the terminal devices 3 and 4 (LCD 37a and LCD 47a).

In addition to the aforementioned two specific display patterns corresponding to the specific statuses, there are provided two specific display patterns representing whether or not the terminal devices 3 and 4 are in connected statuses where the terminal devices 3 and 4 are connected to the network 5. For this reason, in the pattern table 25c, there are also stored the specific display pattern representing that the terminal device 3 or 4 is in the connected status (connection display pattern), and the specific display pattern representing that the terminal devices 3 or 4 is in the unconnected status (non-connection display pattern). Accordingly, in the pattern table 25c, there are stored the four specific display patterns in total. The connection display pattern and non-connection display pattern are outputted in a background area on a splash screen image displayed for a predetermined time period on start-up of the terminal devices 3 and 4. It is noted that the connection display pattern is not displayed on the normal display screen 200 (see FIGS. 6A and 6B) of the terminal devices 3 and 4 in the illustrative embodiment. However, as well as the other display patterns, the connection display pattern and non-connection display pattern may be configured to be outputted on the display screen 200 of the terminal devices 3 and 4 such that the connection statuses of the terminal devices 3 and 4 are always visually recognized based upon which, between the connection display pattern and the non-connection display pattern, is displayed on the display screen 200.

Pattern tables 35c and 45c (described later) of the terminal devices 3 and 4 (printer 3 and MFP 4) are configured in a similar fashion to the pattern table 25c. The details of the pattern tables 25c, 35c, and 45c are described later in explanation of FIG. 3.

The host device list table 25d is configured to store, associated with each of the terminal devices 3 and 4, the indicator information, a pattern code representing the unique display pattern to each of the terminal devices as the identification data, and status information showing the status of each of the terminal devices 3 and 4. The host device list table 25d is explained with reference to FIG. 4. FIG. 4 schematically shows a configuration of the host device list table 25d. In the host device list table 25d, there are stored, for each of the terminal devices 3 and 4, a group of indicator information, i.e., an IP Address, model name, serial number that is given in a manufacturing process to discriminate each of the terminal devices 3 and 4. In addition, in the host device list table 25d, there are stored, associated with each of the indicator information, a subnet mask and default gateway necessary for each of the terminal devices 3 and 4 normally performing network communication in the network to which the terminal devices 3 and 4 are connected.

Further, in the host device list table 25*d*, there are stored, associated with each of the indicator information, the pattern code representing the display pattern unique to the terminal device to which each of the indicator information is given, and the status information of the terminal device. The pattern code is data for selecting a display pattern with reference to the pattern table 25*c*. The pattern code is configured with a numerical value of "0" to "95". The status information of the terminal device is for showing the status of each of the terminal devices 3 and 4. In the host device list table 25*d*, there is stored as the status information any of five kinds of information, i.e., "Error" corresponding to the error status, "Warning" corresponding to a warning status, "Connection Error" corresponding to the unconnected status, "Sleep" corresponding to a standby status, and "Active" corresponding to an operating status (output operation in execution).

More specifically, as shown in FIG. 4, for example, there is stored in the host device list table 25*d* the following information: the display pattern specified by a pattern code of "4" is set as a unique display pattern for the terminal device (printer 3), to which a model name of "LPR001" and a serial number of "ABC1234" are given, connected to the network 5 with an IP address of "192.168.0.3", a subnet mask of "255.255.0.0", and a default gateway of "192.168.0.1", and the terminal device (printer 3) is currently in the standby status "Sleep".

Similarly, there is stored in the host device list table 25*d* the following information: the display pattern specified by a pattern code of "5" is set as a unique display pattern for the terminal device (printer 3), to which a model name of "LPR001" and a serial number of "ABC1238" are given, connected to the network 5 with an IP address of "192.168.0.8", a subnet mask of "255.255.0.0", and a default gateway of "192.168.0.1", and the terminal device (printer 3) is currently in the unconnected status "Connection Error".

Further, there is stored in the host device list table 25*d* the following information: the display pattern specified by a pattern code of "6" is set as a unique display pattern for the terminal device (MFP 4), to which a model name of "MFC001" and a serial number of "ABC2001" are given, connected to the network 5 with an IP address of "192.168.0.9", a subnet mask of "255.255.0.0", and a default gateway of "192.168.0.1", and the terminal device (MFP 4) is currently in the standby status "Sleep". Each of the information stored in the host device list table 25*d* is acquired from each of the terminal devices 3 and 4 every a predetermined time period in a device list updating process (described later, see FIG. 10) to be updated with the newly acquired information every the predetermined time period.

The identification data memory 25*e* is configured to store the identification data that is given to the PC 2 to identify the PC 2. In the identification data memory 25*e*, there are stored a model name, serial number, IP address (for example, "192.168.0.7"), subnet mask (for example, "255.255.0.0"), default gateway address (for example, "192.168.0.1") for the PC 2.

When data is transmitted from the PC 2 to each of the terminal devices 3 and 4, a packet with the identification data stored in the identification data memory 25*e* is transmitted to each of the terminal devices 3 and 4. Thereby, each of the terminal devices 3 and 4 as a destination of the data transmission recognizes from which device the packet is transmitted.

The printer 3 is provided with a CPU 31 that executes various processes to be executed in the printer 3, a ROM 32 that stores a boot processing program (BIOS) to be executed by the CPU 31 on start-up of the printer 3, a RAM 33 that serves as a memory area when the CPU 31 executes the various processes, an EEPROM (Electronically Erasable and Programmable Read Only Memory) 34 that is a rewritable and nonvolatile memory device, an HDD 35 that stores programs for various processes to be executed by the CPU 31, operating keys 36 for inputting various kinds of data, a displaying part 37 for displaying on the LCD 37*a* an image based upon a command issued from the CPU 21, a printing part 38 that includes a print head, driver circuit, and paper feeding mechanism, and executes a printing operation on a paper, and a LAN I/F (LAN interface) 39 that is connected to the network 5 to interconnect the CPU 31 and other devices connected to the network 5. The aforementioned constituent elements are interconnected.

The printer 3 receives an instruction sent from the PC 2, and carries out a predetermined operation according to the instruction. For example, if an instruction for making the printer 3 execute a printing-out operation is sent from the PC 2, the printer 3 will execute the printing-out operation. If an instruction for making the printer 3 rewrite the IP address is sent from the PC 2 (the instruction corresponds to a step of S11 in the below-mentioned setting operation process), the printer 3 will update a last value stored in the corresponding memory (an unchanging address memory 34*d*, or an identification data memory 34*g*) with the received IP address.

The EEPROM 34 is provided with a terminal device list table 34*a*, self-used pattern memory 34*b*, normal address memory 34*c*, unchanging address memory 34*d*, assignment-finished flag 34*e*, packet-received flag 34*f*, identification data memory 34*g*.

The terminal device list table 34*a* is a memory configured to store the indicator information and pattern codes of the terminal devices (printers 3), other than the printer 3 itself, connected to the network 5. It is noted that in the illustrative embodiment, the printer 3 is configured to store in the terminal device list table 34*a* the indicator information and the pattern codes of other printers 3 of the same model (model name) as the printer 3 itself among other printer 3. The CPU 31 refers to the terminal device list table 34*a* in a device background color determining process executed when the printer 3 is connected to the network 5, and determine the display pattern of the printer 3 among display patterns other than the display patterns represented by the pattern codes stored in the terminal device list table 34*a*.

The self-used pattern memory 34*b* is configured to store the pattern code representing the display pattern of the printer 3 itself. A display pattern information stored in the pattern table 35*c* is read out using the pattern code stored in the self-used pattern memory 34*b*, and a displaying operation based upon the read-out display pattern information is carried out in a background area 201 (see FIG. 6) on the LCD 37*a*.

The normal address memory 34*c* and unchanging address memory 34*d* are configured to store IP addresses assigned to the printer 3. More specifically, the normal address memory 34*c* is configured to store the dynamic IP address that is dynamically assigned by the PC 2 as the DHCP server every time the printer 3 is connected to the network 5. Meanwhile, The unchanging address memory 34*d* is configured to store the unchanging IP address that is previously assigned to the printer 3. The unchanging IP address is, for example, an IP address (unchanging IP address) that is set by inputs to a device setting screen image 110 in a setting operation process of the PC 2. The unchanging IP address is sent with a setting change request packet from the PC 2, and is stored in the unchanging address memory 34*d*. Of course, the IP address inputted through the input portion (operating keys 36) provided at the printer 3 may be stored in the unchanging address memory 34d.

The assignment-finished flag 34e is configured to indicate whether the IP address is assigned to the printer 3, and whether a communication state of the printer 3 is established by the assigned IP address. The assignment-finished flag 34e is set ON when the IP address assigned by the DHCP server is stored in the normal address memory 34c.

In addition, the network system 1 in the illustrative embodiment, as aforementioned, is configured such that the unchanging IP address sent with the setting change request packet from the PC 2 is stored in the unchanging address memory 34d. For this reason, when the communication is established by the unchanging IP address, the assignment-finished flag 34e is set ON.

Since the unchanging IP address is set by an input operation of the user, it is uncertain whether the communication of the printer 3 is established only by the unchanging IP address being assigned to the printer 3. Accordingly, the assignment-finished flag 34e is not set ON only by the unchanging IP address being stored in the unchanging address memory 34d. The assignment-finished flag 34e is set ON when the below-mentioned packet-received flag 34f represents that the packet is received with the unchanging IP address stored in the unchanging address memory 34d. The assignment-finished flag 34e set ON is set OFF, when the packet-received flag 34f is set OFF (the unchanging IP address stored in the unchanging address memory 34d is updated with a newly received unchanging IP address), or when the IP address is not stored in any of the normal address memory 34c and the unchanging address memory 34d.

When the IP address stored in the normal address memory 34c is a provisional one that cannot create the network connection, the CPU 31 judges that the IP address is not stored in the normal address memory 34c, so that the assignment-finished flag 34e is not set ON.

The IP address is generally necessary information for the printer 3 being connected with the network 5. When an appropriate IP address, that is, an IP address recognized as the terminal device 3 or 4 on the network 5 is not assigned to the printer 3, the other devices on the network 5 cannot transmit any information to the printer 3 with the IP address. Therefore, it is represented by the assignment-finished flag 34e being set ON that the printer 3 is under a state of being connectable to the network 5 with the IP address, and it is represented by the assignment-finished flag 34e being set OFF that the printer 3 is under a state of not being connectable to the network 5 with the IP address.

The packet-received flag 34f is a flag showing whether the printer 3 had ever received the packet through the packet communication. In other words, the packet-received flag 34f is configured to be set ON when the printer 3 receives the packet whose destination is designated as the IP address assigned to the printer 3 itself. The packet-received flag 34f set ON is set OFF, when the unchanging IP address stored in the unchanging address memory 34d is updated with a newly received unchanging IP address, or when the IP address is assigned to the printer 3 with the unchanging IP address not being assigned from the DHCP server, or when a reset process for restoring each of the settings of the printer 3 to an initial state is carried out. Namely, the packet-received flag 34f set ON once is kept ON until the new IP address different from the last unchanging IP address is stored in the unchanging address memory 34d, or until the IP address is assigned from the DHCP server, or until the reset process is carried out.

The network system 1 is a local area network (hereinafter, simply referred to as an "LAN") of an intranet using an internet technology. The network system 1 is configured to transmit information to a destination device based upon the IP address as an indicator. On the other hand, the network system 1 meets a transmission method specific to the LAN, and is configured such that the communication via the network 5 is performed not only by assigning the destination device with the IP address, but also by assigning a MAC address. When the MAC address of each of the devices on the network 5 is known at a side of the PC 2 or each of the terminal devices 3 and 4, the PC 2 and the terminal devices 3 and 4 can transmit data with the MAC address being added to the packet. Hence, each of the devices serving as the receiving devices on the network 5 compares its own MAC address with the MAC address added to the received packet.

When the MAC address of the printer 3 itself is not identical to the MAC address added to the received packet, the printer 3 renounces the packet. Meanwhile, when the MAC address of the printer 3 itself is identical to the MAC address added to the received packet, the printer 3 receives the packet, and set the packet-received flag 34f ON. Therefore, even though the IP address is not assigned to the printer 3, the packet being received represents that the communication is established, and the CPU 31 judges that the printer 3 is under a state of the communication being established based upon the packet-received flag 34f set ON.

The identification data memory 34g is configured to store the identification data (other than the IP address) added to the printer 3. In the identification data memory 34g, there are stored the MAC address, as well as the model name and serial number as the identification data of the printer 3. In addition, in the identification data memory 34g, there are stored the addresses of the subnet mask and default gateway, which are necessary for the printer 3 normally performing the network communication on the network 5 to which the printer 3 is connected. When the PC 2 asks the printer 3 to send the indicator information, the CPU 31 transmits to the PC 2 the model name and serial number stored in the identification data memory 34g together with the assigned IP address stored in the aforementioned address memories 34c and 34d.

The HDD 35 is provided with control programs 35a, an icon image memory 35b, and a pattern table 35c. The control programs 35a include an operating system of the printer 3, and programs for various processes to be executed by the CPU 31. A program shown in flowcharts of FIGS. 11 to 18 is stored as a part of the control programs 35a.

The icon image memory 35b is configured to store image data of images (icon images) representing connection conditions with the network 5. The connection condition with the network 5, in the illustrative embodiment, is categorized into four conditions. In the icon image memory 35b, there is stored the image data of four icon images corresponding to the above connection conditions. The image data of the icon images is read out from the icon image memory 35b according to the connection condition with the network 5, and is inputted to the displaying part 37 to be displayed in a network condition display area 202 (see FIG. 6) on the LCD 37a.

Figure 7D:
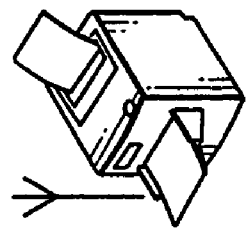

Hereinafter, the image data of the icon images is explained with reference to FIGS. 7A to 7D. FIGS. 7A to 7D shows four icon images stored in the icon image memory 35b. FIG. 7A shows an icon image of "Network Not Available" representing that the printer 3 is not connected to the network 5. FIG. 7B shows an icon image of "Wired Network Available" representing that the printer 3 is connected to the network 5 through the network cable. As shown in FIGS. 7A and 7B, each of the icon images is configured with an image of a wired cable being arranged below an embodied image of the printer 3. Both of the icon images are different in aspect of the image of the network cable. By displaying the icon images, the user can sensuously recognizes whether the printer 3 is connected to the network 5.

Figure 7C:
Figure 7B:
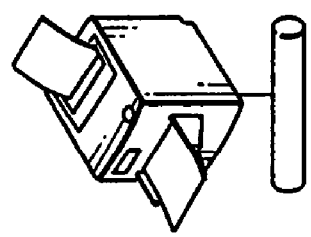
Figure 7A:
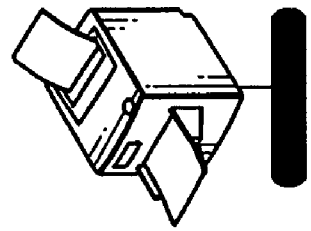

FIG. 7C shows an icon image of "Mail Function Available" representing that the printer 3 is connected to the network 5 through the network cable and a mail server. The icon image of "Mail Function Available" is configured with an embodied image of a mail being added to the icon image of "Wired Network Available" shown in FIG. 7B. By displaying the icon image of "Mail Function Available", the user can sensuously recognize that the printer 3 is connected to the network 5 through the network cable, and is under a state of a mail function being available.

FIG. 7D shows an icon image of "Wireless Network Available" representing that the printer 3 is wirelessly connected to the network 5. The icon image of "Wireless Network Available" is configured with an imitation image of an antenna being arranged behind the embodied image of the printer 3. By displaying the icon image, the user can sensuously recognize that the printer 3 is wirelessly connected to the network 5.

It is noted that in the illustrative embodiment, the printer 3 is configured to selectively create either one of the wired connection and the wireless connection with the network 5. For this reason, two or more icon images are not displayed together in the network condition display area 202 on the LCD 37a.

The pattern table 35c is a table for storing information on a predetermined display pattern that is selectable as the display pattern of the terminal device 3 or 4. The pattern table 35c is configured in the same way as the aforementioned PC 2.

The displaying part 37 is provided with the LCD 37a, and controls the display of the LCD 37a. The LCD 37a is an active matrix liquid crystal display that uses thin film transistors (hereinafter, referred to as "TFTs") as switching devices of pixels. The LCD 37a is a display device configured with the pixels, each of which is formed with three dots of R (red), G (green), and B (blue), so as to perform color display.

When the information on the display patterns and/or the image data (icon images) are inputted to the displaying part 37 by the CPU 31, display signals are generated in the displaying part 37 based upon RGB values of the inputted information on the display patterns and/or the inputted image data. The generated display signals are inputted to the LCD 37a, so that the inputted information on the display patterns and/or the inputted image data are displayed as colored images.

The displaying part 37 is provided with an image memory for temporarily storing the information on the display patterns and/or the image data, an image controller configured to control timing of displaying the data, and other necessary means for displaying the images on the LCD 37a (any of the above constituent elements not shown).

In the same way as the aforementioned printer 3, the MFP 4 includes a CPU 41, ROM 42, RAM 43, EEPROM 44, HDD 45, displaying part 47 provided with an LCD 47a, printing part 48, LAN I/F 49, and input interface (not shown) for inputting an input signal issued from operating keys 46 to the CPU 41. The above constituent elements are interconnected, and function in a similar fashion to the aforementioned printer 3. In addition, the operating keys 46 are connected to the CPU 41 etc. via the input interface.

The MFP 4 further includes structure for accomplishing a facsimile function such as a scanner 50 configured to read an image on a paper by means of an optical method, modem 51 as a modulating/demodulating device, image memory (not shown), data buffer (not shown), digitalizing circuit (not shown), encoding/decoding program (not shown). Each of the means is connected to the CPU 41 in the same way as the above constituent elements.

The modem 51 modulates digital data processed in the MFP 4 to analog data to be inputted to a public line, and demodulates the analog data received from the public line to the digital data. A line controlling part (NCU: Network Control Unit) is incorporated in the modem 51. The modulated analog data is inputted to the public line via the NCU, and the analog data outputted from the public line via the NCU is demodulated to the digital data by the modem 51. In the MFP 4, facsimile data is generated from image data read by the scanner 50 to be transmitted to the destination device via the modem 51. Meanwhile, the facsimile data transmitted from a sending device is received via the modem 51 to be printed out by the printing part 48.

It is noted that a plurality of PCs 2, a plurality of printers 3, and a plurality of MFPs 4 are connected to the network 5. However, since each of the plurality of PCs 2, each of the plurality of printers 3, and each of the plurality of MFPs 4 are configured in the same ways as the aforementioned PC 2, printer 3, and MFP 4, respectively, description thereof will be omitted.

FIG. 3 schematically shows an example of configurations of the pattern tables 25c, 35c, and 45c. The pattern tables 25c, 35c, and 45c are configured to store information on predetermined display patterns to be displayed on the terminal devices 3 and 4. The display pattern is defined with a combination of a color, pattern, and lighting pattern. The display pattern information is configured with color information C, pattern information M, and lighting pattern information P.

The color information C is information representing a color, and is configured with the RGB values for outputting a color on the LCD 37a. In addition, in the illustrative embodiment, there are set 12 kinds of color information C, "Red", "Blue", "Yellow", "Green", "White", "Pink", "Orange", "Black", "Gray", "Brown", "Light Blue", and "Purple".

If the colors of the display patterns are similar to each other, even though the display patterns are different, it is likely hard to discriminate the display patterns. Such a problem happens more often, as the number of the color information increases. To solve this problem, in the illustrative embodiment, the number of colors employed for the display pattern is limited to the 12 colors. In addition, the 12 kinds of color information C are set such that the colors can be relatively clearly discriminated (hue difference is large). Therefore, a plurality of terminal devices 3 and 4 is connected to the network 5, it is easy to discriminate the terminal devices 3 and 4 with the display patterns.

The pattern information M is arrangement information showing arrangement of the dots that output the color information C. By the dots that output the color information C being arranged according to the pattern information M, a pattern is formed in the display pattern. In the illustrative embodiment, there are set four kinds of pattern information M, "Plain" where the dots outputting the color information C are evenly arranged, and "Vertical-Stripe", "Tile", and "Diagonal Lattice" where the dots outputting the color information C are arranged to form predetermined patterns.

The lighting pattern information P is information showing an output condition of the display pattern. In the illustrative embodiment, there are two kinds of lighting pattern information P, i.e., a "No Blinking" pattern for continuously displaying the display pattern, and "Blinking" pattern for intermittently displaying the display pattern.

Each of the pattern tables 25c, 35c, and 45c is a table for storing information on 96 display patterns configured with different combinations of the 12 kinds of color information C, the 4 kinds of pattern information M, and the 2 kinds of lighting pattern information P, respectively. Each of the pattern tables 25c, 35c, and 45c stores the color information C, pattern information M, and lighting pattern information P for each of the display patterns. Further, a combination of the color information C, pattern information M, and lighting pattern information P is coded as a pattern code, and the pattern codes of "0" to "95" are given to the information on the 96 display patterns, respectively.

The pattern code is given with regularity according to the color information C, pattern information M, and lighting pattern information P that constitute the display pattern information. More specifically, the display patterns are categorized depending on which the lighting pattern information P is between the "No Blinking" pattern and "Blinking" pattern. A smaller pattern code is given to the information on the display pattern with the "No Blinking" pattern than the information on the display pattern with the "Blinking" pattern. To each of the groups categorized by the lighting pattern information P, a smaller pattern code is given in the order of the pattern information M, "Diagonal Lattice", "Tile", "Vertical-Stripe", and "Plain". Further, to each of the groups categorized by the pattern information M, a smaller pattern code is given in the order of the color information C, "Purple", "Light Blue", "Brown", "Gray", "Black", "Orange", "Pink", "White", "Green", "Yellow", "Blue", and "Red".

Accordingly, the smallest pattern code "0" is given to the information on the display pattern with a combination of "No Blinking"-"Plain"-"Red" as a combination of the color information C, pattern information M, and lighting pattern information P. Meanwhile, the largest pattern code "95" is given to the information on the display pattern with a combination of the "Blinking" pattern-"Diagonal Lattice"-"Purple" as the combination of the color information C, pattern information M, and lighting pattern information P.

In addition, in the information on the display patterns stored in the pattern tables 25c, 35c, 45c, the display patterns with the pattern codes of "0" to "3" are defined as the specific display patterns representing the statuses of the terminal devices 3 and 4, and are not used as the display patterns outputted as the identification data. Specifically, the information on the display pattern with the pattern code "0" corresponds to the display pattern for the error status. The display pattern information of the pattern code "1" corresponds to the display pattern representing the warning status. The display pattern information of the pattern code "2" corresponds to the display pattern representing the unconnected status. The display pattern information of the pattern code "3" corresponds to the display pattern representing the connected status. The specific display patterns are common signals to the terminal devices 3 and 4, and common display patterns that are predetermined based upon the statuses of the terminal devices 3 and 4. The specific display patterns (except the display pattern representing the connected status) are appropriately selected depending on the statuses of the terminal devices 3 and 4, so as to be outputted on the LCD 37a or 47a of each of the terminal devices 3 and 4.

In addition, as the display pattern displayed as the identification data on each of the terminal devices 3 and 4, a display pattern of the smallest pattern code is selected from the display patterns that are of the pattern codes "4" and more, and are not employed by the other terminal devices 3 and 4 (i.e., the display patterns that are not stored in the terminal device list table 34a), among the pattern codes stored in the pattern tables 25c, 35c, and 45c. Thereby, a unique display pattern is set for each of the terminal devices 3 and 4 on the network 5 in sequence from the display pattern of "No Blinking" and "Plain".

Compared with complicated display patterns, the display pattern that is plain and in the lighted state is such a simple pattern as to be easily visually recognized. Accordingly, by setting the display patterns in sequence from a display pattern of a smaller pattern code among the display patterns stored in the pattern tables 25c, 35c, and 45c, a display pattern of more excellent visibility is preferentially used in sequence.

It is noted that combinations for the display pattern are not limited to the aforementioned patterns, and the number of the combinations may be more or less than 96.

Figures 5A, 5B:
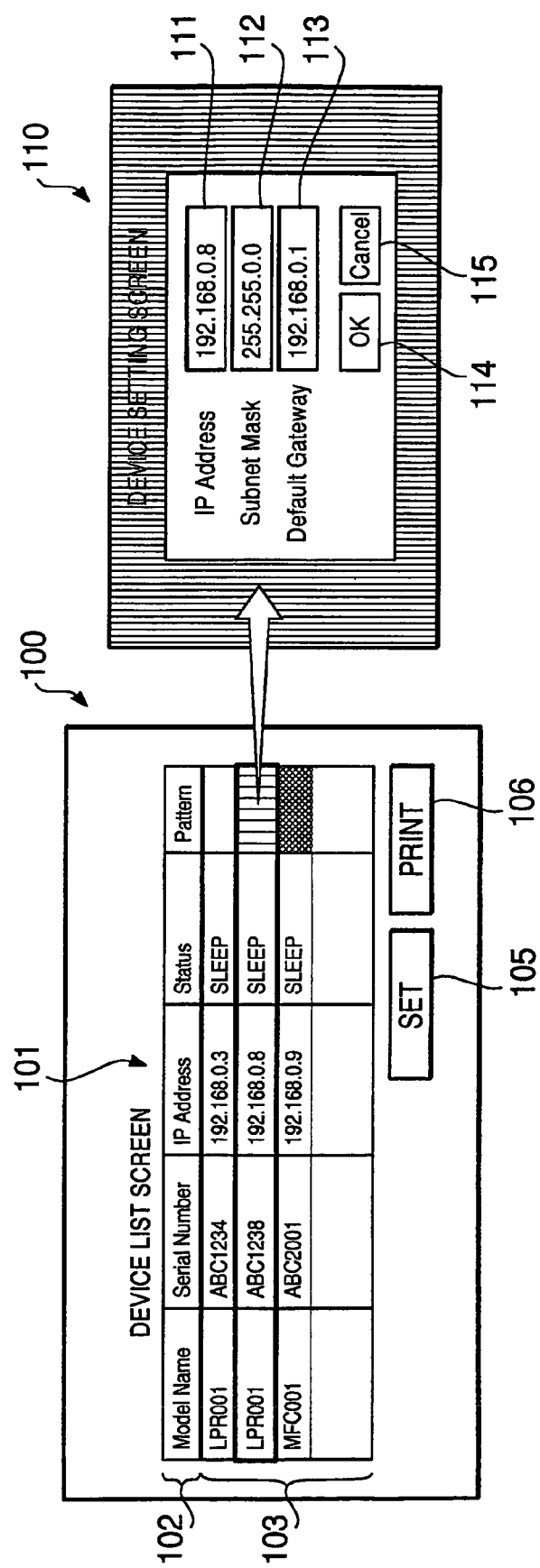
FIGS. 5A and 5B shows image examples displayed on a display screen of a CRT display of the PC in accordance with one or more aspects of the present invention.

FIGS. 5A and 5B are image examples displayed on a display screen of the CRT display 27 of the PC 2. FIG. 5A is an image of a device list screen 100 on which there are displayed the display patterns set for the terminal devices 3 and 4 connected to the network 5, and the corresponding indicator information, associated with each other. FIG. 5B is an image displayed on a device setting screen 110 by specifying one terminal device 3 or 4 on the device list screen 100. It is noted that a part of the display screen image is omitted in each of FIGS. 5A and 5B, so that major elements among the constituent elements are displayed on the display screen.

On the device list screen, there is displayed a list 101 on which the serial number, IP address, status information, display pattern of each of the terminal devices 3 and 4, associated with the model name thereof. Specifically, at the top of the list 101, there are provided item sections 102 for showing items to be displayed, i.e., "Model Name", "Serial Number", "IP Address", "Status", and "Pattern" in sequence from the leftmost section. In addition, there are provided data display sections 103 below the item sections. Each of the data display sections 103 is a section for displaying information corresponding to each of the items displayed in the item sections 102, and below each of the items displayed in the item sections 102, there is provided a display section for displaying information corresponding to each of the items for each of the terminal devices 3 and 4. In addition, the data display sections 103 are formed with a plurality of lines. In each of the lines, a group of information items for each of the terminal devices 3 and 4 is displayed side by side. Each of the indicator information, status information of the terminal device, and display pattern information is read from the host device list table 25d to be displayed in a corresponding display section.

Thus, on the device list screen 100, the indicator information and the display pattern of the terminal device 3 or 4 corresponding to the indicator information are orderly displayed associated with each other. Therefore, the user can readily understand which terminal device 3 or 4 the terminal device 3 or 4 indicated by the indicator information displayed on the PC 2 actually corresponds to, by comparing the display pattern displayed in the device list screen 100 with the display pattern outputted on the terminal device 3 or 4. In addition, since, the status information of each of the terminal devices 3 and 4 is displayed on the device list screen 100 associated with the display pattern, the user can accurately grasp what status each of the terminal devices 3 and 4 is currently in. Furthermore, since the user can provide instructions of setting or printing-out to a terminal device 3 or 4 as an intended operation target on the device list screen 100 on which the display pattern is displayed, the user can provide the instructions with confirming the terminal device 3 or 4 as the intended operation target. Hence, the user can avoid a trouble that the user specifies a wrong device as the intended operation target.

Below the list 101, there are provided a "Set" button 105 for assigning the setting for the indicator information of the terminal device 3 or 4, i.e., IP address (unchanging IP address), subnet mask, and default gateway address, and a "Print" button 106 for assigning the printing-out. With each of the buttons 105 and 106 being clicked on by a cursor displayed on the screen, an input corresponding to each of the buttons 105 and 106 is recognized by the CPU 21. It is noted that each of the setting and printing-out assigned by the inputs corresponding to the buttons 105 and 106 is performed for the terminal device 3 or 4 selected prior to operating the corresponding button. The selection of the terminal device 3 or 4 is made with the terminal device information displayed on the list 101 being clicked on by the cursor.

In FIG. 5A, the terminal device information with a model name of "LPR001" and a serial number of "ABC1238" is selected. In such a state, when the "Set" button 105 is clicked on by the cursor, the device setting screen image 110 shown in FIG. 5B is displayed on the CRT display of the PC 2.

The device setting screen 110 is for configuring the settings for the terminal device 3 or 4 by input operations. For the terminal device 3 or 4 specified on the device list screen, the CPU 21 reads out the subnet mask, and the default gateway address as well as the IP address as the indicator information from the host device list table 25d. The read addresses are displayed in respective display sections 111, 112, and 113 on the device setting screen 110. Information displayed in the display sections 111, 112, and 113 can be changed by input values from the keyboard 26.

On the device setting screen 110, in a marginal area, the display pattern of the terminal device 3 or 4 whose indicator information is displayed on the device setting screen 110 is displayed. Thereby, the user can reconfirm even on the device setting screen 110 which terminal device 3 or 4 is actually selected as the operation target by himself, by comparing the displayed display pattern with the display pattern outputted on the terminal device 3 or 4. Therefore, the user can surely avoid such a trouble as to select a wrong device.

Below the display sections 111 to 113, there are provided an "OK" button 114 for assigning the change of the input values, and a "Cancel" button 115 for canceling the change of the input values. Inputs corresponding to the buttons 114 and 115 are recognized with the buttons 114 and 115 being clicked on by the cursor displayed on the screen. The values displayed in the display sections 111 to 113 are written in the host device list table 25d at timing when the "OK" button 114 is clicked on, and the last values (IP address, subnet mask, and default gateway address) are replaced with the newly written values. Meanwhile, when the "Cancel" button 115 is clicked on, the input operation carried out is regarded invalid, and the last values stored in the host device list table 25d are maintained. The display of the device setting screen 110 is terminated by any of the buttons 114 and 115 being clicked on.

It is noted that the display of the device list screen 100 is terminated with an "X" mark (not shown) indicated at the upper right of the device list screen 100 being clicked on by the cursor.

Figure 6A:
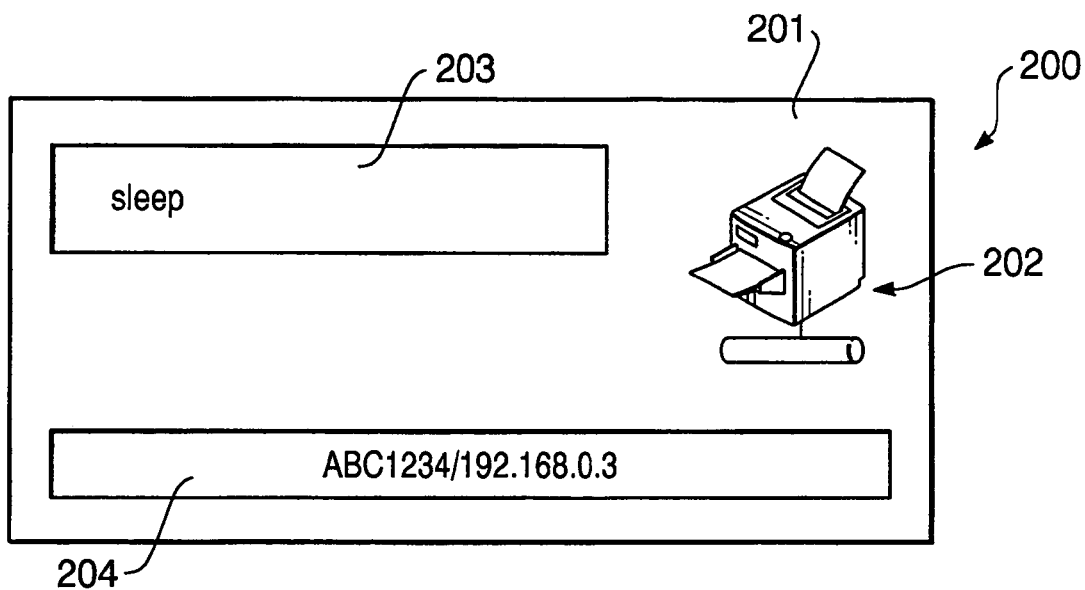
FIGS. 6A and 6B shows image examples displayed on a display screen of a terminal device in accordance with one or more aspects of the present invention.
Figure 6B:
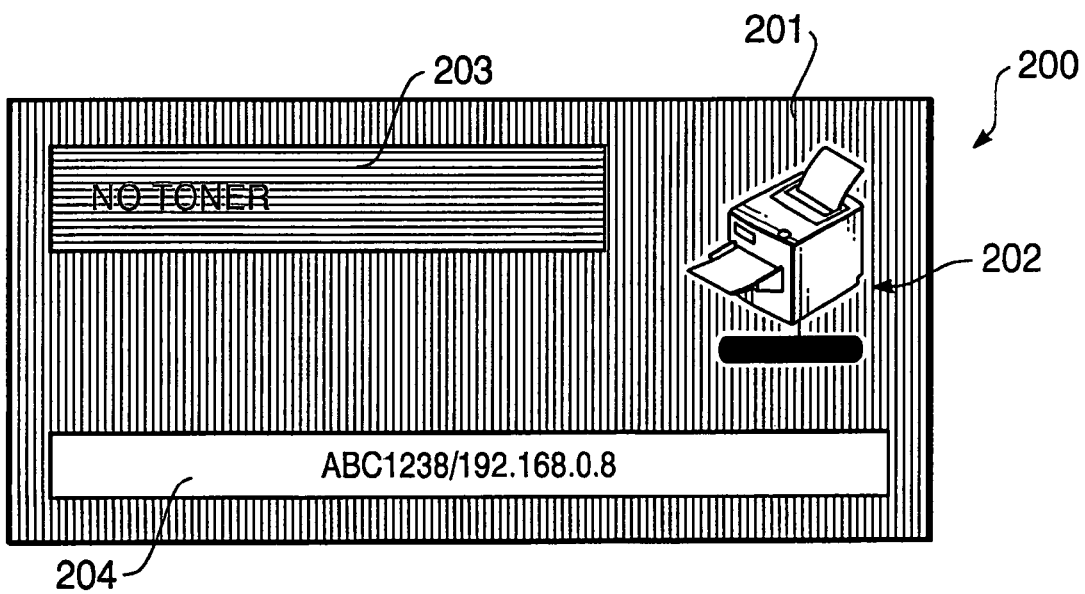

FIGS. 6A and 6B show image examples displayed on a display screen 200 of the LCD 37a or 47a of the terminal device 3 or 4. On the display screen 200, there are provided four display areas. A predetermined upper right area on the display screen is the network condition display area 202 where the icon image (see FIG. 7) showing the connection condition with the network 5 is displayed. On the left of the network condition display area 202, there is provided a rectangular device status display area 203. In the device status display area 203, there are displayed a specific display pattern depending on the status of the terminal device 3 or 4, and a letter symbol representing the status (status information of the terminal device 3 or 4). Below the network condition display area 202 and the device status display area 203, there is provided a rectangular indicator information display area 204. The indicator information display area is configured to display therein the serial number and IP address as the indicator information of the terminal device 3 or 4. Area on the display screen 200 other than the aforementioned areas 202 to 204 is defined as a background area 201. The background area 201 is configured to display therein the display pattern as the identification data specific to the terminal device 3 or 4 (or the non-connection display pattern).

FIG. 6A shows an image example displayed on the display screen 200 of the printer 3 specified by a serial number of "ABC1234" and an IP address of "192.168.0.3". In the indicator information display area 204, there are displayed "ABC1234" and "192.168.0.3" as the indicator information of the printer 3. In addition, in the background display area 201, there is displayed a white plain display pattern (in a lighted state) as a display pattern unique to the printer 3. Further, in the device status display area 203, there is not displayed the error display pattern or the warning display pattern. This means that the printer 3 normally operates.

FIG. 6B shows an image example displayed on the display screen 200 of the printer 3 specified by a serial number of "ABC1238" and an IP address of "192.168.0.8". In the indicator information display area 204, there are displayed "ABC1238" and "192.168.0.8" as the indicator information of the printer 3. In addition, in the background display area 201, there is displayed a pink plain display pattern (in the lighted state) as a display pattern unique to the printer 3. Further, in the device status display area 203, there is displayed a blue plain display pattern in the lighted state. This means that the printer 3 is in the warning status (toner empty status).

Thus, according to the terminal device 3 or 4 in the illustrative embodiment, the unique display pattern is outputted as its own identification data on the LCD 37a or 47a. Accordingly, it is possible to visually differentiate the terminal devices 3 and 4 of the same model or similar appearances, and thereby, the user can accurately recognize each of the terminal devices 3 and 4.

Moreover, in the terminal device 3 or 4, when a predetermined time period has elapsed since the terminal device 3 or 4 was powered ON, the image of the display screen 200 is outputted on the LCD 37a or 47a, and then the indicator information is under a state of being always displayed. For this reason, when obtaining the indicator information of the terminal device, the user is not required to perform a complicated operation, and can easily obtain the indicator information. It is noted that both of the device status display area 203 and indicator information display area 204 may be formed in one display area. In this case, the status information and indicator information of the terminal device may alternately be displayed at a predetermined period.

Next, processes executed the network system 1 configured as aforementioned will be explained with reference to flowcharts shown in FIGS. 8 to 18. First, referring to FIGS. 8 to 10, each of processes executed by the PC 2 will be described.

FIG. 8 is a flowchart of a setting operation process executed by the PC 2. The setting operation process is a process for configuring settings and providing instructions for the terminal device 3 or 4 based upon input operations through the keyboard 26 by the user. The setting operation process is started by a predetermined command input (for requesting to display the image of the device list screen 100) by the user. In the setting operation process, first, the model name, serial number, status information, and IP address as the indicator information of each of the terminal devices 3 and 4 are read out from the host device list table 25*d*, and each of the read information is displayed in a predetermined data display section 103 on the list 101 on the device list screen 100 separately for each of the terminal devices 3 and 4 (S1).

Next, the PC 2 reads out the information on the display pattern specified by the pattern code stored in the host device list table 25*d* for each of the terminal devices 3 and 4 from the pattern table 25*c* (S2). Then, the PC 2 displays the display pattern based upon the read display pattern information in a corresponding display section of the display sections "Pattern", for displaying the display patterns, on the list 101 on the device list screen 100, associated with the status information of the terminal device 3 or 4 displayed earlier (S3).

Thereafter, the PC 2 confirms whether an input is given on the device list screen 100 (S4). Iff an input is not given (S4: No), the PC 2 will wait for an input to be given. Meanwhile, if an input is given (S4: Yes), the PC 2 will confirm whether the input is for assigning a device for which the settings are to be configured (S5). When a device for which the settings are to be configured is selected from the data display sections 103 showing the information on the terminal devices 3 and 4 on the list 101, and the "Set" button 105 is clicked on, the CPU 21 (PC 2) recognizes the input as an input for assigning a device for which the settings are to be configured. When the input is recognized as an input for assigning a device for which the settings are to be configured (S5: Yes), The IP address, subnet mask, and default gateway address corresponding to the assigned terminal device 3 or 4 are read out from the host device list table 25*d* to be displayed according to the form of the device setting screen (S6). Each of the read information is displayed in a corresponding one of the display sections 111, 112, and 113 (see FIG. 5B). In addition, in an not shown step, the display pattern is outputted in the marginal area on the device setting screen 10, based upon the pattern code, corresponding to the displayed information, stored in the host device list table 25*d*.

Then, the PC 2 confirms whether an input is given on the device setting screen 110 (S7). If an input is not given (S7: No), the PC 2 will wait for an input to be given. Meanwhile, if an input is given (S7: Yes), the PC 2 will confirm whether the input is given by the "Cancel" button 115 being clicked on (S8). If the input is not given by the "Cancel" button 115 being clicked on (S8: No), the PC 2 will confirm whether the input is given by the "OK" button 114 being clicked on (S9). If the input is given by the "OK" button 114 being clicked on (S9: Yes), the setting values (IP address, subnet mask, and default gateway address) displayed on the device setting screen 110 will be written into the host device list table 25*d* to update the last values (S10). Thereafter, the written setting values on the device setting screen 110 are packetized to create a setting change request packet for requesting a setting change. Then, the created packet is sent to the set IP address in the setting values according to an SNMP protocol (S11). Thereafter, the PC 2 executes each of processes (S12) to terminate the setting operation process.

On the other hand, in the step of S5, when the input is not confirmed as an input for assigning a device for which the settings are to be configured (S5: No), another input is given on the device list screen 100. Therefore, the process goes to each of the processes in S12. In addition, in the step of S8, when the input is confirmed as an input given by the "Cancel" button 115 being clicked on (S8: Yes), the process goes to each of the processes in S12.

In each of the processes in S12, for example, there are executed a process for terminating displaying the device setting screen 110, and processes based upon commands inputted on the device list screen 100, such as a process for instructing the terminal device 3 or 4 to perform a printing-out operation according to the "Print" button 106 being clicked on and a process for terminating displaying the device list screen 100.

Further, in the step of S9, when the input is not confirmed as an input given by the "OK" button 114 being clicked on (S9: No), the last values displayed on the device list screen 110 is updated with the values inputted in the display sections 111 to 113 on the device setting screen 110 (S13). Thereafter, the process goes to S7, and the inputted values are renounced by the "Cancel" button being clicked on, or the processes of S7 to S9, and S13 are repeated until the inputted values are fixed by the "OK" button being clicked on.

FIG. 9 is a flowchart of a device searching process executed by the PC 2. The device searching process is a process for detecting the terminal device 3 or 4 connected to the network 5, and is executed every predetermined timing when a timer interrupts the process. In this device searching process, first, the PC 2 broadcasts inquiry packets for inquiring the indicator information (the model name, serial number, and IP address), subnet mask, and default gateway address onto the network 5 according to the SNMP protocol (S21). Thereby, the inquiry packets are sent to all of the terminal devices 3 and 4 connected to the network 5. Then, the PC 2 confirms whether the PC 2 receives a response packet to the inquiry packet (S22). If the response packet is not received (S22: No), the PC 2 will confirm whether a response waiting time of 3 seconds has elapsed (S23). If the response waiting time has elapsed (S23: Yes), the device searching process will be terminated. Meanwhile, if the response waiting time has not elapsed (S23: No), the process will go back to S22 to wait for the response waiting time to elapse or for the response packet to be received.

In addition, in the step of S22, when the response packet is confirmed to be received (S22: Yes), the PC 2 confirms whether an IP address included in the received response packet is already stored in the host device list table 25*d* (S24). When the IP address includes in the received response packet is not already stored (S24: No), a group of received information (i.e., the model name, serial number, IP address, subnet mask, and default gateway address) is newly written in the host device list table 25*d* (S25), and the process then proceeds to S23.

On the other hand, in the step of S24, when the IP address included in the received response packet is confirmed to be already stored in the host device list table 25*d* (S24: Yes), the last information stored in the host device list table 25*d* is updated with the group of newly received information (i.e., the model name, serial number, IP address, subnet mask, and default gateway address) for the terminal device 3 or 4 corresponding to the IP address identical to the received IP address (S26). Then, the process goes to S23.

FIG. 10 is a flowchart of a device list updating process executed by the PC 2. The device list updating process is a process for updating the information stored in the host device list table 25*d*, and is executed when the timer interrupts the process every a predetermined time period (for example, substantially every 30 minutes).

In the device list updating process, the PC 2 resets a value (N) of the device list counter 23*a* (N=0) (S31), and send an inquiry packet for inquiring the IP address, status information, display pattern of the terminal device 3 or 4 itself to the terminal device 3 or 4 of an IP address stored in the Nth order from the top in the host device list table 25*d*, according to the SNMP protocol (S32). After a predetermined time period of waiting process (S33), the PC 2 confirms whether a response packet to the inquiry packet is received (S34). If the response packet is received (S34: Yes), the last status information and pattern code of the terminal device 3 or 4 corresponding to the IP address included in the received response packet, among the information stored in the host device list table 25*d*, will be updated with the received status information and pattern code of the terminal device 3 or 4 (S35). Thereby, the status information and pattern code of the terminal device 3 or 4 stored earlier are updated with the newly received status information and pattern code.

Thereafter, the PC 2 increments the value of the device list counter 23*a* by one (N=N+1) (S36), and confirms whether the value of the device list counter 23*a* reaches the total number of the terminal devices 3 and 4 stored in the host device list table 25*d* (S37). When the value of the device list counter 23*a* reaches the total number of the terminal devices 3 and 4 stored in the host device list table 25*d* (S37: Yes), since the update of the information is completed for all of the terminal devices 3 and 4 store in the host device list table 25*d*, the device list updating process is terminated. When the value of the device list counter 23*a* does not reach the total number of the terminal devices 3 and 4 stored in the host device list table 25*d* (S37: No), since the update of the information is not completed for all of the terminal devices 3 and 4 store in the host device list table 25*d*, the device list updating process goes to S32. The processes of S32 to S38 are repeated until the update of the information is completed for all of the terminal devices 3 and 4 store in the host device list table 25*d*.

Meanwhile, in the step of S34, when the PC 2 does not receive the response packet (S34: No), among the information stored in the host device list table 25*d*, the status information of the terminal device 3 or 4 corresponding to the IP address to which the inquiry packet has been sent in S32 is changed into the unconnected status "Connection Error" (S38). The process then goes to S36.

Next, referring to flowcharts shown in FIGS. 11 to 18, processes executed by the terminal device 3 or 4 will be described. For the sake of simple explanation, each of the processes executed by the printer 3 will be explained using the configuration of the printer 3. Each of processes executed by the MFP 4 is executed in the same way as the printer 3 using the configuration of the MFP 4 corresponding to that of the printer 3. Therefore, explanation of each of the processes executed by the MFP 4 will be omitted.

FIG. 11 is a flowchart of a splash screen image displaying process executed by the terminal device (printer 3) when the printer 3 is powered ON. The splash screen image displaying process is a process for outputting on the LCD 37*a* a splash screen image to be displayed for a predetermined time period on start-up.

In the splash screen image displaying process, first, the printer 3 confirms whether the assignment-finished flag 34*e* is set ON (S51). When the assignment-finished flag 34*e* is set ON (S51: Yes), the printer 3 reads out the display pattern specified by the pattern code "3" (connection display pattern) from the pattern table 35*c* (S53). Thereafter, the printer 3 reads out the image data of the icon image "Wired Network Available" stored in the icon image memory 35*b* (S54). Then, the printer 3 instructs the displaying part 37 to display the display screen image based upon the read icon image data and display pattern information for a predetermined time period (to display the splash screen image) (S55) to terminate the splash screen image displaying process.

Thereby, the splash screen image provided with the icon image "Wired Network Available" and connection display pattern is outputted on the LCD 37*a*. It is noted that the icon image "Wired Network Available" outputted on the splash screen is outputted to inform the user not of the wired network being available, but of the printer 3 being connected to the network 5. Namely, the icon image does not necessarily represent "Wired Network Available". It is noted that the printer 3 may be configured to store an image data of an icon image different from the icon image "Wired Network Available" as an icon image for representing that the printer 3 is connected to the network 5 in the icon image memory, and display the icon image for representing that the printer 3 is connected to the network 5 on the splash screen when the printer 3 is confirmed to be connected to the network 5 in the step of S51.

On the other hand, in the step of S51, when the assignment-finished flag 34*e* is set OFF (S51: No), the printer 3 is judged to be unconnected to the network 5, and reads out the information on the display pattern specified by the pattern code "2" (non-connection display pattern) from the pattern table 35*c* (S56). Thereafter, the printer 3 reads out the image data of the icon image "Network Not Available" stored in the icon image memory 35*b* (S57), so that the process goes to S55.

In the step of S55 following S57, since the image data of the icon image "Network Not Available" and the information on the non-connection display pattern are read out, the splash screen image provided with the icon image "Network Not Available" and the non-connection display pattern are displayed on the LCD 37*a*.

Thus, in the splash screen image displaying process, the different splash screen images are displayed on start-up depending on the condition of the connection with the network 5. This allows informing the user of the condition of the connection with the network 5 on start-up.

FIG. 12 is a flowchart of a network setting process executed by the terminal device (printer 3) when a timer interrupts the process every a predetermined time period. In the network setting process, first, the printer 3 confirms whether the IP address is stored in the unchanging address memory 34*d* (S41). When the IP address is stored in the unchanging address memory 34*d* (S41: Yes), the printer 3 confirms whether the packet-received flag 34*f* is set ON (S42). As a result, when the packet-received flag 34*f* is confirmed to be set ON (S42: Yes), this means that the packet, which has been sent to the IP address (unchanging IP address) stored in the unchanging address memory 34*d*, has been received earlier. Therefore, the printer 3 sets the assignment-finished flag 34*e* ON (S43) to terminate the network setting process. Meanwhile, when the packet-received flag 34*f* is set OFF (S42: No), the printer 3 sets the assignment-finished flag 34*e* OFF (S50) to terminate the network setting process.

On the other hand, in the step of S41, when the IP address is not confirmed to be stored in the unchanging address memory 34*d* (S41: No), the printer 3 broadcasts address request packets for requesting to assign the IP address thereto according to the DHCP protocol (S44). Next, the printer 3 confirms whether the IP address has been received (S45). When the IP address has been received (S45: Yes), the printer 3 stores the received IP address in the normal address memory 34*c* (S46), and thereafter, sets the packet-received flag 34*f* OFF (S47) to bring the process forward to S43. Thereby, the assignment-finished flag 34*e* is set ON.

Meanwhile, in the step of S45, when the IP address is not confirmed to be received (S45: No), the printer 3 confirms whether one minute has elapsed (S48). When one minute has not elapsed (S48: No), the process goes back to S45 to wait for one minute to elapse, or for the IP address to be received. On the other hand, in the step of S48, when it is confirmed that one minute has elapsed (S48: Yes), the printer 3 writes a provisional IP address of "192.0.0.192" in the normal address memory 34c (S49), and sets the assignment-finished flag 34e OFF (S50) to terminate the process.

FIG. 13 is a flowchart of a device background color determining process executed by the terminal device (printer 3). The device background color determining process is a process for determining a unique display pattern displayed in the background area 201 as the identification data of the terminal device. The device background color determining process is carried out once at timing when the printer 3 is connected to the network 5. The determined display pattern is maintained until the printer 3 is connected again to a new network after being disconnected once from the current network 5.

In the device background color determining process, first, the printer 3 executes a model searching process for collecting information on other terminal devices 3 and 4 connected to the network 5 (S61), and thereafter, confirms whether the IP address is stored in the terminal device list table 34a (S62). When the IP address is stored in the terminal device list table 34a (S62: Yes), the printer 3 reads out all of the pattern codes stored in the terminal device list table 34a (S63). The read pattern codes represent the display patterns already employed by other printers 3. Therefore, the printer 3 selects the smallest pattern code among the pattern codes of "4" and more stored in the pattern code table 35c, except the read pattern codes (S64). Then, the printer 3 stores the selected pattern code in the self-used pattern memory 34b to update the last data in the self-used pattern memory 34b with the selected pattern code (S65). Thereby, in the terminal device (printer 3), in the case of the first connection between the printer 3 and the network 5, an initial value or default value stored in the self-used pattern memory 34b is updated with the selected pattern code. In addition, in the case of the second or later connection between the printer 3 and the network 5, the pattern code set in the previous connection is updated with the pattern code selected this time. Hence, while the printer 3 is connected with the same network 5, the same display pattern is always outputted. Thereby, the user can be prevented from being confused. Further, when a terminal device employing the same display pattern as the printer 3 exists on the newly connected network, the printer 3 can change the display pattern currently employed the printer 3 itself to avoid such a situation.

Meanwhile, in the step of S62, when the IP address is not confirmed to be stored in the terminal device list table 34a (S62: No), this means that the printer 3 of the same model (to which the same model name is given) is not connected to the network 5. For this reason, the printer 3 selects the smallest pattern code "4" among the pattern codes, as the identification data, stored in the pattern table 35c, and thereafter, the process proceeds to S65.

Thereby, the printers 3 of the same model can output different display patterns from each other. Therefore, the user can identify each of the terminal devices, which have been difficult to identify from external appearances thereof so far because of the same external appearances thereof, only at a glance.

FIG. 14 is a flowchart of the model searching process (S61) executed in the device background color determining process shown in FIG. 13. In this model searching process (S61), first, the terminal device (printer 3) broadcasts inquiry packets for inquiring the indicator information (the model name, serial number, and IP address) and the display pattern unique to each of the terminal devices 3 and 4 onto the network 5 (S71). Thereby, the inquiry packets are transmitted to all of the terminal devices 3 and 4 connected to the network 5. Next, the printer 3 confirms whether the printer 3 has received a response packet to the inquiry packet (S72). When the response packet has not been received (S72: No), the printer 3 confirms whether a response waiting time of 3 seconds has elapsed (S73). When the response waiting time has elapsed (S73: Yes), the model searching process (S61) is terminated. Meanwhile, when the response waiting time has not elapsed (S73: No), the process is brought back to S72, so as to wait for the response to be received, or for the response waiting time to elapse.

On the other hand, in the step of S72, when the response packet is confirmed to have been received (S72: Yes), the printer 3 confirms whether the model name included in the received response packet is identical to the model name of the printer 3 itself stored in the identification data memory 34g (S74). When the model name included in the received response packet is not identical to the model name of the printer 3 itself stored in the identification data memory 34g (S74: No), the process goes to S73. Meanwhile, when the model name included in the received response packet is identical to the model name of the printer 3 itself stored in the identification data memory 34g (S74: Yes), since it is needed to make the display pattern of the detected terminal device different from the display pattern of the printer 3 itself, the printer 3 adds the received indicator information and pattern code to the terminal device list table 34a (S75) to bring the process forward to S73.

It is noted that since the terminal device list table 34a is cleared at the start of the device background color determining process in a not shown step, there is not stored in the terminal device list table 34a any information on other terminal devices. Namely, any information on other terminal devices 3 and 4 that had been connected to the network 5 earlier is not stored in the terminal device list table 34a at the start of the model searching process (S61).

In this illustrative embodiment, the terminal devices are configured such that the display patterns thereof differ from each other only within the same model. Therefore, when the background color determining process is executed by the printer 3, the information on the other printers 3 is acquired as aforementioned. Meanwhile, when the background color determining process is executed by the MFP 4, the information not on the other printer 3, but on the other MFPs 4 is acquired.

Accordingly, in the case of the terminal devices of different models, the same display patterns could be outputted. In order to solve such a problem, the model searching process (S61) may be configured such that the process, after the step of S72 diverging to "Yes", goes to S75 with the step of S74 being skipped. Thereby, the terminal device can be configured to output the different display pattern from any other terminal devices with the same function.

FIG. 15 is a flowchart of a displaying process executed by the terminal device (printer 3) when the timer interrupts the process every a predetermined time period (every substantially 30 seconds). The displaying process is a process for controlling information outputted on the display screen 200 of the LCD 37a of the printer 3. In the displaying process, first, the printer 3 confirms whether the assignment-finished flag 34e is set OFF (S81). When the assignment-finished flag 34e is set OFF (S81: Yes), the printer 3 reads out the information on the display pattern corresponding to the pattern code "2" (the unconnected display pattern information) from the pattern table 35c (S82). Meanwhile, when the assignment-finished flag 34e is not set OFF (S81: No), the printer 3 judges that the printer 3 itself is in the state of being connected to the network 5, and read out the information on the display pattern corresponding to the pattern code stored in the self-used pattern memory 34b from the pattern table 35c (S83).

After the step of S82 or S83, the printer 3 confirms whether the display pattern being displayed in the background area 201 on the LCD 37a is identical to the read display pattern, i.e., the display pattern corresponding to the read information on the display pattern (S84). When the display pattern being displayed in the background area 201 on the LCD 37a is not identical to the read display pattern (S84: No), the printer 3 instructs the displaying part 37 to display the display pattern based upon the read information on the display pattern in the background area 201 (S85). Thereby, in the background area 201 on the LCD 37a, there is displayed the display pattern based upon the read information on the display pattern to update the last display pattern. On the other hand, in the step of S84, when the display pattern being displayed in the background area 201 on the LCD 37a is confirmed identical to the read display pattern (S84: Yes), the step of S85 is skipped, so that the process goes to S86. For this reason, in the background area on the LCD 37a, there is continuously displayed the same display pattern as displayed until then.

Thereafter, the printer 3 confirms whether an error occurs (S86). When an error occurs (S86: Yes), the printer 3 reads out the information of the display pattern corresponding to the pattern code "0" (error display pattern) from the pattern table 35c (S87). Then, the printer 3 confirms whether the display pattern being displayed in the device status display area 203 on the LCD 37a is identical to the read display pattern, i.e., the display pattern corresponding to the read information on the display pattern (S88). When the display pattern being displayed in the device status display area 203 on the LCD 37a is not identical to the read display pattern (S88: No), the printer 3 instructs the displaying part 37 to display the display pattern based upon the read information on the display pattern in the device status display area 203 (S89). Thereby, the display pattern in the display status display area 203 is updated.

On the other hand, when the display pattern being displayed in the device status display area 203 on the LCD 37a is confirmed identical to the read display pattern (S88: Yes), the process goes to S90 with the step of S89 being skipped. Therefore, in the device status display area 203 on the LCD 37a, there is continuously displayed the same display pattern as displayed until then.

Thereafter, the printer 3 executes a network connection display process for displaying the icon image in the network condition display area 202 (S90). Then, the printer 3 executes another information display process for displaying the indicator information in the indicator information display area 204 and the letter symbols in the device status display area 203 (S91) to terminate the displaying process.

Further, in the step of S86, when an error is not confirmed to occur (S86: No), the printer 3 confirms whether the printer 3 itself is in the warning status (S92). As a result, when a problem such as toner empty, paper jam, and paper empty occurs, the printer 3 itself is judged to be in such a warning status as to be necessary for operations by the user (S92: Yes). Then, the printer 3 reads out the information on the display pattern corresponding to the pattern code "1" (warning display pattern) from the pattern table 35c (S93) to bring the process forward to S88. Meanwhile, when the printer 3 itself is not judged to be in the warning status (S92: No), the process goes to S88.

It is noted that when the error status or the warning status is resolved, the display image in the device status display area 203 is restored to a normal display image (white plain image).

Thus, by displaying the display pattern on the LCD 37a in the displaying process, the user can judge that the printer 3 is in the error status or the warning status as well as identify the printer 3 in a remote place. For this reason, unnecessary checking operations can be reduced to save trouble of the user.

FIG. 16 is a flowchart of the network connection display process (S90) executed in the displaying process shown in FIG. 15. In this network connection display process, first, the terminal device (printer 3) confirms whether the assignment-finished flag 34e is set OFF (S101). When the assignment-finished flag 34e is set OFF (S101: Yes), the printer 3 reads out the image data of the icon image of "Network Not Available" from the icon image memory 35b (S102). Then, the read image data of the icon image is displayed on the displaying part 37 (S103) to terminate the process.

On the other hand, in the step of S101, when the assignment-finished flag 34e is confirmed to be set ON (S101: No), the printer 3 reads out the image data of the icon image of "Wired Network Available" from the icon image memory 35b (S104). Then, the printer 3 confirms an ID of the network interface being currently working (S105). Thereafter, the printer 3 confirms whether the confirmed ID is an ID of the wireless network interface (S106). When the confirmed ID is the ID of the wireless network interface (S106: Yes), the printer 3 reads out the image data of the icon image of "Wireless Network Available" from the icon image memory 35b (S107). Meanwhile, when the confirmed ID is not the ID of the wireless network interface (S106: No), the step of S107 is skipped, so that the process proceeds to S108.

In the step of S108, the printer 3 sends the inquiry packet to the set mail server (S108). Next, the printer 3 confirms whether it has received a response to the inquiry packet from the mail server (S1109). If the printer 3 has not received the response from the mail server (S109: No), the process will be brought forward to S103. Meanwhile, if the printer 3 has received the response (S109: Yes), it will read out the image data of the icon image of "Mail Function Available" from the icon image memory 35b (S110), and bring the process forward to S103. It is noted that the read icon image data is written in a predetermined area of the RAM 33, and the written icon image data is updated, whenever icon image data is newly read out, with the new data. Therefore, in this case, the printer 3 is in a state of one icon image data being read out.

Thereby, there is displayed in the network condition display area 202 on the LCD 37a, depending on the connection condition, which condition the connection between the printer 3 and the network 5 is in among the four conditions of "Network Not Available", "Wired Network Available", "Wireless Network Available", and "Mail Function Available".

It is noted that there is stored in a predetermined area of the HDD necessary data for confirming the connection condition (the destination device) such as an address of the mail server, ID of the wireless network interface to be checked, and addresses of the DHCP server and router.

FIG. 17 is a flowchart of a packet reception memorizing process executed by the terminal device (printer 3). The packet reception memorizing process is a process for memorizing that the printer 3 itself had received a packet earlier, which is executed when the timer interrupt process is performed every a predetermined time period. In the packet reception memorizing process, the printer 3 confirms whether it had received a packet with the IP address or MAC address thereof as a destination address (S111). As a result, if the printer 3 had received such a packet (S111: Yes), the packet-received flag 34f will be set ON (S112) to terminate the process. Meanwhile, if the printer 3 had not received such a packet (S111: No), the packet reception memorizing process is directly terminated. As aforementioned, the packet-received set ON is set OFF by the reset process for restoring each of the settings of the printer 3 to an initial state.

FIG. 18 is a flowchart of a response process executed by the terminal device (printer 3). The response process is executed when the timer interrupt process is performed every a predetermined time period. In the response process, the printer 3 confirms whether it has received the inquiry packet (S121). If the printer 3 has received the inquiry packet (S121: Yes), the printer 3 will read out information from the normal address memory 34c, unchanging address memory 34d, self-used pattern memory 34b, and identification data memory 34g according to a matter inquired by the inquiry packet, and packetize the read information to send it back to the inquiring source device (S122).

For example, if the inquiry packet inquires the indicator information (the model name, serial number, and IP address), subnet mask, and default gateway address, the printer 3 will read out the model name, serial number, subnet mask, and default gateway address from the indicator information, and further read out the IP address from any one of the normal address memory 34c and unchanging address memory 34d when the IP address is assigned to the printer 3. Then, the printer 3 packetizes each of the read data to send it back to the inquiring source device (i.e., respond to the inquiry packet).

On the other hand, if the inquiry packet inquires the IP address, information on the status of the terminal device (printer 3), and the pattern code representing the display pattern of the printer 3 itself, the printer 3 will read out the IP address from any one of the normal address memory 34c and unchanging address memory 34d, and read out the pattern code from the self-used pattern memory 34b. Then, the printer 3 obtains the above read data to which data on the device status judged by the printer 3 itself is further added, and packetizes the obtained data to send it back to the inquiring source device (i.e., respond to the inquiry packet).

FIG. 19 is a flowchart of a setting change process executed by the terminal device (printer 3). The setting change process is executed when the printer 3 receives a setting change request packet. In the setting change process, first, the printer 3 reads out setting values (the IP address, subnet mask, default gateway address) from the received setting change request packet (S131); Next, the printer 3 updates the subnet mask and default gateway address stored in the identification data memory 34g with the read subnet mask and default gateway address (S132), respectively.

Thereafter, the printer 3 updates the IP address (unchanging IP address) stored in the unchanging address memory 34 with the read IP address (S133). After that, the printer 3 confirms whether the network setting has been changed, that is, whether the updated IP address is different from the address that had been stored in the unchanging address memory 34 earlier (S134). When the network setting has not been changed (S134: No), the setting change process is directly terminated. Meanwhile, when the network setting has been changed (S134: Yes), since the PC 2 shows that a new unchanging IP address is assigned to the printer 3, the printer 3 sets the packet-received flag 34f OFF (S135) in order to show that the printer 3 is in the unconnected status until the printer 3 can confirm that network communication is established (until the printer 3 receives the packet whose destination is the new unchanging IP address of the printer 3). Then, the process is immediately terminated. It is noted that although there are cited as examples of the setting values in this illustrative embodiment only the IP address, subnet mask, and default gateway address, the setting values are not limited to the IP address, subnet mask, and default gateway address. The setting values may be any of the setting values employed by the terminal devices 3 and 4.

Thereby, when the new unchanging IP address is assigned to the printer 3, the assignment-finished flag 34e is set OFF in the network setting process shown in FIG. 12. Then, in the displaying process shown in FIG. 15, the non-connection display pattern is outputted in the background area 201 on the LCD 37a. In addition, in the network connection display process (S90) shown in FIG. 16, the icon image of "Network Not Available" is displayed in the network condition display area 202 on the LCD 37a.

Thus, according to the terminal devices (printer 3 and MFP 4), when a plurality of terminal devices 3 and 4 with similar external appearances or functions is connected to the network 5, the display pattern outputted from one terminal device itself allows the user to clearly discriminate itself from the other terminal devices.

Further, according to the network system 1, there are displayed on the device list screen 100 of the PC 2 the indicator information and the display pattern of the terminal device corresponding to the indicator information, associated each other. Therefore, the user can adequately understand which terminal device the terminal device, shown by the indicator information displayed on the PC 2, actually corresponds to, by comparing the display pattern displayed on the device list screen 100 with the display pattern outputted on the terminal device.

Hereinabove, the present invention has been explained based upon the illustrative embodiment. However, the present invention is not limited to the aforementioned illustrative embodiment, and it is easily inferred that various sorts of modifications may be possible as far as they are within such a scope as not to extend beyond the essential teachings of the present invention.

For example, in the aforementioned illustrative embodiment, there is employed as an expression pattern outputted from the terminal device the display pattern visually recognized. However, alternatively, the expression pattern may be a pattern acoustically recognized.

In addition, in the above illustrative embodiment, the terminal device acquires the pattern code from another terminal device via the network communication, and writes the acquired pattern code in the terminal device list table 34a. However, alternatively, the terminal device may be configured to write the pattern code, and write the acquired pattern code to the terminal device list table 34a by an input operation of the operating keys 36. In the case of the terminal device thus configured, the terminal device may further be configured such that the display pattern determined by the user is directly inputted by the input operation of the operating keys 36, and the pattern code corresponding to the inputted display pattern is stored in the self-used pattern memory 34b.

In addition, in the aforementioned illustrative embodiment, the terminal device 3 or 4 is configured to inform the user of the four statuses of the terminal device by the four specific display patterns. However, the statuses of which the terminal device 3 or 4 is to inform are not limited to four, and may be more than or less than four. For example, there can be cited as a warning status various kinds of statuses such as a paper jam and toner empty. Therefore, the pattern table (35c or 45c) may be configured to store the display pattern corresponding to each of the warning statuses. Thereby, since the terminal device selects the display pattern (the specific display pattern) from the pattern table (35a or 475) according to each of the warning statuses about which the terminal device is to warn the user to output the selected display pattern on the LCD (37a or 47a), the terminal device 3 or 4 can inform of not only whether it is in the warning status, but also what kind of warning status it is in.

In addition, the pattern table (35c or 45c) may be configured to store only two display patterns corresponding to the error status and warning status as the specific display patterns, and output the specific display pattern representing any of the two specific statuses only when the terminal device 3 or 4 is in such a specific status. In many cases, the user is required to judge only whether the terminal device can operate. On the other hand, when the terminal device is configured to output the display pattern corresponding to each of many statuses, since it is complicated to judge the status of the terminal device, the user might be confused. Hence, by reducing the specific statuses of which the terminal device is to inform the user, it is possible to prevent the user from being confused.

In the aforementioned illustrative embodiment, the predetermined display pattern is outputted as a display pattern unique to each of the terminal devices. However, alternatively, a display pattern different from any of the display patterns corresponding to the other terminal devices may be obtained by processing the display pattern acquired from another terminal device. The above "processing" means, for example, to add/remove a predetermined shape and/or color tone to/from the display pattern acquired from another terminal device to obtain a different display pattern from the acquired display pattern. In such a case, the terminal device is configured to send information on not the pattern code, but the display pattern itself, when it receives a request for sending the display pattern from another terminal device.

In the aforementioned illustrative embodiment, the terminal devices with a printing function are applied. However, the present invention is applied to terminal devices with similar external appearances and/or similar functions. Here, the terminal devices with similar functions are not limited to the terminal devices with the printing functions, and include various kinds of output devices with output functions. There are cited as examples of various kinds of output devices a voice output device configured to output information with a voice, facsimile machine configured to output information by data transmission, data server, and projector configured to output (display) an image. In addition, the terminal devices may be various kinds of input devices such as a scanner and camera. Furthermore, the terminal device may be a complex device configured with the output device and the input device.

In the aforementioned illustrative embodiment, the display patterns are outputted on the LCDs. However, alternatively, the display patterns may be outputted on various kinds of display devices such as a plasma display, CRT display, and organic EL (electroluminescence) display. Further, the display pattern may be outputted on a display panel configured with simple light-emitting members such as LEDs and lamps. Thereby, the cost of manufacturing can be saved. The terminal device may be controlled such that the color of the characters displayed on the display device is not the same as or similar to the color used for the display pattern

What is claimed is:

1. A terminal device, comprising:
    an output device configured to output information;
    a self-pattern storing system configured to store information on an expression pattern for the terminal device therein;
    a configuring system configured to configure the information on the expression pattern for the terminal device into the self-pattern storing system;
    an output executing system configured to make the output device output the expression pattern for the terminal device, based upon the information on the expression pattern for the terminal device;
    an obtaining system configured to obtain information on expression patterns for other terminal devices connected to a network; and
    a setting system configured to define an expression pattern different from any of the expression patterns for the other terminal devices as the expression pattern for the terminal device, based upon the information obtained by the obtaining system, the setting system being configured to set information on the defined expression pattern as the information on the expression pattern for the terminal device,
    wherein the output device is configured to output based upon the information set by the setting system as the information on the expression pattern for the terminal device;
    wherein the terminal device is configured to be connected to the network and operated by a host device; and
    wherein the terminal device is connectable with a network;
        the obtaining system sends, to other terminal devices connected to the network, a request for information on expression patterns for the other terminal devices via the network and obtains the information on the expression patterns for the other terminal devices that is transmitted by the other terminal devices via the network in response to the request;
        the output executing system is configured to make the output device output the expression pattern for the terminal device based upon the information set by the setting system as the information on the expression pattern for the terminal device; and
        the terminal device is configured to be operated by the host device via the network.

2. The terminal device according to claim 1, further comprising:
    a sending system configured to send the information, stored in the self-pattern storing system, on the expression pattern for the terminal device outside, in response to another terminal device requests the terminal device to send the information on the expression pattern for the terminal device,
    wherein the obtaining system includes:
    a transmission request system configured to request to send the information on the expression patterns for the other terminal devices connected to the network;
    a pattern information receiving system configured to receive the information, which is sent from the other terminal devices responsive to the transmission request by the transmission request system; and
    an other-pattern storing system configured to store the information received by the pattern information receiving system therein, and
    wherein the setting system is configured to define an expression pattern different from any of the expression patterns for the other terminal devices as the expression pattern for the terminal device, based upon the information stored in the other-pattern storing system, the setting system being configured to set information on the defined expression pattern as the information on the expression pattern for the terminal device.

3. The terminal device according to claim 2,
wherein the transmission request system is configured to request the other terminal devices to send the information on the expression patterns for the other terminal devices, and
wherein the sending system is configured to send the information on the expression pattern for the terminal device to the other terminal devices that are source devices giving the transmission requests.

4. The terminal device according to claim 2, further comprising:
a set pattern storing system configured to store information on a plurality of predetermined expression patterns therein,
wherein the setting system is configured to select information on at least one expression pattern other than the expression patterns for the other terminal devices from the information on the plurality of predetermined expression patterns, based upon the information stored in the other-pattern storing system, and set the selected information on the at least one expression pattern as the information on the expression pattern for the terminal device.

5. The terminal device according to claim 4,
wherein the information on the plurality of predetermined expression patterns stored in the set pattern storing system includes information on specific expression patterns, each of which represents that the terminal device is in a corresponding one of predetermined specific statuses, in addition to the information on the expression patterns for the terminal device, and
wherein the terminal device further comprises:
a specific status judging system configured to judge whether the terminal device is in one of the predetermined specific statuses corresponding to the specific expression patterns; and
a specific pattern output executing system configured to make the output device output the specific expression pattern corresponding to the specific status in which the specific status judging system has judged that the terminal device is.

6. The terminal device according to claim 1,
wherein the expression patterns include color tone patterns that are visually recognized and discriminated based upon difference of color tone,
wherein the output device includes:
a color generating system configured to generate at least one of chromatic colors and achromatic colors; and
an expression pattern displaying device configured to display visual information with at least one of chromatic colors and achromatic colors generated by the color generating system, and
wherein the output executing system is configured to make the expression pattern displaying device output a color tone pattern for the terminal device based upon the information on the color tone patterns stored in the self-pattern storing system.

7. The terminal device according to claim 1,
wherein the expression patterns include graphic patterns that are visually recognized and discriminated based upon difference of graphic,
wherein the output device includes an expression pattern displaying device configured to display visual information, and
wherein the output executing system is configured to make the expression pattern displaying device output a graphic pattern for the terminal device based upon the information on the graphic patterns stored in the self-pattern storing system.

8. The terminal device according to claim 1,
wherein the expression patterns include light emitting patterns that are visually recognized and discriminated based upon difference of light emitting condition,
wherein the output device includes:
an expression pattern displaying device configured to display visual information; and
a light emitting condition changing system configured to change the light emitting condition of light to be emitted from the expression pattern displaying device, and
wherein the output executing system is configured to make the expression pattern displaying device output a light emitting pattern for the terminal device by making the light emitting condition changing system change the light emitting condition of the light to be emitted from the expression pattern displaying device based upon the information on the light emitting patterns stored in the self-pattern storing system.

9. The terminal device according to claim 1, further comprising a terminal indicator information storing system configured to store therein indicator information, for indicating the terminal device, including at least one of a name and location data on the network that are given to the terminal device,
wherein the output device includes an indicator information displaying device configured to display the indicator information stored in the terminal indicator information storing system.

10. The terminal device according to claim 9,
wherein the output device includes a displaying device having a plurality of display areas, the displaying device including the indicator information displaying device and the expression pattern displaying device, and
wherein the output executing system is configured to make the displaying device display the expression pattern for the terminal device in one display area, different from the area in which the indicator information is displayed, of the plurality of display areas, in the case where the expression pattern for the terminal device is set as the expression pattern visually recognized.

11. The terminal device according to claim 1, further comprising:
an image data storing system configured to store data on images representing conditions of connection with the network therein;
a detecting system configured to detect the condition of connection with the network;
an image displaying device configured to display the image based upon the image data stored in the image data storing system thereon; and
a connection condition displaying system configured to select the data on the image representing the condition, detected by the detecting system, of the connection with the network from the image data stored in the image data storing system, and display the image representing the detected condition of the connection with the network based upon the selected data on the image displaying device.

12. The terminal device according to claim 11,
wherein the detecting system includes:
a wired destination storing system configured to store wired destination assigning information for assigning a destination device with which the terminal device is to have a wired connection via the network; and a wired connection detecting system configured to detect whether the wired connection is established based upon the wired destination assigning information stored in the wired destination storing system, wherein the image data storing system is configured to store therein at least data on a wired connection image representing that the wired connection is established based upon the wired destination assigning information stored in the wired destination storing system, and wherein the connection condition displaying system is configured to display the wired connection image on the image displaying device in the case where the wired connection detecting system detects the wired connection being established based upon the wired destination assigning information.

13. The terminal device according to claim 11,
wherein the detecting system includes:
a wireless destination storing system configured to store wireless destination assigning information for assigning a destination device with which the terminal device is to have a wireless connection via the network; and
a wireless connection detecting system configured to detect whether the wireless connection is established based upon the wireless destination assigning information stored in the wireless destination storing system,
wherein the image data storing system is configured to store therein at least data on a wireless connection image representing that the wireless connection is established based upon the wireless destination assigning information stored in the wireless destination storing system, and
wherein the connection condition displaying system is configured to display the wireless connection image on the image displaying device in the case where the wireless connection detecting system detects the wireless connection being established based upon the wireless destination assigning information.

14. The terminal device according to claim 11,
wherein the detecting system includes:
a mail server storing system configured to store mail server assigning information for assigning a mail server with which the terminal device is to have a connection via the network; and
a mail server detecting system configured to detect whether the connection with the mail server is established based upon the mail server assigning information stored in the mail server storing system,
wherein the image data storing system is configured to store therein at least data on a mail server image representing that the connection with the mail server is established based upon the mail server assigning information stored in the mail server storing system, and
wherein the connection condition displaying system is configured to display the mail server image on the image displaying device in the case where the mail server detecting system detects the connection with the mail server being established based upon the mail server assigning information.

15. The terminal device according to claim 1,
wherein the output device includes a lighting indicator device having at least one light emitting member, the light indicator device being configured to represent the different expression patterns, which are set as expression patterns visually recognized, by changing a lighting condition of the light indicator device.

16. The terminal device according to claim 1, further comprising:
a start-up connection judging system configured to judge whether the terminal device is connected with the network at timing when the terminal device is powered ON;
a judgment result displaying device configured to display a judgment result by the start-up connection judging system; and
an initial display output system configured to output initial displays of different display patterns on the judgment result displaying device for a predetermined time period depending on whether the terminal device is judged to be connected with the network by the start-up connection judging system.

17. A terminal device, comprising:
a self-pattern storing system;
a configuring system configured to configure information on an expression pattern into the self-pattern storing system;
an obtaining system configured to obtain the information on the expression patterns for other terminal devices connected to a network;
a setting system configured to define an expression pattern different from any of the expression patterns for the other terminal devices as the expression pattern for the terminal device, based upon the information on the expression patterns for the other terminal devices obtained by the obtaining system, the setting system being configured to set information on the defined expression pattern as the information on the expression pattern for the terminal device;
an output device configured to output perceptual information; and
an output executing system configured to make the output device output the expression pattern for the terminal device, based upon the information on the expression pattern that is configured into the self-pattern storing system by the configuring system;
wherein the terminal device is connectable with a network;
the obtaining system sends, to other terminal devices connected to the network, a request for information on expression patterns for the other terminal devices via the network and obtains the information on the expression patterns for the other terminal devices that is transmitted by the other terminal devices via the network in response to the request;
the output executing system is configured to make the output device output the expression pattern for the terminal device based upon the information set by the setting system as the information on the expression pattern for the terminal device; and
the terminal device is configured to be operated by a host device via the network.

18. A terminal device configured to be operated by a host device connected to a network, the terminal device being to be connected to the network together with other terminal devices, each of which has at least one of an appearance and function similar to those of the terminal device, the terminal device, comprising:
an output device configured to output information;
a self-pattern storing system configured to store information on an expression pattern for the terminal device;
an obtaining system configured to obtain the information on the expression patterns for other terminal devices connected to a network;
a setting system configured to define the expression pattern different from any of the expression patterns for the other terminal devices as the expression pattern for the terminal device, the setting system being configured to set information on the defined expression pattern as the information on the expression pattern for the terminal device; and
an output executing system configured to make the output device output the expression pattern for the terminal device, based upon the information on the expression pattern stored in the self-pattern storing system;
wherein the terminal device is connectable with a network;
the obtaining system sends, to other terminal devices connected to the network, a request for information on expression patterns for the other terminal devices via the network and obtains the information on the expression patterns for the other terminal devices that is transmitted by the other terminal devices via the network in response to the request;
the output executing system is configured to make the output device output the expression pattern for the terminal device based upon the information set by the setting system as the information on the expression pattern for the terminal device; and
the terminal device is configured to be operated by the host device via the network.

19. A network system, comprising:
a plurality of terminal devices connected with a network and configured to be operated by a host device; and
a host device configured to individually operate the plurality of the terminal devices;
wherein each terminal device includes:
the output executing system is configured to make the output device output the expression pattern for the terminal device based upon the information set by the setting system as the information on the expression pattern for the terminal device; and,
wherein the terminal device is configured to be discriminated from the other terminal devices connected to the network with the expression pattern that the output executing system makes the output device output, and
wherein the host device includes:
a host device displaying system configured to display information;
a host indicator information storing system configured to store therein indicator information including at least one of a name and location data on the network that are given to each of the terminal devices as information for indicating each of the terminal devices;
a host expression pattern storing system configured to store therein the information on the expression pattern for each of the terminal devices, associated with the indicator information stored in the host indicator information storing system; and
a display executing system configured to make the host device displaying system display the expression pattern for the terminal device corresponding to the indicator information given to each of the terminal devices, associated with the indicator information, based upon the information on the expression pattern for each of the terminal devices stored in the host expression pattern storing
an output device configured to output information;
a self-pattern storing system configured to store information on the expression pattern for the terminal device therein;
an obtaining system configured to obtain information on expression patterns for other terminal devices connected to a network;

the obtaining system sends, to other terminal devices connected to the network, a request for information on expression patterns for the other terminal devices via the network and obtains the information on the expression patterns for the other terminal devices that is transmitted by the other terminal devices via the network in response to the request;
a setting system configured to define an expression pattern different from any of the expression patterns for the other terminal devices as the expression pattern for the terminal device, based upon the information obtained by the obtaining system, the setting system being configured to set information on the defined expression pattern as the information on the expression pattern for the terminal device;
a configuring system configured to configure the information on the expression pattern, which is set by the setting system as the expression pattern for the terminal device, into the self-pattern storing system; and
an output executing system configured to make the output device output the expression pattern for the terminal device, based upon the information on the expression pattern for the terminal device; system, in the case where the indicator information stored in the host indicator information storing system is displayed on the host device displaying system.

20. The network system according to claim 19,
wherein the terminal device includes a sending system configured to send the information on the expression pattern for the terminal device outside based upon the information stored in the self-pattern storing system, in response to another terminal device requests the terminal device to send the information on the expression pattern for the terminal device, and
wherein the host device includes:
an expression pattern request system configured to request the terminal device to transmit the information on the expression pattern for the terminal device; and
a pattern configuring system configured to configure the information on the expression pattern for the terminal device into the host expression pattern storing system, based upon the information on the expression pattern sent from the terminal device responsive to the transmission request by the expression pattern request system.

21. The network system according to claim 20,
wherein the terminal device includes the obtaining system and the setting system,
wherein the obtaining system includes:
a transmission request system configured to request to send the information on the expression patterns for the other terminal devices connected to the network;
a pattern information receiving system configured to receive the information, which is sent from the other terminal devices responsive to the transmission request by the transmission request system; and
an other-pattern storing system configured to store the information received by the pattern information receiving system therein,
wherein the setting system is configured to define an expression pattern different from any of the expression patterns for the other terminal devices as the expression pattern for the terminal device, based upon the information obtained by the obtaining system, the setting system being configured to set information on the defined expression pattern as the information on the expression pattern for the terminal device.

22. The network system according to claim 19,
wherein the host device includes:
a terminal device specifying system configured to specify at least one terminal device in a state where the display executing system makes the host device displaying system display the expression pattern for each of the terminal devices associated with the indicator information given to each of the terminal devices;
an operation instructing system configured to give an instruction to the at least one terminal device specified by the terminal device specifying system such that the at least terminal device executes an operation; and
an instruction transmitting system configured to transmit the instruction given by the operation instructing system to the at least one terminal device specified by the terminal device specifying system, and
wherein the terminal device includes:
an instruction receiving system configured to receive the instruction transmitted from the instruction transmitting system; and
an operation executing system configured to execute a predetermined operation according to the instruction that is transmitted from the instruction transmitting system to be received by the instruction receiving system.

23. The network system according to claim 19,
wherein the display executing system is configured to make the host device displaying system display the indicator information, stored in the host indicator information storing system, corresponding to each of the plurality of terminal devices and the expression pattern corresponding to each of the indicator information on one display screen of the host device displaying system according to a form of a list.

24. A non-transitory computer readable medium, comprising computer readable instructions for controlling a terminal device to be operated by a host device connected to a network, the terminal device being to be connected to the network together with other terminal devices, each of which has at least one of an appearance and function similar to those of the terminal device, the computer readable instructions controlling the terminal device to:
obtain information on expression patterns for the other terminal devices connected to the network;
define an expression pattern different from any of the expression patterns for the other terminal devices as an expression pattern for the terminal device, based upon the information obtained in said obtaining;
set information on the expression pattern defined in said defining as information on the expression pattern for the terminal device; and
output the expression pattern for the terminal device based upon the information, set in said setting, on the expression pattern for the terminal device;
wherein computer readable instructions control the terminal device which is connectable with the network to;
obtain from other terminal devices connected to the network, a request for information on expression patterns for the other terminal devices via the network and obtains the information on the expression patterns for the other terminal devices that is transmitted by the other terminal devices via the network in response to the request;
output from each of each of the plurality of terminal devices the expression pattern for the terminal device based upon the information set by the setting system as the information on the expression pattern for the terminal device; and
the terminal device is configured to be operated by the host device via the network.

25. A non-transitory computer readable medium comprising computer readable instructions for controlling a network system including a plurality of terminal devices connected thereto and a host device configured to individually operate the plurality of terminal devices via the network, each of the plurality of terminal devices having at least one of an appearance and function similar to those of each of the other terminal devices, the computer readable instructions controlling the network system to:
obtain information on an expression pattern defined as an expression pattern for each of the plurality of terminal devices;
set the expression pattern for each of the plurality of terminal devices such that the expression patterns for the plurality of terminal devices differ from each other, based upon the information, obtained in said obtaining;
configure into each of the plurality of terminal devices the information on the expression pattern for itself based upon the expression pattern for each of the plurality of terminal devices set in said setting;
output from each of the plurality of terminal devices the expression pattern for itself, based upon the information on the expression pattern for itself;
store the information on the expression pattern for each of the plurality of terminal devices, associated with indicator information, for indicating each of the plurality of terminal devices, including at least one of a name and location data on the network that are given to each of the plurality of terminal devices;
display the indicator information on the host device; and
display the expression pattern and the indicator information, associated with one another, according to the expression pattern outputted from each of the plurality of terminal devices in said outputting, based upon the information, stored in said storing, on the expression pattern for each of the plurality of terminal devices, in the case where the indicator information is displayed on the host device in said displaying the indicator information;
wherein the computer readable instructions control each terminal device to obtain information on expression patterns for the other terminal devices connected to the network, and define an expression pattern different from any of the expression patterns for the other terminal devices as an expression pattern for the terminal device, based upon the information obtained in said obtaining;
wherein computer readable instructions control each terminal device which is connectable with the network to;
obtain from other terminal devices connected to the network, a request for information on expression patterns for the other terminal devices via the network and obtains the information on the expression patterns for the other terminal devices that is transmitted by the other terminal devices via the network in response to the request;
output from each of each of the plurality of terminal devices the expression pattern for the terminal device based upon the information set by the setting system as the information on the expression pattern for the terminal device; and
the terminal device is configured to be operated by the host device via the network.

26. An image forming device connectable with a network, comprising:
- an output unit configured to output information;
- a self-pattern storing unit configured to store first information on an expression pattern for the image forming device;
- an obtaining unit configured to obtain second information on expression patterns for other image forming devices connected to the network;
- a setting unit configured to define an expression pattern different from any of the expression patterns for the other image forming devices as the expression pattern for the image forming device, based upon the second information obtained by the obtaining unit, the setting system being configured to set information on the defined expression pattern as the first information to be stored in the self-pattern storing unit;
- a registering unit configured to register, into the self-pattern storing unit, the first information set by the setting unit; and
- an output controller configured to control the output unit to output the defined expression pattern for the image forming device, based on the first information stored in the self-pattern storing unit;

wherein the image forming device is connectable with a network;
- the obtaining unit sends, to other terminal devices connected to the network, a request for information on expression patterns for the other terminal devices via the network and obtains the information on the expression patterns for the other terminal devices that is transmitted by the other terminal devices via the network in response to the request;
- the output controller is configured to make the output device output the expression pattern for the terminal device based upon the information set by the setting system as the information on the expression pattern for the terminal device; and
- the terminal device is configured to be operated by a host device via the network.

* * * * *

UNITED STATES PATENT AND TRADEMARK OFFICE
CERTIFICATE OF CORRECTION

PATENT NO. : 7,925,705 B2
APPLICATION NO. : 11/377556
DATED : April 12, 2011
INVENTOR(S) : Kan Ishimoto et al.

It is certified that error appears in the above-identified patent and that said Letters Patent is hereby corrected as shown below:

Column 53, Claim 19, Line 23 thru Column 54, Line 1-27,
    Please delete Claim 19 and replace with the attached (see Appendix 1)

Signed and Sealed this
Tenth Day of January, 2012

David J. Kappos
*Director of the United States Patent and Trademark Office*

Appendix 1

19. A network system, comprising:

a plurality of terminal devices connected with a network and configured to be operated by a host device; and a host device configured to individually operate the plurality of the terminal devices; wherein each terminal device includes:

an output device configured to output information;

a self-pattern storing system configured to store information on the expression pattern for the terminal device therein;

an obtaining system configured to obtain information on expression patterns for other terminal devices connected to a network;

the obtaining system sends, to other terminal devices connected to the network, a request for information on expression patterns for the other terminal devices via the network and obtains the information on the expression patterns for the other terminal devices that is transmitted by the other terminal devices via the network in response to the request:

a setting system configured to define an expression pattern different from any of the expression patterns for the other terminal devices as the expression pattern for the terminal device, based upon the information obtained by the obtaining system, the setting system being configured to set information on the defined expression pattern as the information on the expression pattern for the terminal device;

a configuring system configured to configure the information on the expression pattern, which is set by the setting system as the expression pattern for the terminal device, into the self-pattern storing system; and an output executing system configured to make the output device output the expression pattern for the terminal device, based upon the information on the expression pattern for the terminal device, the output executing system is configured to make the output device output the expression pattern for the terminal device based upon the information set by the system as the information on the expression pattern for the terminal device; and, wherein the terminal device is configured to be discriminated from the other terminal devices connected to the network with the expression pattern that the output executing system makes the output device output, and
wherein the host device includes:

a host device displaying system configured to display information;

a host indicator information storing system configured to store therein indicator information including at least one of a name and location data on the network that are given to each of the terminal devices as information for indicating each of the terminal devices;

a host expression pattern storing system configured to store therein the information on the expression pattern for each of the terminal devices, associated with the indicator information stored in the host indicator information storing system; and a display executing system configured to make the host device displaying system display the expression pattern for the terminal device corresponding to the indicator information given to each of the terminal devices, associated with the indicator information, based upon the information on the expression pattern for each of the terminal devices stored in the host expression pattern storing system, in the case where the indicator information stored in the host indicator information storing system is displayed on the host device displaying system.